(12) United States Patent
Lamport

(10) Patent No.: US 7,565,433 B1
(45) Date of Patent: Jul. 21, 2009

(54) BYZANTINE PAXOS

(75) Inventor: Leslie B. Lamport, Palo Alto, CA (US)

(73) Assignee: Microsoft Corporation, Redmond, WA (US)

(*) Notice: Subject to any disclaimer, the term of this patent is extended or adjusted under 35 U.S.C. 154(b) by 1373 days.

(21) Appl. No.: 10/184,773

(22) Filed: Jun. 28, 2002

(51) Int. Cl.
G06F 15/16 (2006.01)
(52) U.S. Cl. .................. 709/227; 709/203; 709/205; 700/2
(58) Field of Classification Search .......... 709/227
See application file for complete search history.

(56) References Cited

U.S. PATENT DOCUMENTS

| | | | |
|---|---|---|---|
| 5,261,085 A | 11/1993 | Lamport | |
| 6,202,067 B1 | 3/2001 | Blood et al. | |
| 6,351,811 B1* | 2/2002 | Groshon et al. | 713/176 |
| 6,587,860 B1 | 7/2003 | Chandra et al. | |
| 6,671,821 B1 | 12/2003 | Castro et al. | |
| 6,704,887 B2* | 3/2004 | Kwiat et al. | 714/10 |
| 6,754,845 B2* | 6/2004 | Kursawe et al. | 714/4 |
| 6,826,601 B2 | 11/2004 | Jacobs et al. | |
| 6,931,431 B2* | 8/2005 | Cachin et al. | 709/205 |
| 2002/0116611 A1* | 8/2002 | Zhou et al. | 713/156 |

OTHER PUBLICATIONS

Revisiting the PAXOS Algorithm, Roberto de Prisco et al, Theoretical Computer Science; Elsevier Science; revised Jul. 1999.*
Lamport, Leslie, "Time, Clocks, and the Ordering of Events in a Distributed System", *Communication of the ACM*, 21(7):558-565, Jul. 1978.
Lamport, Leslie, "The Part-Time Parliament", *ACM Transactions on Computer Systems* 16, 2 (May 1998), pp. 133-169. Also appeared as SRC Research Report 49.
Lamport, Leslie, "Paxos Made Simple", *ACM SIGACT* News (Distributed Computing Column), 32,4 (Whole No. 121, Dec. 2001) pp. 18-25.

(Continued)

*Primary Examiner*—John Follansbee
*Assistant Examiner*—G J M
(74) *Attorney, Agent, or Firm*—Lee & Hayes, PLLC

(57) ABSTRACT

A distributed computing system can operate in the face of malicious failures on the part of some of its constituent devices when each device within the system verifies the sender of any message it receives, and the propriety of the message. The sender can be verified through message authentication schemes or digital signature schemes, though message authentication can provide a more computationally efficient solution. The propriety of a message can be verified by receiving a sufficiently large number of equivalent, properly authenticated messages such that, even if every malicious device transmitted a message, at least one message would have been sent by a properly functioning device. If the number of malicious devices is represented by the variable "M", a sufficient number of equivalent, properly authenticated messages to verify that the message is true can be any number of messages greater than M. Furthermore, the receipt of more than 2M equivalent properly authenticated messages can allow the receiving device to prove the propriety of the message to any device it forwards the messages onto. The proper operation of the distributed computing system can, therefore, proceed in the face of M number of malicious failures and F number of total failures, which can include malicious and non-malicious failures, if the number of constituent devices in the distributed computing system is greater than 2F+M.

35 Claims, 26 Drawing Sheets

OTHER PUBLICATIONS

Lampson, Butler W., "The ABCD's of Paxos", Presented at *Principles of Distributed Computing*, 2001, as one of the papers celebrating Leslie Lamport's 60th Birthday, Retrieved from http://research.microsoft.com/lampson/65-ABCDPaxos/Acrobat.pdf.

Castro, Miguel, et al., "Pratical Byzantine Fault Tolerance", appears in *Proceedings of the Third-symposium on Operating Design and Implementation*, New Orleans, USA, Feb. 1999, pp. 1-14.

Castro, Miguel, et al., "Proactive Recovery in a Byzantine-Fault-Tolerant System", appears in the *Proceedings of the Fourth Symposium on Operating Systems Design and Implementation* (OSDI '00), San Diego, USA, Oct. 2000, pp. 1-15.

Huang, Yennun, et al., "Software Rejuvenation: Analysis, Module and Applications", *Proc. International Symposium on Fault Tolerant Computing*, pp. 381-390, (1995).

Bracha, Gabriel, "An asynchronous $\lfloor(\eta-1)/3\rfloor$-resilient consensus protocol" this paper was Presented at the *ACM Symposium on Principles of Distributed Computing* 1984, pp. 154-162.

Keidar, Idit, et al., "Moshe: A Group Membership Service for WANs" to appear in *ACM Transactions on Computer System (TOCS)*, Aug. 2002, pp. 1-47, Retrieved from http://theory.1cs.mit.edu/~idish/ftp/moshe-tocs02.pdf.

Khazan, Roger, I., "A One-Round Algorithm for Virtually Synchronous Group Communication in Wide Area Networks", PH.D. dissertation, Department of Electrical Engineering and Computer Science. MIT., May 22, 2002. Thesis Supervisors: Prof. Nancy A. Lynch and Dr. Idit Keidar. Retrieved from http://theroy.1cs.mit.edu/~roger/Research/Papers /khazan-phd.pdf.

Anceaume et al., "Converging Toward Decision Conditions" *6th International Conference on Principles of Distributed Systems*, France, pp. 53-63 (Dec. 11-13, 2002).

Mostefaoui et al., "IRISA Research Report No. 1355" (Oct. 2000).

Brasileiro et al., "IRISA Research Report No. 1321" (Apr. 2000).

Schneider, F.; Implementing Fault-tolerant Services Using the State Machine Approach: A Tutorial; *Computing Surveys*, 22(3):299-319, Sep. 1990.

Deswarte, Y. et al; Intrusion Tolerance in Distributed Computing Systems; *Proceedings of the 1991 IEEE Symposium on Research in Security and Privacy*; pp. 110-121, May 1991.

Canetti, R. et al.; Fast asynchronous Byzantine agreement with optimal resilience; *Proc. 25th Annual ACM Symposium on Theory of Computing (STOC)*, pp. 42-51, 1993.

Reiter, M; How to Securely Replicate Services; *ACM Transactions on Programming Languages and Systems*, vol. 16, No. 3, pp. 986-1009, May 1994.

Reiter, M. K.; Secure Agreement Protocols: Reliable and Atomic Group Multicast in Rampart; *Proceedings of the 2nd ACM Conference on Computer and Communications Security*, pp. 68-80, Fairfax, Virginia, Nov. 1994.

Gong, L. et al.; Byzantine Agreement With Authentication: Observations and Applications in Tolerating Hybrid and Link Faults; *Dependable Computing for Critical Applications*—5, pp. 79-90, IFIP WG 10.4, preliminary proceedings, 1995.

Reiter, M. K.; The Rampart toolkit for building high-integrity services; *Theory and Practice in Distributed Systems, International Workshop, Selected Papers, Lecture Notes in Computer Science*, vol. 938, K. P. Birman, F. Mattern, and A. Schiper, Eds., Springer-Verlag, Berlin, 99-110, 1995.

Reiter, M. K.; Distributing Trust With the Rampart Toolkit; *Communications of the ACM*; 39, 4 pp. 71-74, Apr. 1996.

Malkhi, D. et al.; A High-Throughput Secure Reliable Mulitcast Protocol; *Proceedings of the 9th Computer Security Foundations Workshop*, Kenmore, Ireland, pp. 9-17, Jun. 1996.

Malkhi, D. et al.; A High-Throughput Secure Reliable Multicast Protocol; *Journal of Computer Security*. Also in *Proceedings of the 9th IEEE Computer Security Foundations Workshop*, pp. 9-17, Jun. 1996.

Malkhi, D. et al.; Byzantine Quorum Systems; *Proceedings of the 29th ACM Symposium on Theory of Computing*, May 1997.

Malkhi, D. et al.; The Load and Availability of Byzantine Quorum Systems; *Proceedings 16th ACM Symposium on Principles of Distributed Computing (PODC)*, pp. 249-257, Aug. 1997.

Kihlstrom, K. P. et al.; Solving Consensus in a Byzantine Environment Using an Unreliable Fault Detector; *Proceedings of the International Conference on Principles of Distributed Systems (OPODIS'97)*, Hermes, Chantilly, France, 61-76, 1997.

Kihlstrom, K. P. et al.; The SecureRing Protocols for Securing Group Communication; *Proceedings of the 31st Hawaii International Conference on System Sciences*, vol. 3, pp. 317-326, Jan. 1998.

Malkhi, D. et al.; Secure and Scalable Replication in Phalanx; *Proceedings of the 17th IEEE Symposium on Reliable Distributed Systems*; p. 51-58, West Lafayette, Indiana, USA, Oct. 1998.

Malkhi, D. et al.; Byzantine Quorum Systems; *Distributed Computing*; vol. 11, No. 4, p. 203-213, 1998.

Goldberg, A. et al.; Towards an Archival Intermemory; *International Forum on Research and Technology Advances in Digital Libraries*; IEEE, pp. 147-156, 1998.

Hartman, J.H. et al.; The Swarm Scalable Storage System; *19th ICDCS*; pp. 74-81, 1999.

Guerraoui, Rachid et al.; *Reducing the Cost for Non-Blocking in Atomic Commitment*; Département d'Informatique, Ecole Polytechnique Federále de Lausanne, pp. 1-11, May 1996.

Hayashibara, Noahiro et al.; *Performance Comparison Between the Paxos and Chandra-Toueg Consensus Algorithms*; Département d'Informatique, Ecole Polytechnique Federále de Lausanne; Technical Report IC-2002-61, pp. 1-11, Aug. 2002.

Awerbuch, Baruch et al.; *Maintaining Database Consistency in Peer to Peer Networks*; Department of Computer Science, John Hopkins University; Technical Report CNDS-2002-1, pp. 1-14, Feb. 6, 2002.

Birrell, Andrew D. et al.; *The Echo Distributed File System*; Digital Equipment Corp. Systems Research Center; Technical Report 111, pp. 1-22, Sep. 10, 1993.

Liskov, Barbara et al.; *Replication in the Harp File System*; Proceedings of the 13th Symposium on Operating System Principles, 13 pp., Oct. 1991.

Hisgen, Andy et al.; *New-Value Logging in the Echo Replicated File System*; Digital Equipment Corp. Systems Research Center, Research Report 104, pp. 1-39, Jun. 1993.

Long, Darrell D.E. et al.; *Voting with Regenerable Volatile Witnesses*; University of California Computer and Information Sciences; Technical Report, pp. 1-20, Apr. 1990.

Swart, Garret et al.; *Availability in the Echo File System*; Digital Equipment Corp. Systems Research Center, Research Report 112, pp. 1-43, Sep. 1993.

Adya, A., et al.; FARSITE: Federated, Available, and Reliable Storage for an Incompletely Trusted Environment.; *In Proc. 5th OSDI*, Boston, MA, pp. 1-14, Dec. 2002.

Castro, M., *Pratical Byzantine Fault Tolerance*; Ph.D. Thesis Technical Report MIT-LCS-TR-817, MIT, Jan 2001.

Chockler, G. V., et al., Group Communication Specifications: A Comprehensive Study; *ACM Computing Surveys*, pp. 33(4):427-469, Dec. 2001.

Deprisco, R., et al., Revisiting the Paxos Algorithm; *In Proc. 11th Int'l Workshop on Distributed Algorithms*, pp. 111-125, Sep. 1997.

Lamport, L., Using Time Instead of Timeout for Fault Tolerance in Distributed Systems; *ACM Transactions on Programming Languages and Systems (TOPLAS)*, pp. 6(2):264-280, Apr. 1984.

Lamport, L., et al., Cheap Paxos; *In Proc. International Conference on Dependable Systems and Networks (DSN)*, Florence, Italy, 2004.

Lynch, N., et al., RAMBO: A Reconfigurable Atomic Memory Service for Dynamic Networks; *In Proc. 16th International Symposium on Distributed Computing*, Toulouse, France, pp. 173-190, Oct. 2002.

Narasimhan, P., et al., *Replica Consistency of CORBA Objects in Partitionable Distributed Systems*, 1997.

Oki, B.M., *Viewstamped Replication for Highly Available Distributed Systems*; Ph.D. Thesis Technical Report MIT/LCS/TR-423, MIT, Aug. 1988.

Oki, B.M., et al., Viewstamped Replication: A New Primary Copy Method to Support Highly-Available Distributed Systems; *In Proc. 7th Symposium on Principles of Distributed Computing*, Aug. 1988, pp. 8-17.

Rodrigues, R., et al., BASE: Using Abstractions to Improve Fault Tolerance; *In Proc. 18th ACM Symposium on Operating System Principles*, Bantt, Canada, pp. 15-28, Oct. 2001.

Schneider, F.B., Synchronization in Distributed Programs; ACM Transactions on Programming Languages and Systems (TOPLAS; pp. 4(2):125-148.), Apr. 1982.

Yu, H., et al., Consistent and Automatic Replica Regeneration; *In Proc. 1st NSDI*, San Francisco, CA, pp. 323-236, 2004.

Pedone, F., et al., Handling Message Semantics with Generic Broadcast Protocols, *Distributed Computing 15*, pp. 97-107, 2002.

Cukier, M., et al., AQuA: An Adaptive Architecture that Provides Dependable Distributed Objects, *In Proc. 17th Symposium on Reliable Distributed Systems*, pp. 245-253, West Lafayette, IN, Oct. 1998.

Cukier, M., et al., AQuA: An Adaptive Architecture that Provides Dependable Distributed Objects, *IEEE Transactions on Computers*, vol. 52, No. 1, pp. 31-50, Jan. 2003.

Charron-Bost, Bernadette, et al., Uniform Consensus is Harder than Consensus (extended abstract), *Technical Report DSC/2000/028*, Switzerland, May 2000.

DePrisco, Robert, et al., Revisiting the PAXOS Algorithm, *Theroretical Computer Science*, 243:35-91, 2000.

Fischer, Michael J., et al., Impossibility of Distributed Consensus with One Faulty Process, *Journal of the ACM*, 32(2):374-382, Apr. 1985.

Lamport, Leslie, Lower Bounds for Asynchronous Consensus, in *Future Distributed Computing, vol. 2584 of Lecture Notes in Computer Science*, pp. 22-23, Spring, 2003.

Mazurkiewicz, A., *Semantics of Concurrent Systems; A Modular Fixed-Point Trace Approach*; Institute of Computer Science, Poland, pp. 353-375.

Keidar, Idit, et al.; On the Cost of Fault-Tolerant Consensus When There Are No Faults—A Tutorial; SIGACT News 32(2), Distributed Computing column, pp. 45-63; Jun. 2001.

Dwork, Cynthia, et al.; Consensus in the Presence Of Partial Synchrony; *Journal of the ACM*, 35(2):288-323, Apr. 1988.

Lampson, Butler W.; How to Build a Highly Available System Using Consensus; http://www.research.microsoft.com.

Lamport, Leslie; The Implementation of Reliable Distributed Multiprocess Systems; *Computer Networks*, 2:95-114, 1978.

Lamport, Leslie, et al.; The Byzantine Generals Problem; ACM Transactions on Programming Languages and Systems, vol. 4, No. 3, Jul. 1982, pp. 382-401.

Lamport, "Paxos Made Simple", Nov. 1, 2001, 14 pages.

Vuckovic, "From Simple to Byzantine Paxos", at least as early as Jul. 18, 2003, pp. 1-15.

* cited by examiner

BYZANTINE PAXOS

TECHNICAL FIELD

This invention relates generally to distributed computing and, more particularly, relates to fault tolerant distributed computing.

BACKGROUND OF THE INVENTION

As personal computing devices become more powerful, containing increased storage space and processing capabilities, the average user consumes an increasingly smaller percentage of those resources in performing everyday tasks. Thus, many of today's personal computing devices are often not used to their full potential because their computing abilities greatly exceed the demands most users place upon them. An increasingly popular method of deriving use and value from the unused resources of powerful modern personal computing devices is a distributed computing system, in which the computing devices act in coordination with one another to perform tasks and maintain data.

A distributed computing system can utilize a number of interconnected computing devices to achieve the performance and storage capabilities of a larger, more-expensive computing device. Thus, while each personal computing device may only have a few gigabytes of usable storage space, a distributed computing system comprising a number of such devices, can aggregate the available storage space on each individual device and present to a user a terabyte or more of useable storage space. Similarly, a distributed computing system can present to a user a large amount of useable processing power by dividing the user's tasks into smaller segments and transmitting the segments to the individual devices for processing in parallel.

To effectively derive value from the unused capabilities of modern personal computing devices, a distributed computing system should not interfere with the individual use of each personal computing device. By allowing individual users to retain control of the devices, however, the reliability of each device is greatly decreased. To compensate for the increased risk that the individual computing device may become disconnected from the network, turned off, suffer a system malfunction, or otherwise become unusable to the distributing computing system, redundancy can be used to allow the distributed computing system to remain operational. Thus, the information stored on any one personal computing device can be redundantly stored on at least one additional similar personal computing device, allowing the information to remain accessible, even if one of the personal computing devices fails.

Alternatively, a distributed computing system can practice complete redundancy, in which every device within the system performs identical tasks and stores identical information. Such a system can allow users to continue to perform useful operations even if all but one of the devices should fail. Alternatively, such a system can be used to allow multiple copies of the same information to be distributed throughout a geographic region. For example, a multi-national corporation can establish a world-wide distributed computing system. Such a corporation might use a number of high performance server computing devices, rather than less powerful personal computing devices, because each individual computing device would be required to service many users within that geographic region. The individual high performance devices can each perform identical tasks and store identical data, allowing users who merely seek to access the data to obtain such access from a high performance device located in a convenient location for that user.

However, distributed computing systems can be difficult to maintain due to the complexity of properly synchronizing the individual devices that comprise the system. Because timekeeping across individual processes can be difficult at best, a state machine approach is often used to coordinate activity among the individual devices. A state machine can be described by a set of states, a set of commands, a set of responses, and functions that link each response/state pair to each command/state pair. A state machine can execute a command by changing its state and producing a response. Thus, a state machine can be completely described by its current state and the action it is about to perform, removing the need to use precise time-keeping.

The current state of a state machine is, therefore, dependent upon its previous state, the commands performed since then, and the order in which those commands were performed. To maintain synchronization between two or more state machines, a common initial state can be established, and each state machine can, beginning with the initial state, execute the identical commands in the identical order. Therefore, to synchronize one state machine to another, a determination of the commands performed by the other state machine needs to be made. The problem of synchronization, therefore, becomes a problem of determining the order of the commands performed, or, more specifically, determining the particular command performed for a given step.

One mechanism for determining which command is to be performed for a given step is known as the Paxos algorithm. In the Paxos algorithm, any of the individual devices can act as a leader and seek to propose that a given function be executed by every device in the system as the command to be performed for a given step. Every such proposal can be sent with a proposal number to more easily track the proposals. Such proposal numbers need not bear any relation to the particular step for which the devices are attempting to agree upon a command to perform. Initially, the leader can suggest a proposal number for a proposal the leader intends to submit. Each of the remaining devices can then respond to the leader's suggestion of a proposal number with an indication of the last proposal they voted for, or an indication that they have not voted for any proposals. If, through the various responses, the leader does not learn of any other proposals that were voted for by the devices, the leader can propose that a given function be executed by the devices, using the proposal number suggested in the earlier message. Each device can, at that stage, determine whether to vote for the action or reject it. A device should only reject an action if it has responded to another leader's suggestion of a different proposal number. If a sufficient number of devices, known as a quorum, vote for the proposal, the proposed action is said to have been agreed upon, and each device performs the action and transmits the results. In such a manner, an agreed upon command can be determined to be performed for a given step, maintaining the same state among all of the devices.

Generally, the Paxos algorithm can be though of in two phases, with an initial phase that allows a leader to learn of prior proposals that were voted on by the devices, as described above, and a second phase in which the leader can propose functions for execution. Once the leader has learned of prior proposals, it need not continually repeat the first phase. Instead, the leader can continually repeat the second phase, proposing a series of functions, that can be executed by the distributed computing system in multiple steps. In such a manner, while each function performed by the distributed computing system for each step can be though of as one instance of the Paxos algorithm, the leader need not wait for the devices to vote on a proposed function for a given step before proposing another function for the next step.

Such an algorithm, however, is not fault tolerant if one or more of the devices suffers malicious faults, also known as Byzantine faults. The Paxos algorithm, described above, assumes that a faulty device will simply cease communication and will not act upon any data. However, a device experiencing a Byzantine fault exhibits unpredictable behavior and may appear to be functioning properly. Such Byzantine faults are often caused by hackers or other malicious users who seek to disrupt the operation of the distributed computing system. Given the increased amount of information and transactions performed through networked computing systems, such as the Internet, and the World Wide Web, and given the increased importance of many of these transactions, protection from malicious failures becomes increasingly important.

SUMMARY OF THE INVENTION

By increasing the number of computing devices used in a distributed computing system, a predetermined number of Byzantine failures can be tolerated while allowing the distributed computing system to continue to function properly. The proper behavior of the system can be ensured by using message authenticators to ensure that the message was not modified in transit, and by transmitting a proof that whatever claim is made by a device in the message is a true claim. The use of message authenticators, instead of digital signatures, to protect a message, can result in computational efficiencies when both transmitting and receiving the message. Additional efficiencies can also be realized because the existence of a sufficient number of computing devices can allow for a predetermined number of Byzantine failures and still enable individual devices to obtain a transmittable proof that a given claim is true simply by virtue of the number of devices agreeing upon the claim.

Byzantine faults can occur in two general varieties. Either a malicious device can spoof a message, such as by intercepting and changing a message between two properly functioning devices, or the malicious device can transmit false messages. Thus, to avoid messages from malicious devices, a properly functioning device receiving a message can seek to verify both that the message is unchanged and that the message is true. Tampering or editing a message in transit can be detected through the use of message authenticators. Because messages between two devices may need to be forwarded onto other devices, the sending device can include authenticators of the message directed to both the initial destination device and the forwarded destination device. The authenticator of the message that is directed to the initial destination device can authenticate both the message itself and the authenticator of the message that is directed to the forwarded destination device.

The propriety of a message can be proven by illustrating that a sufficient number of devices within the system have agreed to the message. If a number of devices within a distributed computing system are malicious, those devices can work together and agree upon the transmission of false messages in an effort to deceive properly functioning devices. However, if a device receives the same information from more devices than there are malicious devices, then the information must be true because, even if all of the malicious devices participated, at least one of the messages must have come from a properly functioning device, and can therefore be trusted. More broadly, defining the variable "M" to represent the number of malicious devices within a distributed computing system, any device can trust information which it has received from at least M+1 different devices.

A transmitting device can prove the propriety of a message by sending, with the message, a sufficiently large collection of messages originally sent to that transmitting device that indicate the information contained in the message is true. However, a message sent by a malicious device could be properly authenticated for the transmitting device, yet may not be properly authenticated for the receiving device. Thus, the transmitting device, upon receiving M+1 messages containing the same information, may properly believe that the information is true, but if it seeks to forward those messages onto a receiving device, it is possible that all but one of them will not be properly authenticated for the receiving device. However, the receiving device, like any other device, requires that M+1 equivalent properly authenticated messages assert the information before it can believe that the information contained in the messages is true. Therefore, to ensure that the receiving device receives those M+1 messages, the transmitting device can forward a collection of messages at least as large as M+1+M or 2M+1 messages. Such a collection is sufficiently large that, even if a message from every malicious device was included, M+1 equivalent properly authenticated messages would still be received by the receiving device. Therefore, the receipt of M+1 equivalent properly authenticated messages by any device enables that device to trust the information contained in the message. Furthermore, if 2M+1 equivalent properly authenticated messages are received, the receiving device can forward those messages along to prove to the device receiving the forwarded messages that the information contained in the messages is true.

The distributed computing system can, therefore, operate in the presence of Byzantine failures with a modified Paxos algorithm that enables the constituent devices to verify both the message and the propriety of a message. As before, a modified Paxos algorithm can be conceptually divided into a first phase in which the leader learns of prior, "safe" proposals, and a second phase in which the leader proposes functions for execution by the distributed computing system. Once the leader has learned of the safe proposals for each step of the system, it can proceed to propose functions for execution without repeating the first phase of the algorithm. Additionally, the leader need not wait for the devices to vote or accept a proposal prior to proposing another proposal for a subsequent step.

Any device can act as a leader and solicit votes for a proposal by initially suggesting, to at least a quorum of devices, a proposal number that the leader will use to submit its proposal for a vote. Upon receiving a suggestion of a proposal number, each of the recipient devices can transmit to the other devices the most recent proposal for which that recipient device has voted together with a proof that the device was allowed to vote for that proposal, as will be described below. As with the original Paxos algorithm, each proposal can be assigned a number by the leader submitting the proposal. The proposal with the largest proposal number can be considered to be the most recent proposal. Consequently, a device can ignore a proposal that is later in time, yet has a smaller proposal number than a proposal the device has already received, because that larger numbered proposal that was already received is, by definition, no longer the most recent one.

Once the device receives the messages from the other recipient devices, each recipient device can independently determine safe proposals, or proposals, not submitted by malicious devices, which other, also non-malicious, devices had already voted for. Such safe proposals can be determined by finding proposals for which messages were received from 2M+1 devices indicating that those devices had voted for that proposal. The determined safe proposals can then be transmitted to the leader, together with the 2M+1 messages as proof that the determined safe proposals are, in fact, safe.

While the 2M+1 messages are sufficient to provide proof of the safety of the determined safe proposals to the device soliciting votes, they are not sufficient, as will be shown below, to allow the leader to provide proof of safety to the recipient devices when the leader submits a proposal for voting. However, because the leader received a message from each of the devices, and the number of devices was at least a quorum, those messages are sufficient to prove the safety of a proposal the leader submits for voting, assuming that the leader correctly chooses a proposal based on the safe proposals determined by the devices. Thus, proposals can be submitted by the leader for voting, using the messages the leader received in response to the original message as the proof of the safety of the proposal.

A device will accept a proposal submitted for voting, so long as that device received an indication from a quorum of devices that a vote for the proposal is appropriate and so long as that device has not responded to another message, such as from another leader, suggesting a different proposal number. Initially, if a device has verified the proof of safety sent by the leader, the device can send a message to the other devices indicating that the current proposal is the only proposal with that proposal number for which the device will vote. Upon receipt of a quorum of these messages from a quorum of devices indicating that the current proposal is the only proposal with that proposal number for which those devices will vote, each device can independently transmit its acceptance to the leader, provided that it has not, in the meantime, responded to another message suggesting a different proposal number. Additionally, the devices can save the messages from the quorum of devices indicating that the proposal is the only proposal with that proposal number for which those devices will vote in order to provide proof of the appropriateness of casting the vote when the device sends an indication of the last proposal it voted for, as stated above.

Upon receipt of messages from a quorum of devices accepting the proposal, the leader can transmit a message to all of the devices requesting that they execute the function contained in the proposal, together with proof that the leader is performing properly in making such a request, which comprises the quorum of messages received from the devices. The leader can also attach to the success message another proposal for which voting is solicited, Increasing the efficiency of the algorithm. Additionally, as described above, once the leader has learned of all of the safe proposals for current and future steps of the system, it can continue to propose functions for future steps prior to receiving a vote from the devices on the proposed function for the current step.

Additional advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
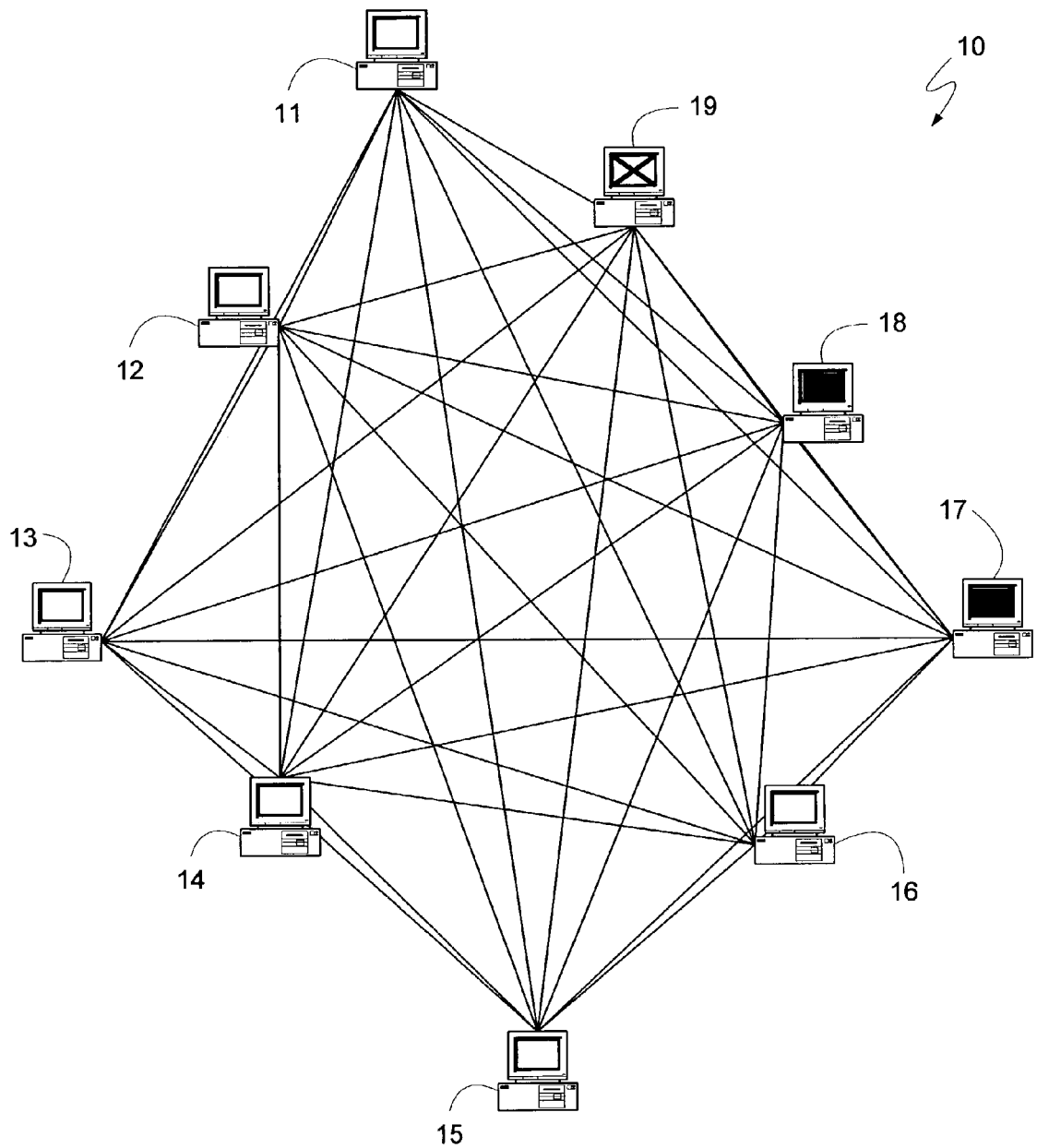
FIG. 1 is a block diagram generally illustrating an exemplary distributed computing system with which the present invention can be implemented.

A distributed computing system can comprise a number of individual personal computing devices, server computing devices, or other devices that have sufficient processor and storage abilities to participate in the system. The distributed computing system can aggregate the abilities of its constituent computing devices to either provide for greatly increased processing capabilities and storage space, or to implement redundancy, allowing multiple devices to provide access to the same information. Thus, one common usage for a distributed computing system is the aggregation of the unused processing capabilities and storage space of many different personal computing devices attached to a common network. Such a distributed computing system can maintain information regarding the system, such as which devices are currently part of the system and on which device a given set of information is stored. This information can be necessary for the devices to aggregate their capabilities and storage space and, as a result, each device may contain a copy. Synchronization of the information among the devices of the system can be facilitated through a state machine approach as described below.

Alternatively, an increasingly common usage for distributed computing systems is that of a network server device that can act as a central storage repository for various forms of information. Such a distributed system seeks to replicate the central store on all of its constituent devices so that every client seeking to communicate with the central storage can find a convenient and efficient device with which to communicate.

The distributed computing system can be thought of as a state machine, with the future state of the machine completely defined by the current state and the action to be taken. Each constituent device of the distributed computing system can then independently execute the state machine of the overall system. The state-machine approach can be implemented asynchronously such that precise synchrony across the constituent devices need not be maintained and synchronization between the devices can be achieved by setting an initial state for all of the devices and subsequently executing the same functions in the same order. A common method for maintaining synchronization is to allow the constituent devices of the distributed computing system to all agree upon the next function before executing that function, and to maintain a list of all of the functions that were executed. In such a manner, every device can have the same state and if a device fails it need only determine the last function it executed, identify, from the list, any functions that have been agreed upon since that last function, and execute those functions.

Such a distributed computing system acting as a server can be especially useful for serving a large amount of information to a diverse set of clients, such as a central database for a multi-national corporation, or a popular World Wide Web site. In such situations, a large number of clients can request information from the distributed computing system acting as a server. By implementing the server functionality across multiple devices, more clients can be serviced in parallel increasing the throughput of the overall system, and the server as a whole is far less prone to failure due to the increased redundancy.

One mechanism by which the constituent computing devices can agree upon the next function to execute is known as the Paxos algorithm. In the Paxos algorithm, as will be described further below, any device can act as a leader and transmit a suggestion for a proposal number to other devices within the distributed computing system. The other devices can respond with either an indication of the most recent proposal for which they have voted or an indication that they have not voted for any previous proposals. As explained above, each proposal can be transmitted with a proposal number, such that the proposal treated as most recent can be the proposal with the largest proposal number. To ensure that proposals with larger proposal number are the most recent proposal considered by the device, devices can ignore later-in-time proposals that have smaller proposal numbers than the largest proposal number the device is aware of.

Once the leader that transmitted the suggested proposal number receives the responses from the other devices, it can determine which function to propose. Once a vote is requested for a proposed function, each device will vote for the proposal unless it has, some time after the initial transmission of the proposal and prior to the requested vote, responded to a suggestion for a different proposal number. If a quorum of devices votes for the proposal, then the proposal is accepted, and the leader can transmit a message to all of the devices requesting that they execute the agreed upon function.

The Paxos algorithm, however, assumes that if a device fails, it merely stops acting and responding. Such a failure may occur if that device's network connectivity is severed, or if the device itself experiences a loss of computing ability, such as through a software error or a hardware failure. Malicious failures, also known as Byzantine failures, may not be properly handled by the original Paxos algorithm. A malicious failure can generally result in a device that appears to be functioning properly, and yet the results produced by the device are incorrect. Thus, a device experiencing a malicious failure may continue to communicate with the distributed computing system, but it may be transmitting false information that can interfere with the proper operation of the system as a whole.

To allow the distributed computing system to operate properly even if some of the constituent devices exhibit malicious failures, every device can require that each communication from another device authenticate the message and the propriety of the information contained within the message. The authenticity of messages can be achieved through encryption, such as public key cryptography, whereby the proper encryption and decryption of the message authenticates the message and verifies that it was not modified in transit. However, public key encryption schemes require a significant amount of computation, both for encryption and for decryption, and are, therefore, not ideal. A more efficient, and therefore more desirable solution is the use of message authenticators, which can use shared key encryption. A message authenticator can indicate if a message was modified in transit and can, thereby, verify the message. However, only the original recipient of the message may be able to verify the message. If that recipient forwards the message to another device, that device may not be able to verify the message if the original sender was malicious.

Proof of the propriety of information contained within a message can also be achieved without unduly taxing the resources of the distributed computing system. If any device receives messages from a number of sources greater than the number of devices suffering malicious faults, and each message contains the same information, then the device can trust that the content of the messages is true because at least one of those messages came from a properly functioning device. In mathematical terms, if the number of devices within the distributed computing system is represented by the variable "M", then the receipt, by any device, of M+1 messages each containing the same information is sufficient to prove that the information is true.

If a message is being forwarded, in order for the recipient device to believe the information contained in the messages is true, it also will need to receive M+1 messages. However, when messages are forwarded from a first device to a second device, the first device cannot know that each of the messages is properly authenticated for the second device. Nevertheless, even if messages from all of the malicious devices were in the collection that was forwarded, those malicious devices could affect at most M messages. Therefore if, after taking into account the possibility that as many as M messages are improperly authenticated, there still remain at least M+1 properly authenticated messages, the first device can know that the second device will believe the information contained in the messages. Thus, a collection of M+1+M, or 2M+1 messages, can allow the first device to prove the propriety of information contained in the messages, to a second device. By verifying the propriety of the information contained in the messages and the authenticity of the messages, a distributed computing system can properly operate in the face of Byzantine failures.

Distributed Computing System

Turning to the drawings, wherein like reference numerals refer to like elements, the invention is illustrated as being implemented in a distributed computing system, such as the exemplary distributed computing system 10 shown in FIG. 1. For ease of presentation only, the present invention will be described with reference to distributed computer system 10, comprising computing devices 11 through 19 of which devices 17 and 18 are malicious, and device 19 is a failed, but non-malicious device. As will be understood by those skilled in the art, the present invention is applicable to all distributed computing environments and is not intended to be limited in any way by the exemplary distributed computing system of FIG. 1, which has been simplified for presentation purposes. As will also be understood by those skilled in the art, the present invention does not require any foreknowledge of which devices are malicious or failed devices. Thus, while devices 17, 18 and 19 are presented as malicious and failed devices, respectively, such knowledge is provided to the reader for presentation purposes only. As will be illustrated, the operation of the invention does not depend on knowledge of the operation of any particular device.

Although not required, the invention will be described in the general context of computer-executable instructions, such as program modules, being executed by a computing device. Generally, program modules include routines, programs, objects, components, data structures, and the like that perform particular tasks or implement particular abstract data types. Moreover, those skilled in the art will appreciate that the invention may be practiced with many different computing devices, including hand-held devices, multi-processor systems, microprocessor based or programmable consumer electronics, network PCs, minicomputers, mainframe computers, and the like. As described above, the invention may also be practiced in distributed computing environments, such as distributed computing system 10, where tasks are performed by remote processing devices that are linked through a communications network. In a distributed computing environment, program modules may be located in both local and remote memory storage devices.

Figure 2:
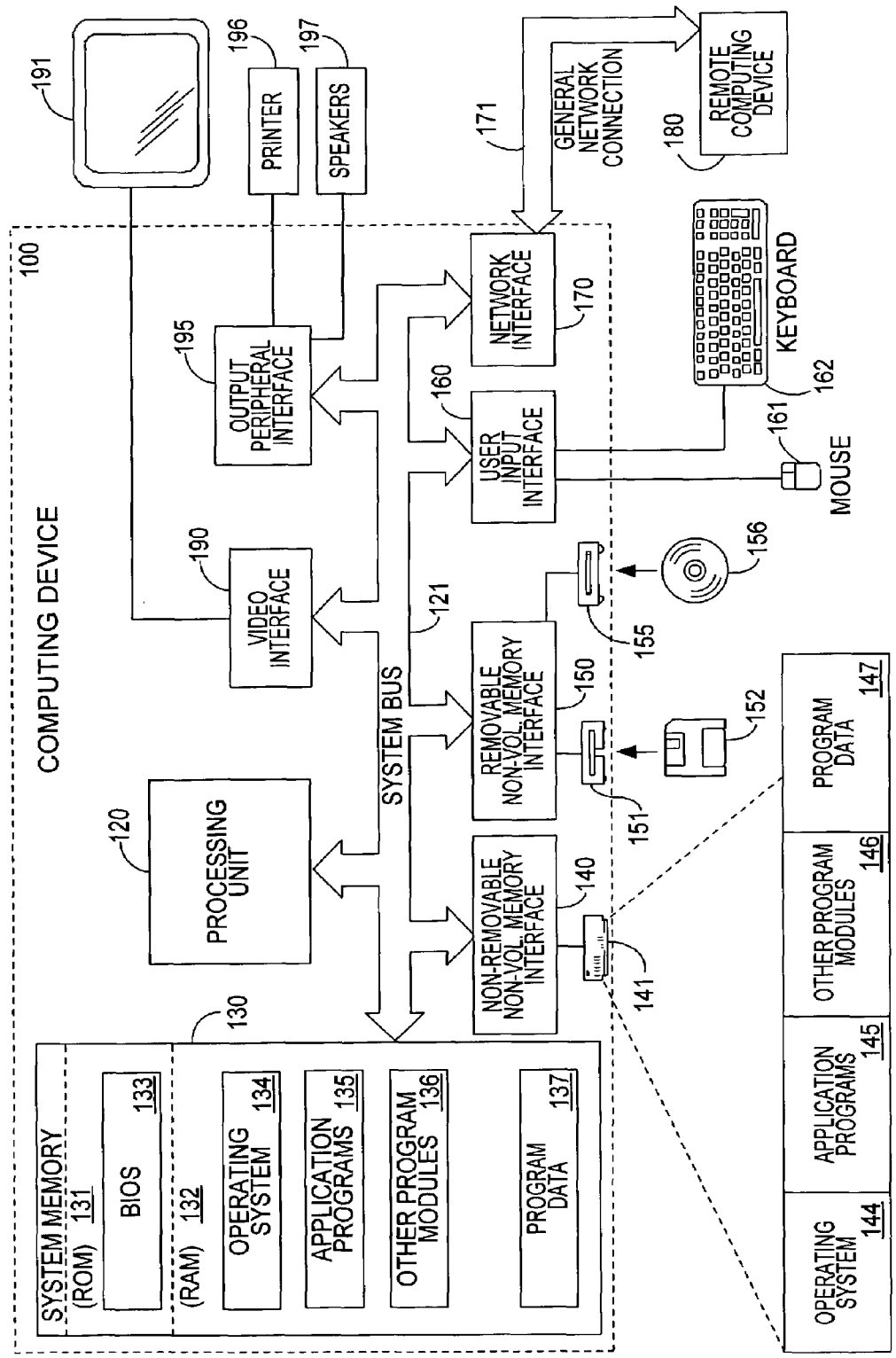
FIG. 2 is a block diagram generally illustrating an exemplary computing device with which the present invention can be implemented.

Turning to FIG. 2, an exemplary computing device 100 on which the invention may be implemented is shown. The computing device 100 is only one example of a suitable computing device and is not intended to suggest any limitation as to the scope of use or functionality of the invention. For example, the exemplary computing device 100 is not equivalent to any of the computing devices 10-19 illustrated in FIG. 1. The exemplary computing device 100 can implement one or more of the computing devices 10-19, such as through memory partitions, virtual machines, or similar programming techniques allowing one physical computing structure to perform the actions described below as attributed to multiple structures. Furthermore, the computing device 100 should not be interpreted as having any dependency or requirement relating to any one or combination of peripherals illustrated in FIG. 2.

The invention may be described in the general context of computer-executable instructions, such as program modules, being executed by a computer. Generally, program modules include routines, programs, objects, components, data structures, etc. that perform particular tasks or implement particular abstract data types. In distributed computing environments, tasks can be performed by remote processing devices that are linked through a communications network. In a distributed computing environment, program modules may be located in both local and remote computer storage media including memory storage devices.

Components of computer device 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computing device 100 typically includes a variety of computer readable media. Computer readable media can be any available media that can be accessed by computing device 100 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computing device 100 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computing device 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computing device 100 operates in a networked environment, such as that shown in FIG. 1, using logical connections to one or more remote computers. FIG. 2 illustrates a general network connection 171 to a remote computing device 180. The general network connection 171 can be any of various different types of network connections, including a Local Area Network (LAN), a Wide-Area Network (WAN), networks conforming to the Ethernet protocol, the Token-Ring protocol, or other logical or physical networks such as the Internet or the World Wide Web.

When used in a networking environment, the computing device 100 is connected to the general network connection 171 through a network interface or adapter 170, which can be a network interface card, a modem, or similar networking device. In a networked environment, program modules depicted relative to the computing device 100, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Overview

In accordance with the invention, a computing device in a distributed computing system can act as a leader and propose that a specific function be executed by the distributed computing system. If the device was not the leader which proposed the immediately prior agreed upon function, the device can initially seek to learn of pending proposals by suggesting a proposal number that it intends to use. This suggestion of a proposal number can be sent to at least a quorum of other devices in the distributed computing system. Each receiving device can send a response to the other receiving devices, indicating the most recent proposal for which the receiving device previously voted. Each device can then, based on the messages it has received from the other devices, independently determine safe proposals. A safe proposal is a proposal that can be agreed upon by the quorum. The determined safe proposals can then be sent to the leader that initiated the proposal, together with the messages from each device indicating the most recent proposal for which that device voted, as a proof that the safe proposals are indeed safe.

The leader device can select a safe proposal and submit that proposed function for a vote to a quorum of devices. The leader can also forward along, as a proof of the safety of the selected proposal, the messages received in response to the leader's suggestion of a proposal number. As will be shown, the quorum of devices from which the leader initially solicited a promise to vote need not be the same as the quorum to which the voting is submitted. Upon receiving a request to vote on a proposed function, a recipient device can determine that the proposal is safe and, if it is, the device can transmit a message to all of the other devices in the quorum, indicating that it will not vote for any other proposals that have the same proposal number as the current proposal. Each device can then independently determine if a quorum of devices have indicated that they will not vote for any other proposals having the same proposal number and, if a quorum has so indicated, each device can transmit a vote for the proposal to the leader as long as the device has not subsequently responded to a suggestion for a different proposal number, such as from a different leader. Upon receipt of messages voting for the proposed function from a quorum of devices, the leader can determine that the function has been agreed upon, and can transmit a message to all of the devices requesting that they execute the agreed upon function, and attaching the messages from the quorum of devices as proof that the leader is performing properly in requesting the execution of the agreed upon function.

State Machines

In a distributed environment, such as distributed system 10 illustrated in FIG. 1, coordination among devices can be a difficult task. One mechanism for avoiding difficulties inherent in relying on time as a coordinating factor is to model the distributed computing system in terms of a state machine where the performance of a function moves the state machine from one state to another. Thus, a state machine can be described with reference to a set of states, a set of commands, a set of responses, and functions that link each response/state pair to each command/state pair. A client of a state machine can issue a command which requests that the state machine execute a function. The function can then change the state of the state machine and produce a response.

The individual devices that comprise the distributed computing system can each execute the state machine of the system. The devices can, therefore, be coordinated by determining an initial state and then executing the same functions in the same order from then on. A device can be synchronized by simply determining the last function the device executed, locating that function in an ordered list of functions executed by other devices, and then directing the device to perform the remaining functions from the ordered list. Such a state machine approach was initially proposed in the article "Time, Clocks, and the Ordering of Events in a Distributed System," by Leslie Lamport published in *The Communications of the ACM*, Volume 21, Number 7, July 1978, the contents of which are hereby incorporated by reference in their entirety.

Paxos Algorithm

By using a state machine approach, the synchronization of the constituent devices 11 through 19 of the distributed computing system 10 becomes a problem of agreeing on the functions to be performed and the order in which to perform them. One method for agreeing upon a function to be performed is known as the Paxos algorithm. The Paxos algorithm allows the system 10 to operate properly even in the face of non-malicious failures, where devices can stop operating without advanced warning. The Paxos algorithm requires that at least a quorum of devices agree to a function before the system as a whole performs that function. A quorum can be a simple majority, or it can include more devices than that, depending upon the particular requirements of the system. However defined, a quorum can be sufficiently large such that any two quorums have at least one properly functioning, non-malicious device in common.

To maintain consistency, the system 10 can limit the performance of functions to a single function per step. Therefore, it can be desirable to select only a single function for a given step. Since any two quorums have at least one properly functioning, non-malicious device in common, the selection of no more than one step could be ensured by requiring that every device vote only for one proposal. However, if a number of devices simultaneously acted as leaders, such a requirement would cause a stalemate because it would be possible that none of the proposals was agreed to by a quorum, and yet none of the devices could vote for a proposal for a different function so that a quorum could eventually be reached.

The Paxos algorithm solves this problem through a multi-step process by which devices are allowed to change their votes, but leaders are constrained in the functions they propose. Using the Paxos algorithm, a leader can propose any function the leader chooses, unless the leader learns of a previously proposed function. If the leader has learned of at least one previously proposed function, that at least one device in the quorum has already voted for, the leader can propose the most recent of the previously proposed functions the leader has learned of. Each device need only track the most recent proposal that device voted for. If the device receives a proposal for which it has promised to vote, and it has not promised to vote for another proposal in the meantime, the device can cast a vote for the proposal. A device can only promise to vote for a proposal if the proposal has a larger proposal number than any other proposal the device has previously promised to vote for. The use of proposal numbers allows the system to achieve correct operation without the need to resort to complicated and expensive synchronization of clocks between the constituent devices. The most recent proposal will generally have the largest proposal number. If it does not, it can be ignored, as explained further below. When promising to vote for a proposal, the device can also transmit to the leader soliciting the votes the highest proposal number, that is less than the current proposal number, for which the device has previously promised to vote for. In such a manner the leader can always learn of previous proposals.

Figure 3A:
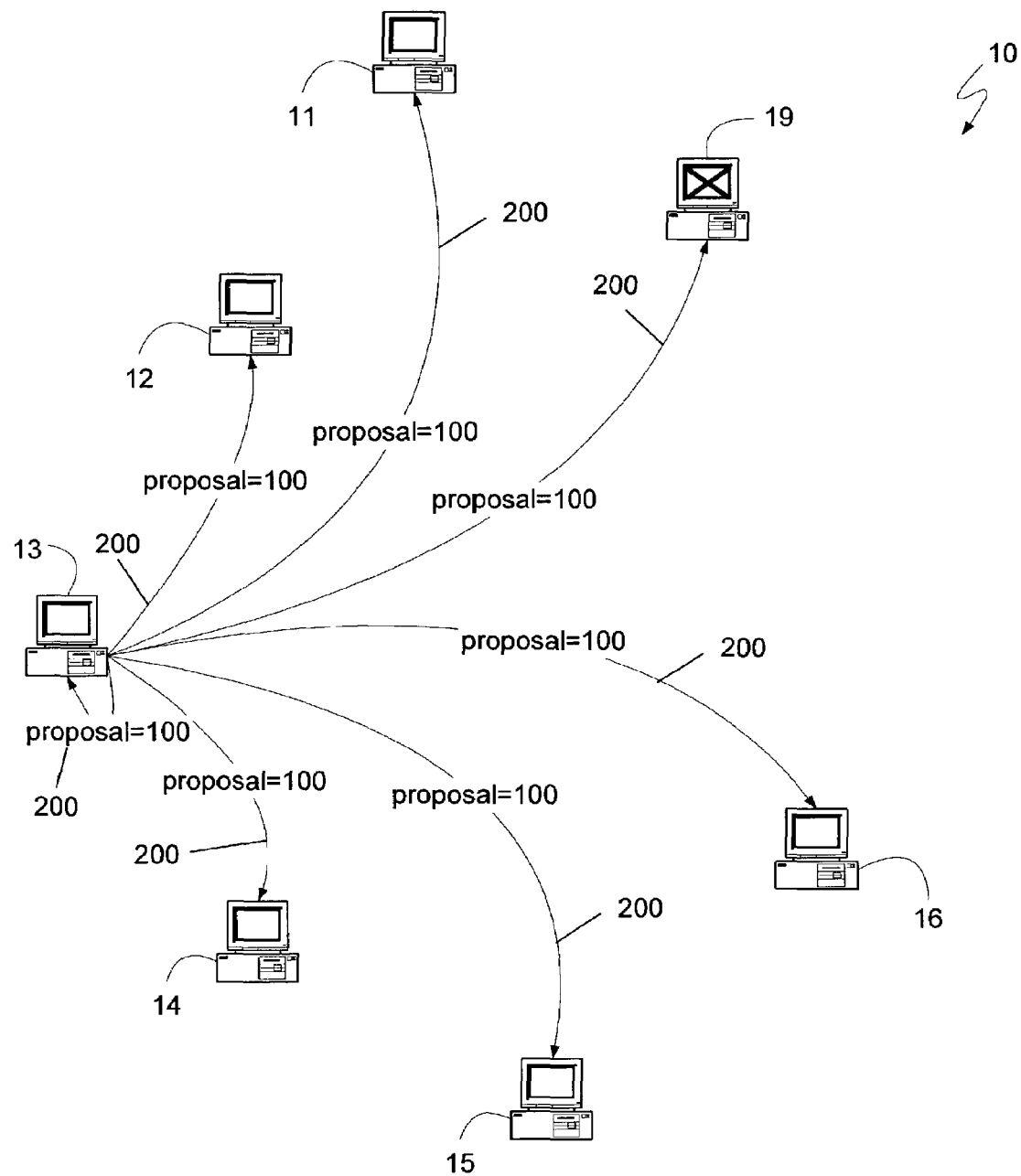
FIGS. 3a-e generally illustrate the operation of a consensus algorithm contemplated by the present invention.

Turning to FIG. 3a, the Paxos algorithm is explained in greater detail using the exemplary distributed computing system 10. Because, as will be explained, the Paxos algorithm does not operate properly in the face of Byzantine failures, the present description will treat the distributed computing system 10 as comprising seven devices: devices 11 through 16 and 19. Thus, a quorum can be defined as any group of four or more devices because such a definition will ensure that every quorum has at least one device in common. As shown in FIG. 3a, device 13 can assume a leadership position and transmit message 200 to devices 11-16, and 19, suggesting a proposal number for a proposal that the system execute a given function. Because device 13 can act as both a device and a leader, it sends itself message 200, though such a transmission could be handled internally to the device and need not be physically transmitted. Device 13 can select an arbitrarily large proposal number in an effort to ensure that there are no previous proposals with larger proposal numbers. Furthermore, because device 13 itself may have voted on previous proposals, it can select a proposal number that is larger than any proposal device 13 is aware of.

Because proposals can be ordered based on their proposal numbers, efficiencies can be gained by preventing two or more devices using the same proposal number for two or more different proposals. Therefore, proposal numbers can be selected by devices using mechanisms based on unique device properties, such as a Media Access Control (MAC) address of the device sending the proposal. Alternatively, proposal numbers can be partitioned among the devices, requiring each device to select proposal numbers only from among its partition. One method for partitioning the proposal numbers would be to grant to the "$i^{th}$" device proposal numbers congruent to "i" modulo the number of devices in the system.

Because, as will be shown, the Paxos algorithm can operate even if a number of devices act as leaders, the mechanism by which a device assumes a leadership position is not important. Nevertheless, a mechanism that minimizes the chances that different devices can simultaneously believe they are the leader can increase the efficiency of the system. For example, mechanisms based on unique device properties, such as a MAC address, can reduce the chance of having more than one simultaneous leader. One such mechanism could simply select a properly functioning device with the smallest MAC address to be the next leader. In addition, a leader selection mechanism could prevent a device from attempting to become a leader if the device has already received a message from another device acting as a leader within a pre-determined amount of time, to prevent a constant changing of the leadership device. Such constant leadership change can introduce inefficiencies into the operation of the system.

Figure 3B:
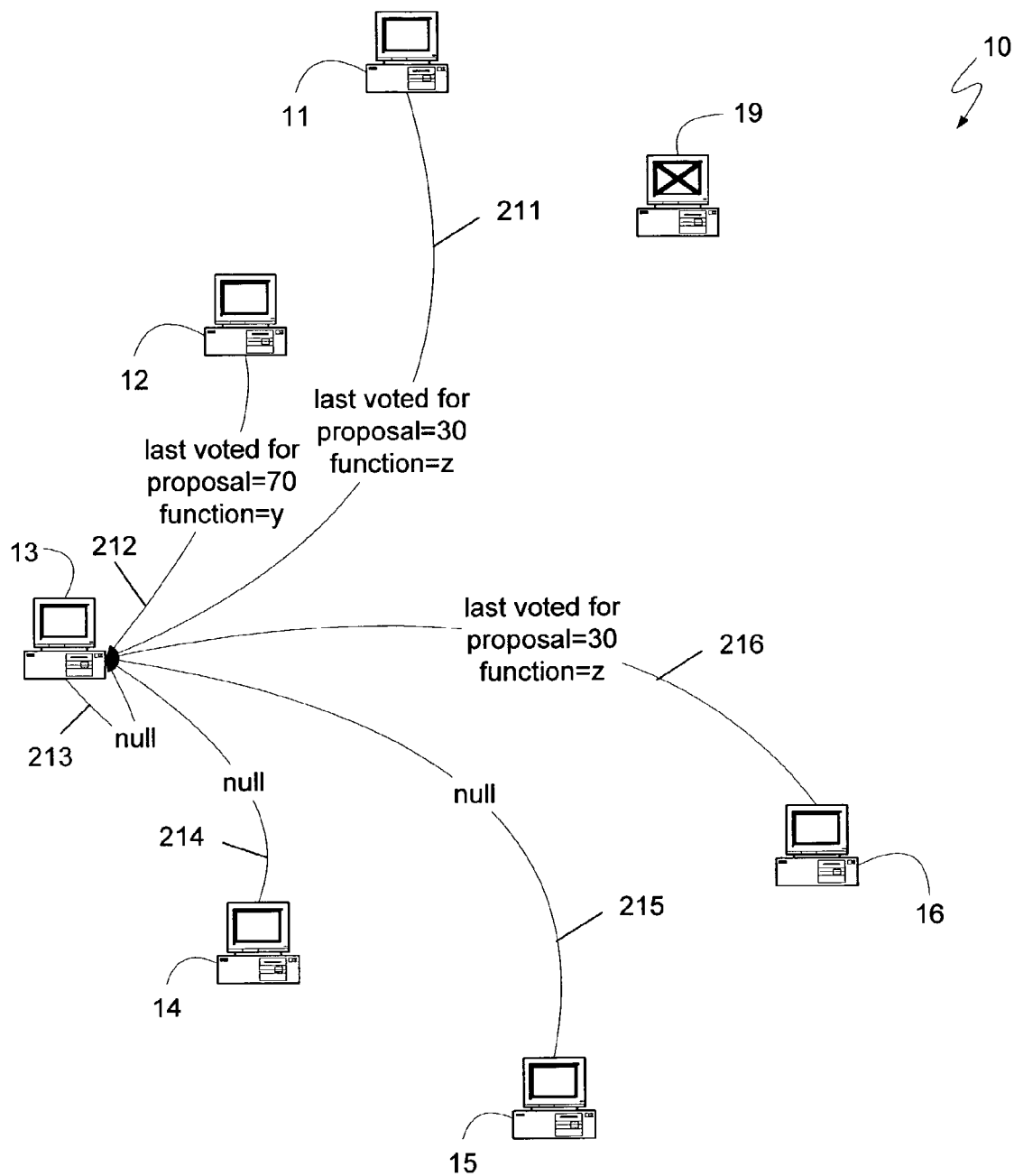

Turning to FIG. 3b, upon receipt of a message, such as message 200, suggesting a new proposal number, each device 11-16 can respond with message indicating the largest proposal number, that is still less than the proposal number suggested by message 200, and the function proposed by it, for which that device has cast a vote. If the device has cast a vote for a proposal number that is greater than the proposal number used by the leader, the device can ignore the message from the leader, or, as will be explained below, the device can respond with the last vote information despite the larger proposal number. In the exemplary condition shown in FIG. 3b, device 12 has previously voted for proposal number 70, which had proposed that the system 10 execute a function identified by the variable "y". Thus, in response to message 200, device 12 can send message 212 indicating that it last voted for proposal number 70, which proposed the execution of the function "y". Similarly, devices 11 and 16 previously voted for proposal number 30, which had proposed that the system 10 execute a function identified by the variable "z". Messages 211 and 216 can, therefore, convey this last vote information of devices 11 and 16 back to device 13. Devices 13-15 may not have received any proposals and have, therefore, not previously cast a vote for any proposal. They can, therefore return a null response, as indicated by messages 213-215. Again, as above, messages sent from device 13 to itself can be handled internally by device 13, but are illustrated for explanatory purposes. Also, because device 19 may be experiencing a fault, such as a connection problem, it may not respond to message 200.

Figure 3C:
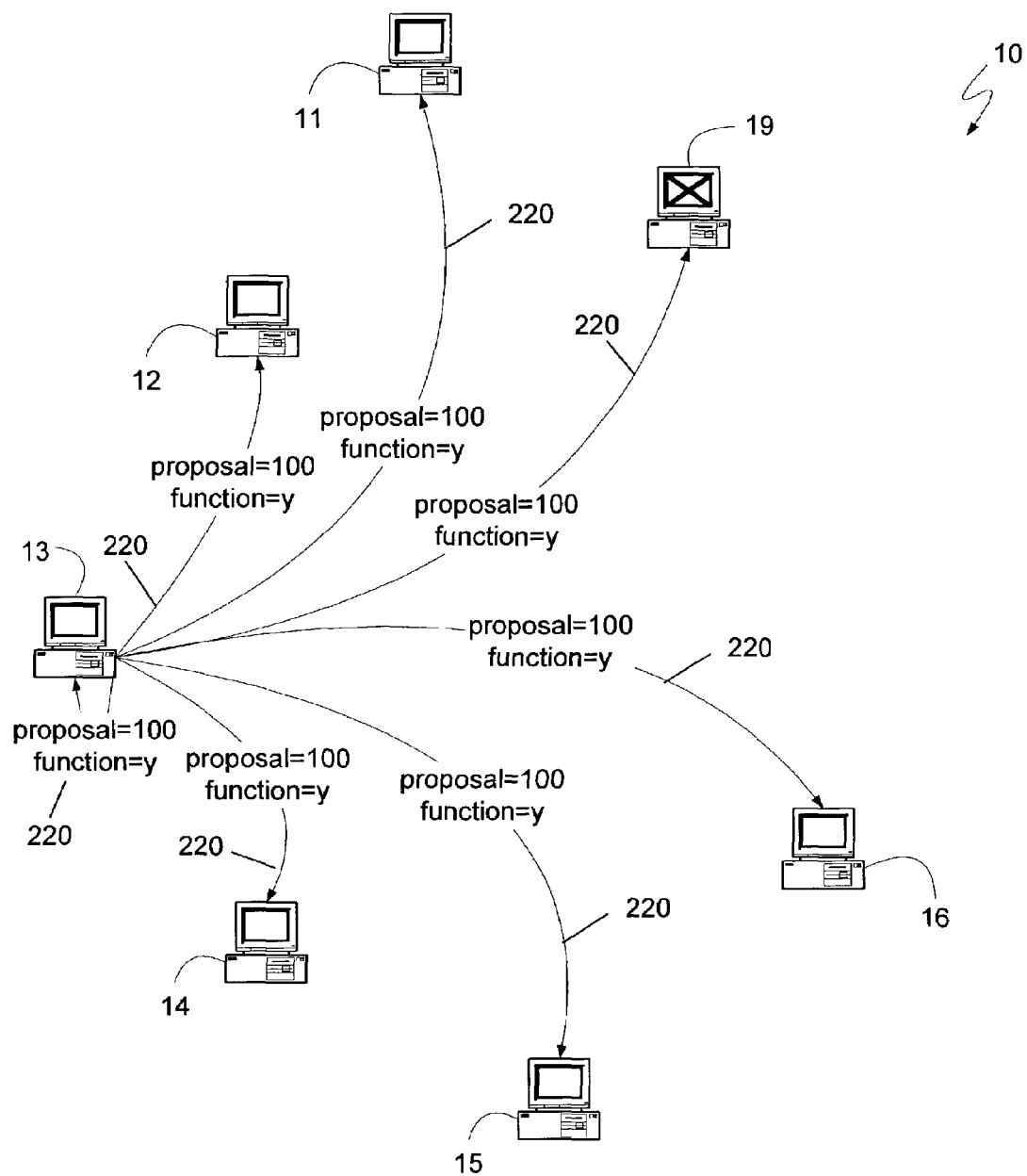

Turning to FIG. 3c, when the leader 13 receives messages 211-216, the leader can determine an appropriate function to propose such that the function proposed is equivalent to the function with the largest proposal number that was voted on by any member of the quorum. If none of the quorum members had voted on any previous proposal, then the leader is free to select whichever function the leader wishes to propose. Therefore, given the messages 211-216 illustrated in FIG. 3b, device 13 can select to solicit votes for the execution of function "y" as that function was voted for by device 12 as part of proposal number 70, which is the proposal with the largest proposal number of which the leader 13 has learned. However, because the system 10 illustrated in FIGS. 3a through 3e contains 7 devices, including at most one device suffering a failure, a quorum can be as few as four devices. Thus, it is sufficient for the leader 13 to solicit votes for a proposal from devices 11 and 13-15 only. In such a case, the leader 13 need not propose the function "y" because device 12 is not a member of the selected quorum. Instead, the leader 13 can propose the function "z" as that function was voted for by devices 11 and 16 as part of proposal number 30. Because proposal number 30 is the largest proposal number voted on by devices in the quorum, the leader can select function "z" to be submitted to a vote.

Returning to FIG. 3c, the leader 13 is shown selecting a quorum consisting of all of the devices of the system 10, and transmitting a message 220 seeking a vote on the execution of function "y" by the system 10. Upon receipt of message 220, each device can determine whether to vote for function "y". A device can vote for a function so long as the device has not responded to a suggestion of a new proposal having a larger proposal number than the proposal for which the vote is currently being requested. Thus, for the example illustrated in FIG. 3c, if any of the devices 11-16 had received and responded to another suggestion for a new proposal, having a proposal number greater than 100, prior to leader 13 sending message 220 as shown in FIG. 3c, then that device may not vote for the function for which a vote was solicited by message 220.

Figure 3D:
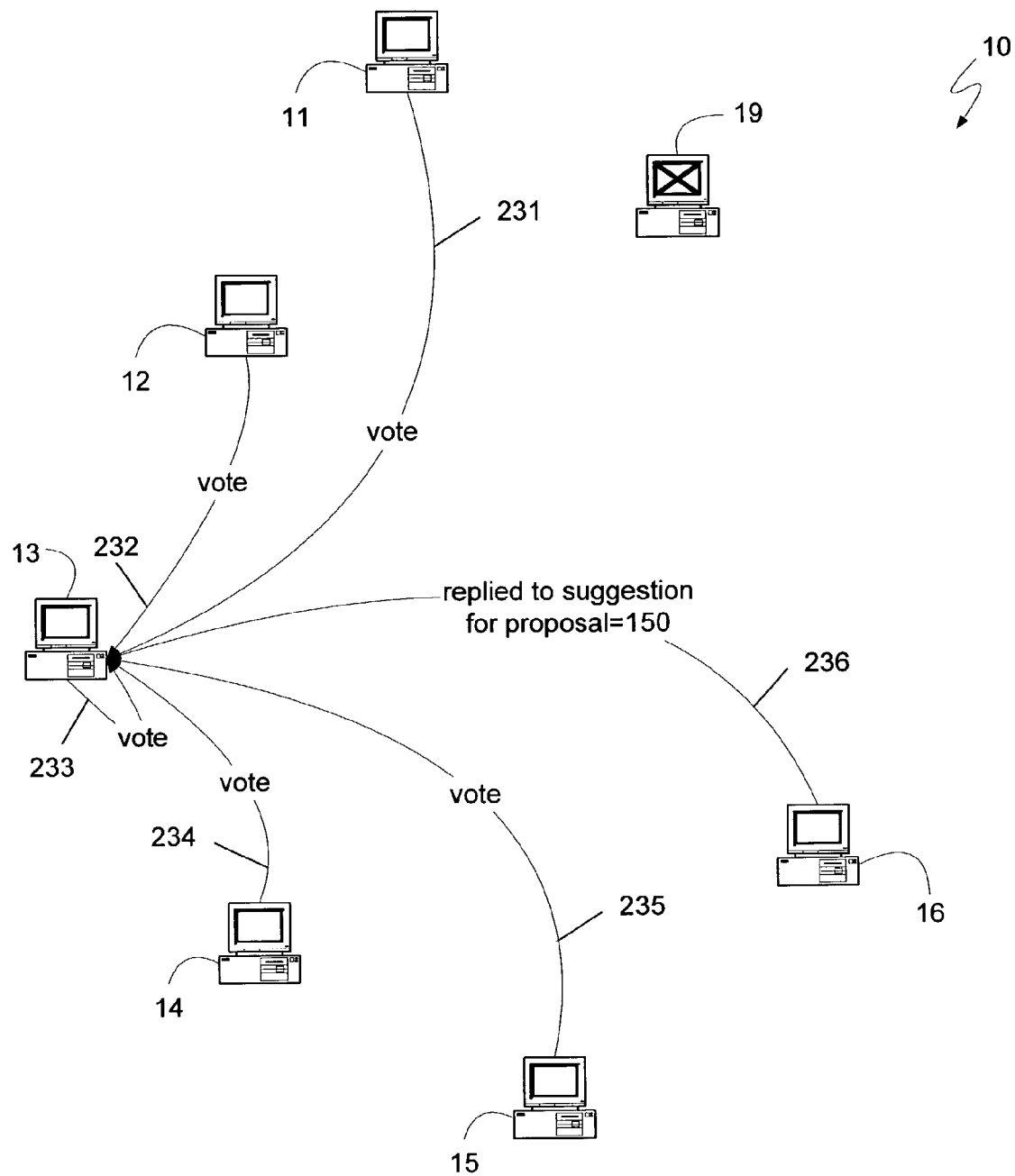

Turning to FIG. 3d, each of the devices 11-15 has independently determined that they have replied to no other suggestions for new proposals with proposal numbers greater than 100. Therefore, because the last suggestion for a new proposal to which they responded is not for a proposal with a larger number than the current proposal, devices 11-14 vote for the proposal and indicate their votes in messages 231-234, respectively. As before, message 233 is shown for illustration purposes, and could be handled internally to device 13. Device 16, however, may have, sometime prior to the transmission of message 220, received and responded to a suggestion for a new proposal with a proposal number greater than 100. Therefore, upon receipt of message 220, device 16 determined that it had already responded to a suggestion for a new proposal with a number greater than 100 and could not, therefore, vote for proposal 100. As a result, as shown in FIG. 3d, device 16 responds with message 236 informing the leader 13 that it has responded to suggestion for a proposal with a proposal number of 150. If leader 13 determines that it needs the vote of device 16, it can send another message, similar to message 220, except with a proposal number greater than 150. Alternatively, device 16 need not respond to message 220, and device 13 can, if it needs device 16's vote, attempt another vote with a proposal with an arbitrarily large proposal number. As can be seen, if device 16 does not indicate the larger proposal number to leader 13, the leader may have to guess and could waste resources guessing, through multiple messages, an appropriately large proposal number.

Figure 3E:
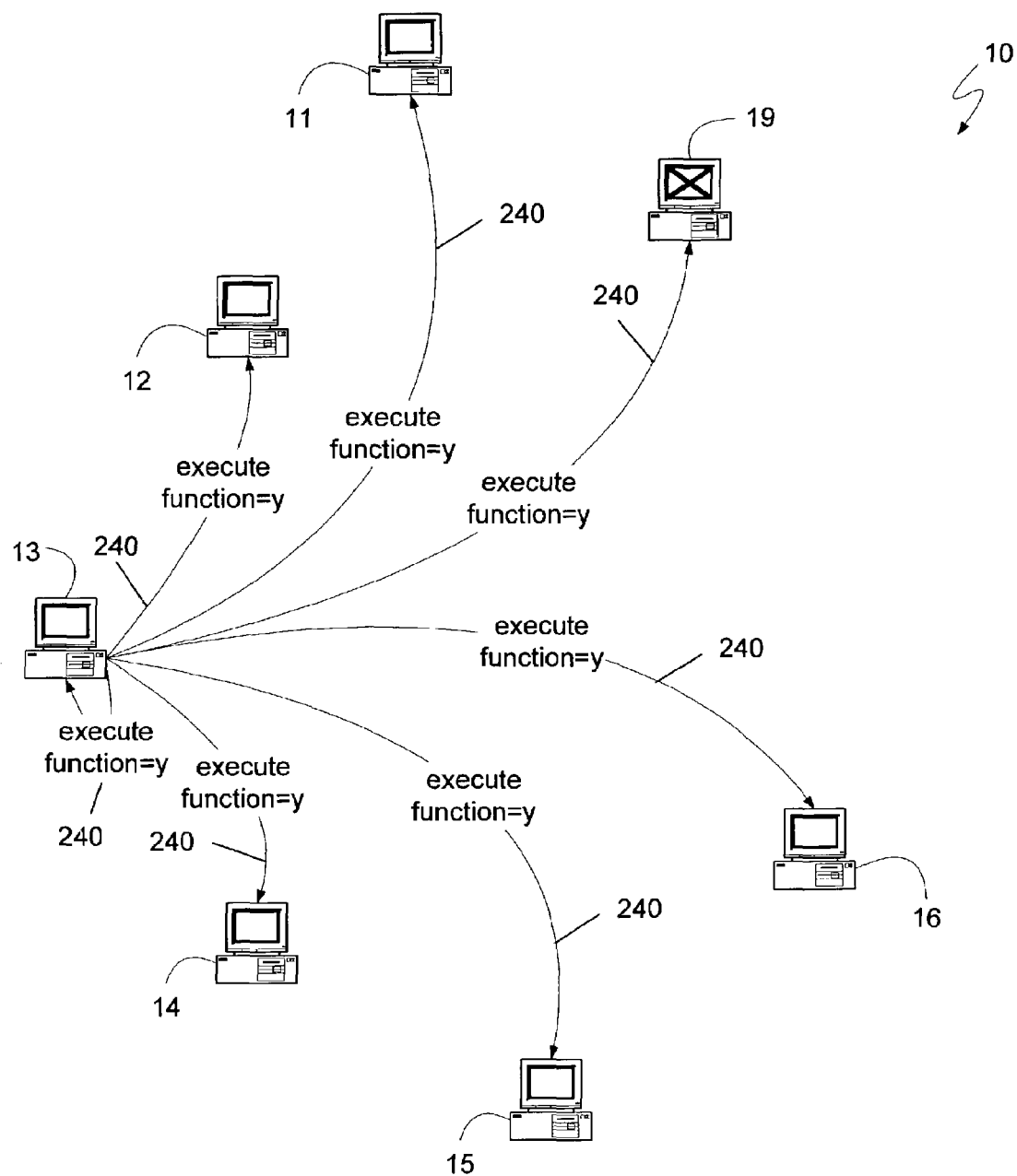

However, because devices 11-14 are sufficient to constitute a quorum, the leader 13 can determine that the proposal has been accepted, even without the vote of device 16, and can request, with message 240 as shown in FIG. 3e, that each of the devices 11-16 execute function "y". While devices 11-14 do constitute a quorum, it is not the same quorum to which leader 13 submitted the proposal to a vote, which included devices 15 and 16. However, as described above, a leader need only receive votes from a quorum, and not necessary the same quorum to which the request was sent, to determine that the proposal has been accepted. The Paxos algorithm described above ensures that only a single function is selected and executed by the system 10 for any given step in its operation. For example, if another device that was previously non-operational, such as device 19, became operational and re-joined the system 10, it might try to propose a function different from "y" for the same step for which the system had selected and executed "y". If device 19 sent a proposal with a proposal number less than 100, it could be ignored by each of the devices 11-16, since they had already voted on proposal number 100 as shown in FIG. 3d. If device 19 sent a proposal with a proposal number greater than 100, such as proposal number 130, each of the devices 11-15 would return a message indicating that they had voted for function "y" in proposal number 100. Device 16, because it may not have voted, as illustrated in FIG. 3d, might respond with message 216, indicating that it had voted for function "z" in proposal number 30.

Device 19 could then select the largest proposal among a quorum, which, by definition would include at least some of the devices 11-15, and submit the function proposed in that proposal for voting. Thus, for proposal 130, device 19 would submit function "y" for a vote. Each device could then vote on proposal 130 following the algorithm set forth above. Either proposal 130 would be selected, which would not change the prior decision to execute the function "y" for the particular step, or proposal 130 would fail because too many devices had, in the meantime, promised to vote for another proposal. However, as can be seen, once a proposal is passed, all other proposals will propose the same function, and, by definition, all of the devices can only vote for that same function. In such a manner the Paxos algorithm ensures that every device the system 10 executes the same function for a given step.

Figure 4A:
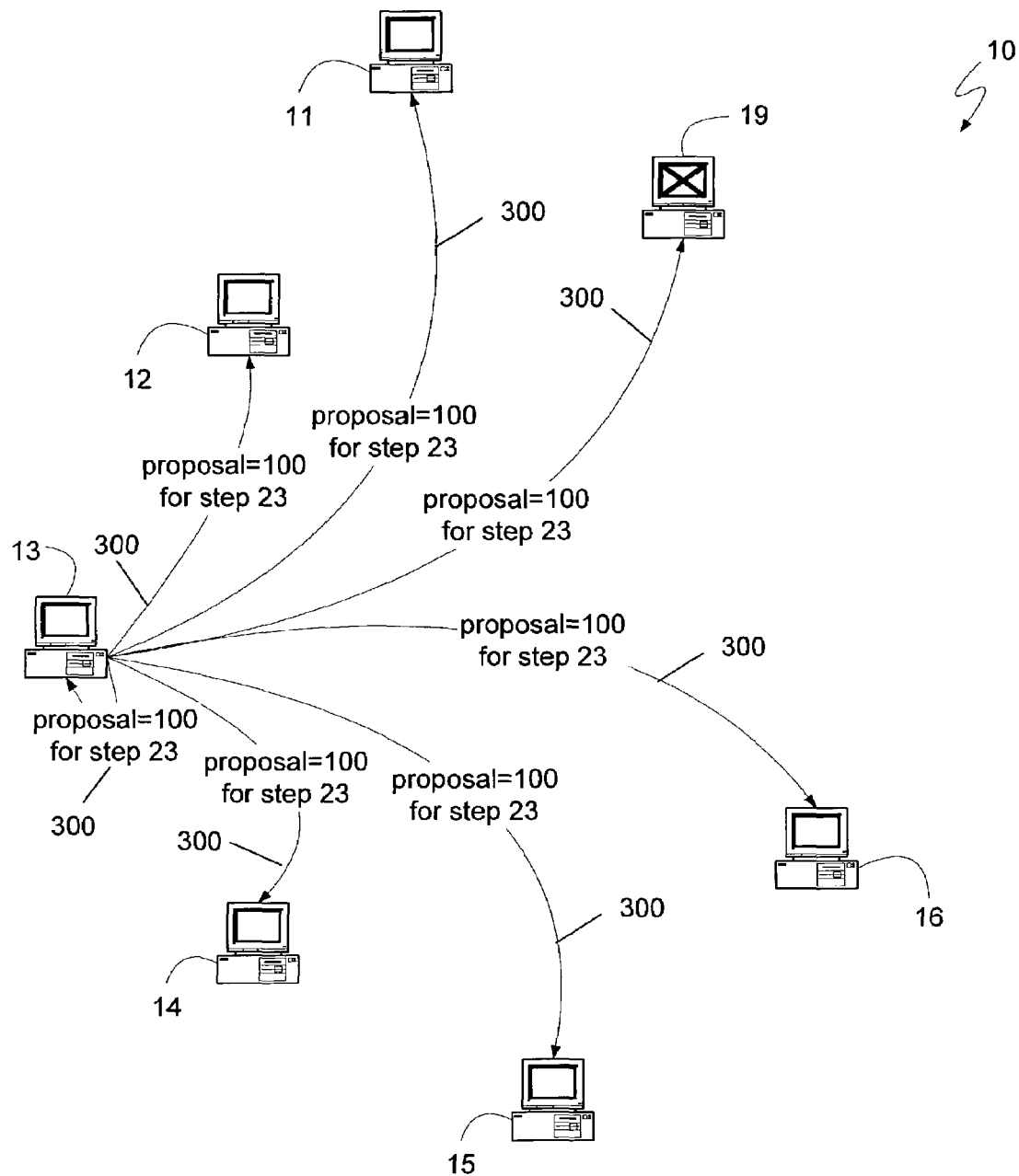
FIGS. 4a-g generally illustrate the operation of a multi-step consensus algorithm contemplated by the present invention.

By repeating the Paxos algorithm, a distributed computing system can agree upon a series of functions to be performed as a series of steps, and can thereby form a continuously operating system. FIGS. 3a-3e, described above, illustrated the application of the Paxos algorithm to the determination of a function to execute for a given step in the operation of the system 10. Turning to FIG. 4a, the system 10 can have already been operational for a number of steps. For example, in the exemplary system 10 illustrated in FIG. 4a, the most recently executed step can be step 24, and step can be is the current step. However, the device that was previously acting as a leader can have failed, leaving the system 10 without a leader. Device 13 can, according to any number of mechanisms, such as those described above, determine that it should attempt to become a leader. As such, device 13 can send message 300 suggesting the use of proposal number 100 for the next proposal, and including the step for which the proposal is being made. In the exemplary distributed computing system 10 of FIG. 4a, device 13 is not aware that steps 23 and 24 have already been decided upon and executed by the other devices 11, 12, and 14-16. Thus, message 300 indicates that it is suggesting a proposal numbered 100 for step 23.

To expedite the operation of the algorithm in a system executing multiple steps, a message, such as message 300, can be understood to suggest a proposal numbered 100 for all steps greater than or equal to step 23. In such a manner, the leader 13 need not continually transmit messages, such as message 300, as it learns of every step that has already been decided. Instead, the leader 13 can learn of the already executed steps through only one message round trip, as will be shown. If device 13 included a proposed function is message 300, then additional information, indicating that the proposed function applied only to step 23 and was not intended to apply to all steps greater than 23, could also be included in message 300.

The above algorithm could be used for each step greater than or equal to step 23, with the devices 11-16 responding with the largest proposal number for which they voted for each step greater than or equal to step 23, and then the leader 13 proposing the function proposed by the largest proposal number and getting that function approved. Because the above algorithm will not allow leader 13 to propose any function other than the functions that have already been executed by the system 10 for those steps, there is no risk in performing the algorithm for each step greater than or equal to step 23. However, such a procedure can be easily avoided by simply having devices inform the leader of previously performed steps. Avoiding the performance of the above described algorithm for every step, when some devices may already have knowledge of the function executed at that step, can increase the efficiency of the overall system by decreasing the number of transmitted messages. In such a manner, the leader 13 can learn of already executed steps through only one message round trip, as illustrated in FIGS. 4a and 4b.

Figure 4B:
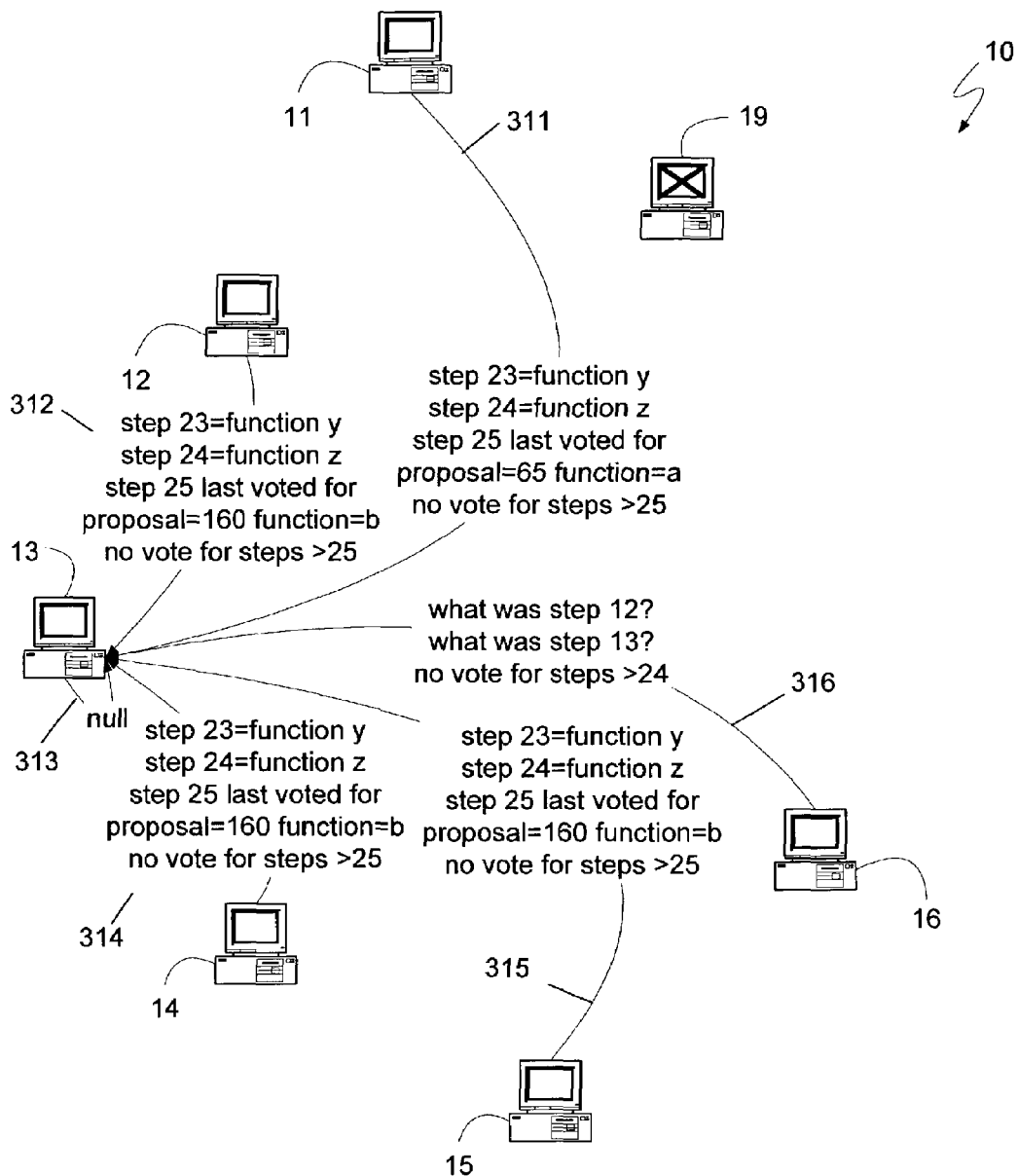

Turning to FIG. 4b, response messages 311-316 from the devices 11-16 of distributed computing system 10 are shown, with device 19 not responding due to a failure. Device 12, for example, has recorded that function "y" was performed for step 23 and function "z" was performed for step 24. Thus, upon receipt of message 300 seeking to propose a function for step 23, device 12 can respond with message 312 indicating the functions it has stored as being performed for all steps greater than or equal to 23; in this case steps 23 and 24 only. Similarly, devices 14 and 15 have the same information, and can transmit similar messages 314 and 315 providing the functions executed for all steps greater than or equal to step 23. In addition, devices 12, 14, and 15 can provide an indication of the proposals with the largest proposal numbers for which they have voted for steps greater than or equal to 25. Thus, in the example illustrated in FIG. 4(*b*), messages 312, 314, and 315 indicate that devices 12, 14, and 15 did not vote for any proposals for steps greater than 25, and that they voted for proposal number 160, proposing function "b" for step 25.

Device 11, in addition, to having a record of the functions performed at steps 23 and 24, has also voted for a proposal for step 25 with a proposal number 65, though it too has not voted for any proposals for steps greater than 25. Because message 300 can be thought of as a proposal, having a proposal number of 100, for all steps greater than or equal to step 23, any proposals that have been voted for, for any steps greater than or equal to step 23, can be provided in response. However, to decrease the number of messages being transmitting within the system 10, devices need only respond with their highest proposal number votes if they do not know of a function that has been executed for the given step. Thus, because device 11 already is aware that functions were executed for step 23 and 24, but not step 25, it need only respond with proposals numbered less than 100 that it has received for step 25 or greater. As a result, message 311, as shown in FIG. 4b, transmits an indication that function "y" was performed for step 23, function "z" was performed for step 24, proposal 65, proposing function "a", was voted on by device 11, and device 11 did not vote for any proposals for steps greater than 25.

As before, device 13 can act as both a leader and a voting device. As such, device 13 can send itself messages, such as message 300, and it can respond to itself with messages such as message 313. Such messages are shown in the figures for illustrative purposes only, as they would likely be transmitted internally to device 13. Furthermore, because device 13 can check what is the step with the largest step number for which it knows the function executed, and it can check what the largest proposal number is for the proposals for all steps above that which device 13 voted for, message 313 should rarely contain any information other than a null indicator. If message 313 does contain additional information, device 13 acting as a leader may not have properly selected the step for which to suggest a proposal number, and may not have properly selected the proposal number.

The current state of a state machine may depend, not only on the functions that were executed, but on the order in which those functions were executed. Therefore, if a device does not know which function was executed for a given step, there may be situations in which that device should not execute any functions beyond that step or it will execute functions out of order and its state will be different from that of the distributed computing system. For example, some functions, such as functions that specify a new state unconditionally, are independent of the current state of the device. Such functions can be executed even if functions for steps having lower step numbers than the current step have not yet been executed. Similarly, functions for which the output can be computed without knowing all of the previous steps, such as writing to a database, can also be partially executed out of order to generate the output to be sent to the client. In general, however, a function should not be executed until all previous functions have been executed. Therefore, a device can always attempt to learn which functions were executed for a step that the device missed. When device 13 sends message 300, as shown in FIG. 4a, it is an implicit statement that device 13 believes that step 23 is the next step and that it has executed the agreed upon functions through step 22. A device that is missing a function for a step below step 23, therefore, knows that device 13 has executed all of the functions through step 22, and it can request that function from device 13.

Returning to FIG. 4b, device 16 does not know which functions were executed for steps 12 and 13. As a result, device 16 may have been unable to execute any functions since step 11, even though it may know the functions executed for steps 14-23. Thus, in message 316, device 16 can request the functions for steps 12 and 13 from the leader 13. In addition, device 16 can indicate that it has not voted on any proposals for step 25 or higher numbered steps.

If a device, such as device 16, has missed too many steps, it can be more efficient to simply inform the device of the current state rather than transmitting all of the functions for all of the steps it has missed. One mechanism for ensuring that a device does not miss too many steps is to enable each device, or a collection of devices to periodically take a snapshot of the various parts of the state, or the whole sate. The state of another device could, therefore, be updated by sending it the appropriate snapshot together with the functions that were executed since the latest snapshot. Additionally, by using checksums of individual parts of the state, the state of another device could be updated by just sending that other device the parts of the state that differ from its current copy.

As a result of receiving messages 311 through 316, the leader 13 can attempt to determine the appropriate function to propose for step 25, and can respond to questions regarding earlier steps posed by devices. However, the leader 13 originally suggested a proposal number of 100 in message 300, but devices 12, 14 and 15 responded with messages 312, 314 and 315, respectively, indicating that they had already voted for a proposal with a larger proposal number than 100 for step 25. As a result, leader 13 can select a proposal number greater than the largest proposal number of which the leader is aware of and transmit another suggestion message such as message 320 shown in FIG. 4c.

Alternatively, devices 12, 14 and 15 could have simply ignored the suggestion for proposal number 100 in message 300 because the proposal number was less than the proposal number of the proposal for which devices 12, 14 and 15 had already voted for. In such a case, the leader can retry by increasing the proposal number to attempt to account for devices that ignored the initial suggestion for a proposal number because the proposal number was too low. As can be seen, if devices ignore suggestions for proposals with proposal numbers that are less than the proposal numbers of the proposals for which the devices had already voted, the leader may be forced to perform multiple retries, each time increasing the suggested proposal number. Such multiple messages can be inefficient. It may, therefore, be preferable for devices to respond to all suggestions for a new proposal number, even if the proposal number is less than the proposal numbers of the proposals for which the devices had already voted, because the leader can then determine, with greater precision, an appropriate proposal number to suggest, and can avoid multiple messages.

Figure 4C:
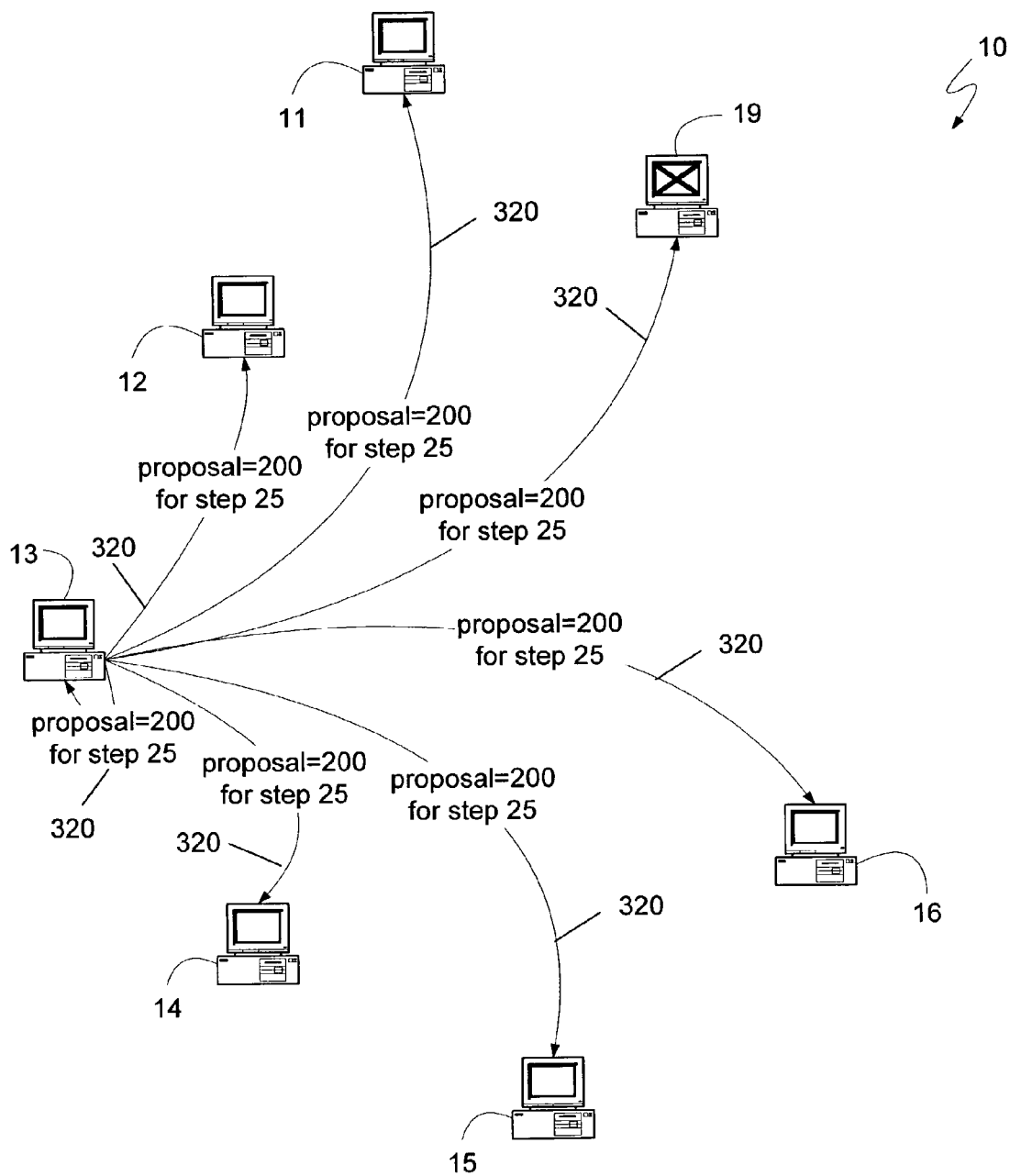

Turning to FIG. 4c, the leader 13 can suggest a larger proposal number, such as proposal number 200 as shown in message 320, in an attempt to suggest a proposal number that is larger than the number of any proposal which leader 13 has learned that a device has previously voted for. Thus, because messages 312, 314 and 315 from devices 12, 14 and 15, respectively, indicated that those devices had previously voted for a proposal whose number was 160, leader 13 selected proposal number 200 in the second attempt to suggest a proposal number, as shown in FIG. 4c.

Figure 4D:
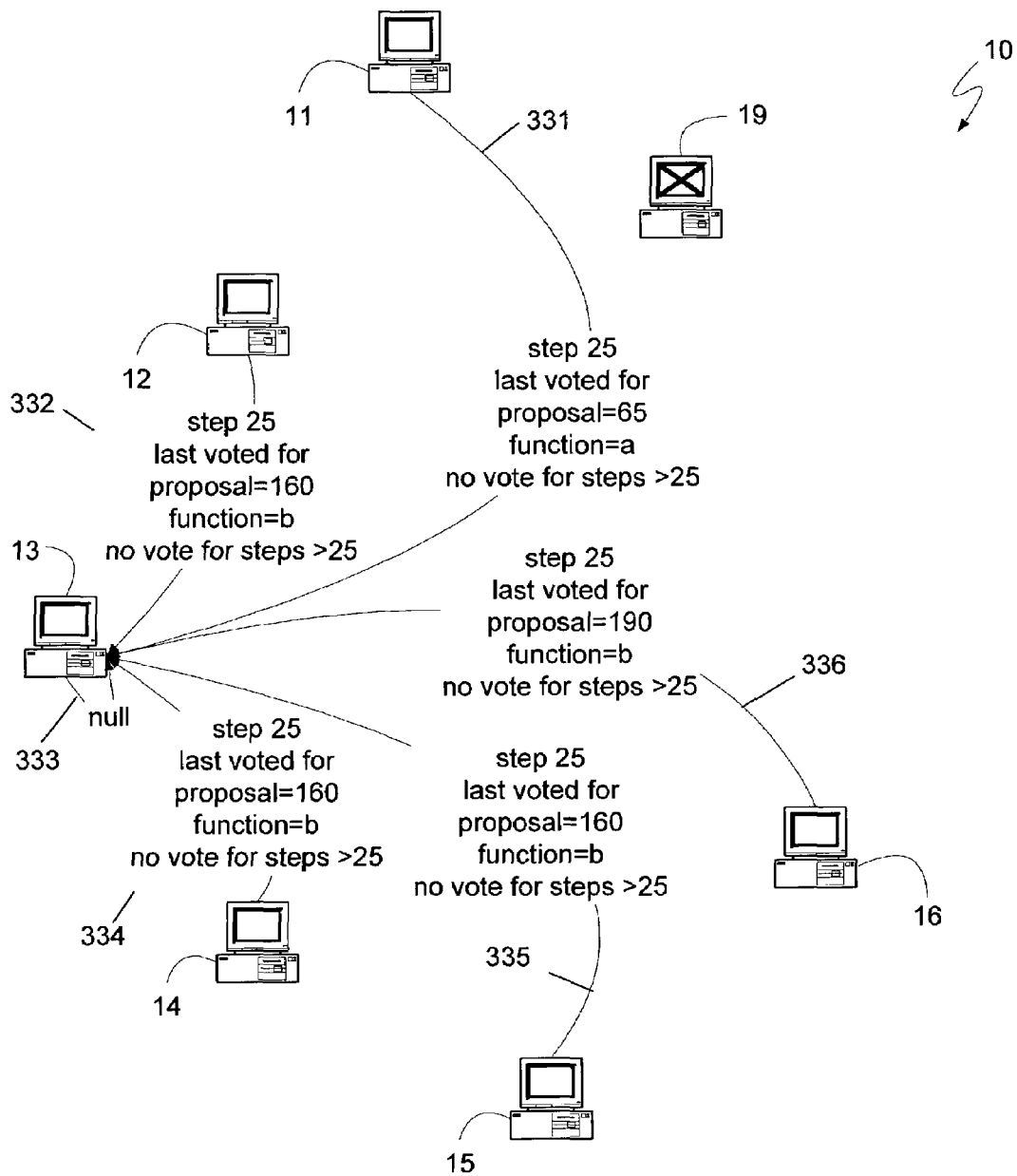

In FIG. 4d, then, the devices 11-16 can respond, in a manner similar to that shown above in FIG. 4b, with the exception that devices 11-16 need not inform device 13 of executed functions for steps 23 and 24, as device 13 has already learned of these steps through messages 311-316 and, in message 320, device 13 specified step 25 as the step for which it was suggesting proposal 200. Furthermore, messages 331-336 can contain additional information than messages 311-316, such as for additional proposals for which the devices may have voted for. For example, device 16 may have, sometime between the transmission of message 316 and message 336, voted for a proposal with a proposal number 190. Consequently, message 316 indicated that device 16 may not have previously cast a vote for any proposal for step 25, but message 336 can indicate that device 16 has voted for proposal 190 for step 25, though it has still not voted for any proposal for steps greater than 25. However, because each of the proposal numbers are less than the suggested proposal number the leader 13 sent in message 320, the leader can proceed to propose a function with the proposal number 200 specified in message 320.

Figure 4E:
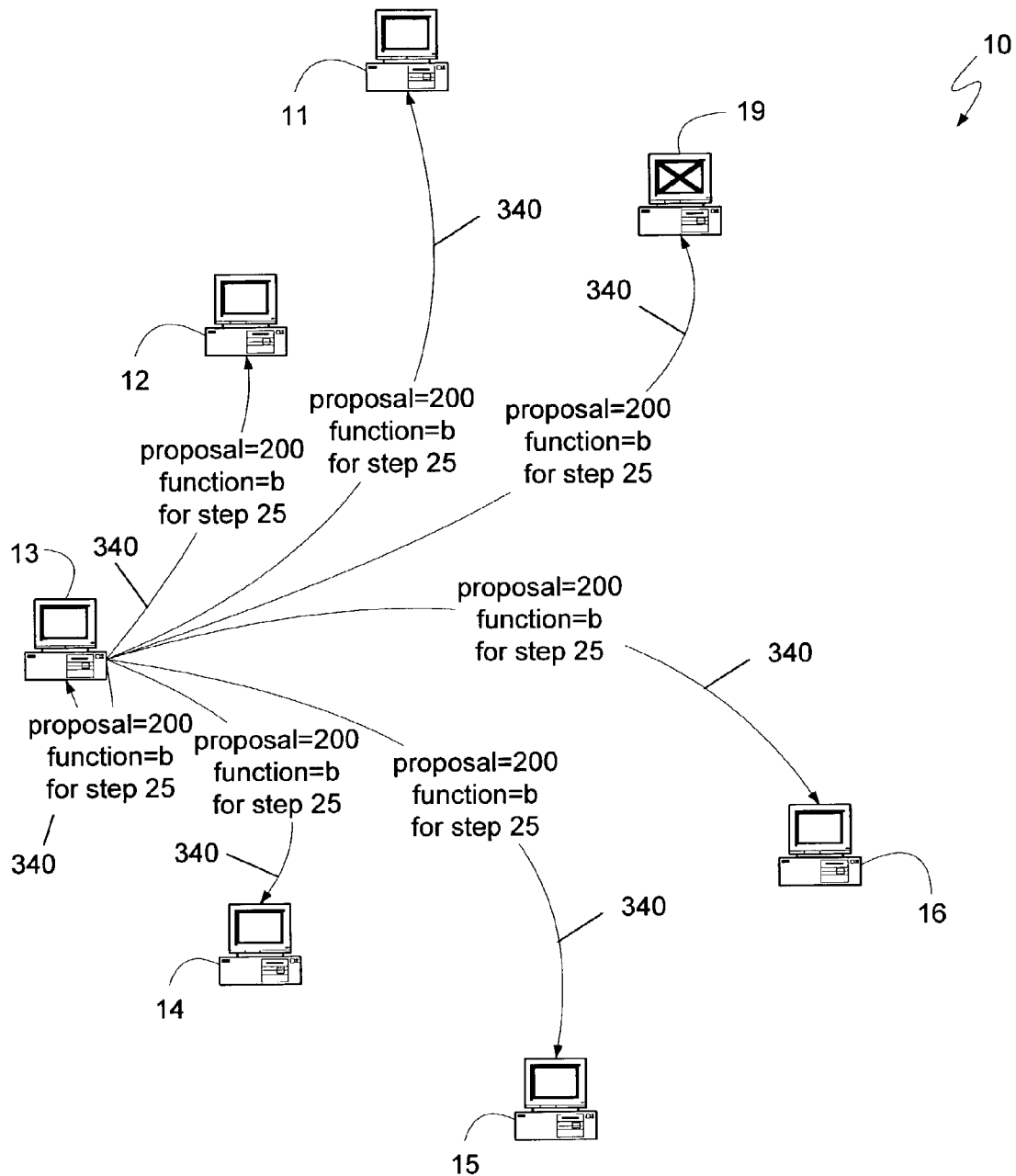

Turning to FIG. 4e, the leader 13 now has sufficient information with which to select a proposal to submit as proposal number 200, as illustrated by message 340, which requests that devices 11-16 vote on proposal 200, proposing that the system execute function "b" for step 25. As before, because devices 12, 14 and 15, all members of a quorum, have previously voted for proposal number 160, proposing the execution of function "b", and no other member of the quorum has voted for a larger numbered proposal, the leader 13 can propose function "b" for proposal number 200

Figure 4F:
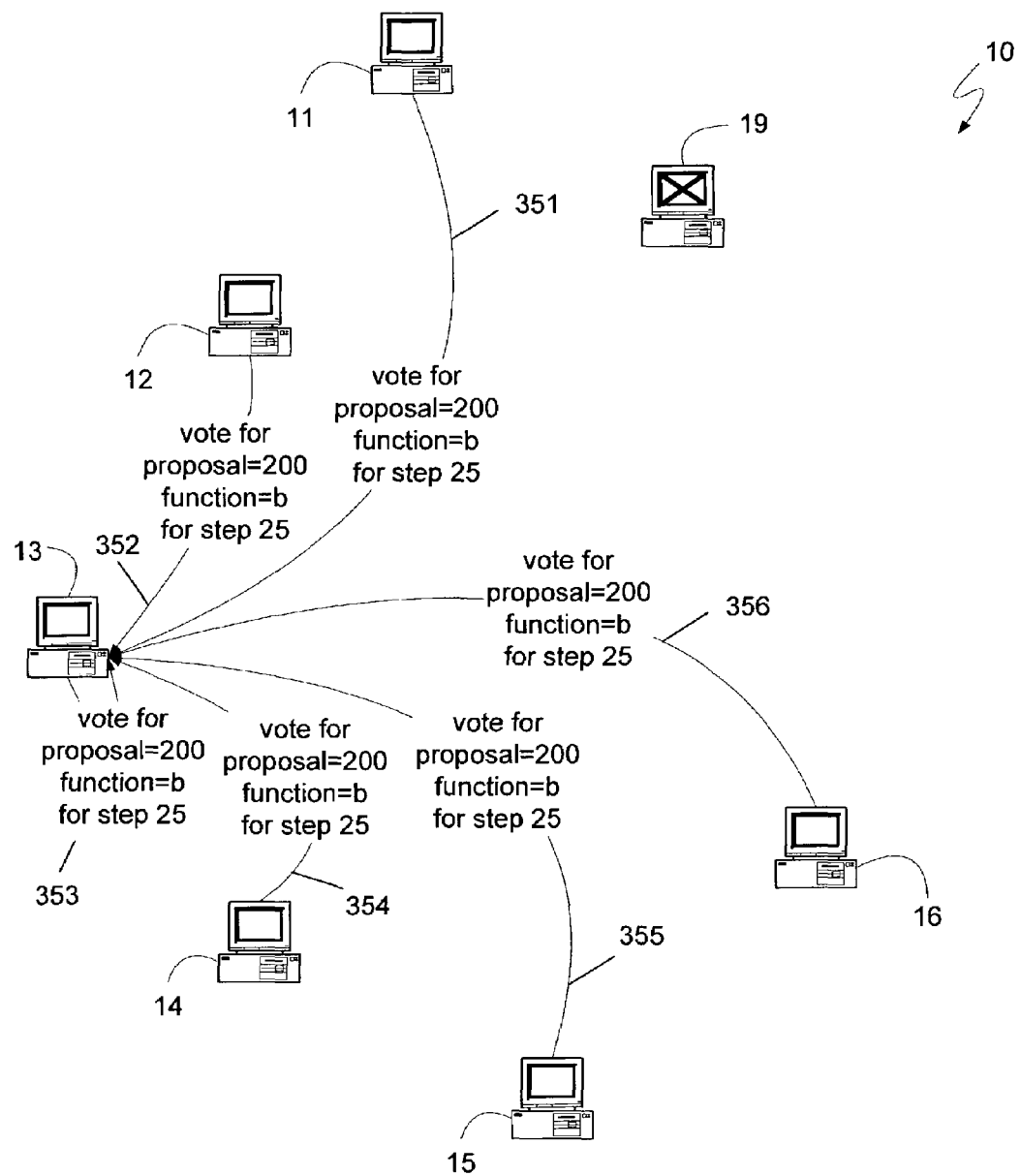
Figure 4G:
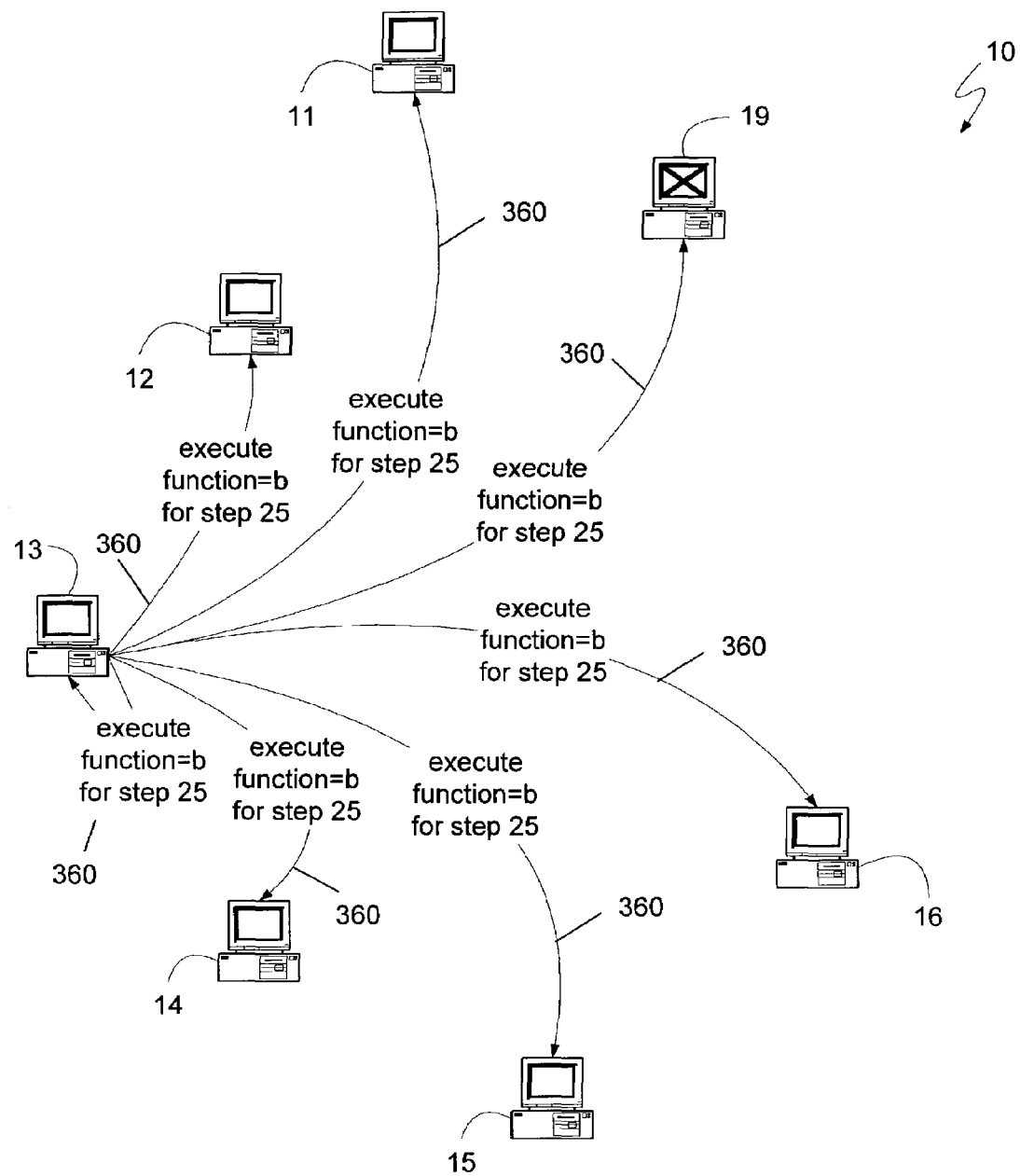

FIG. 4f illustrates devices 11-16 voting, for step 25, for proposal 200 proposing function "b" with messages 351-356, respectively. As before, a device can vote for a proposal so long as it has not promised to vote for a different proposal with a larger proposal number between the receipt of messages 320 and message 340. Once the leader 13 receives messages 351-356, it can transmit a message 360, as shown in FIG. 4g, instructing devices 11-16 and 19 to execute function "b for step 25.

The devices implementing the steps of the Paxos algorithm described above in conjunction with FIGS. 3a-e and FIGS. 4a-g can maintain variables storing information used in the algorithm. For example, for each step for which the devices does not know which function was chosen, the device can store the proposal number of the proposal with the largest proposal number for which they responded to, the proposal number of the proposal with the largest proposal number they voted for, the value proposed by the proposal with the largest proposal number for which they voted, and, if the device is a leader, it can additionally store the proposal number for the last proposal it issued. Additionally, devices can record which function was selected for all of the steps for which they have such information. Alternatively, as described above, a device could store a snapshot of its state at a given time, and the functions executed only since that time. Such variables can be stored in either volatile storage 130 or non-volatile storage, such as hard disk 141, floppy disk 152, or optical disk 156, shown in FIG. 2.

Conceptually, the Paxos algorithm described above can be divided into two general phases. The first phase, illustrated by FIGS. 3a and 3b and FIGS. 4a-4d, comprises the leader learning of previous proposals that were voted for by the devices through responses to a suggestion for a proposal number. The second phase, illustrated by FIGS. 3c-e and FIGS. 4e-g, comprises the leader submitting a proposed function for a vote, using a suggested proposal number sent during the first phase, receiving the votes, and, if the proposal was voted on by a sufficient number of devices, instructing the devices to execute the agreed to function. The first phase of the algorithm, however, need only be performed once by a new leader device. Once the leader learns of other proposals, and finds a proposal number that is safe for all of the current and future steps, it does not need to solicit further information unless it fails, or another device attempts to become a leader.

Figure 5A:
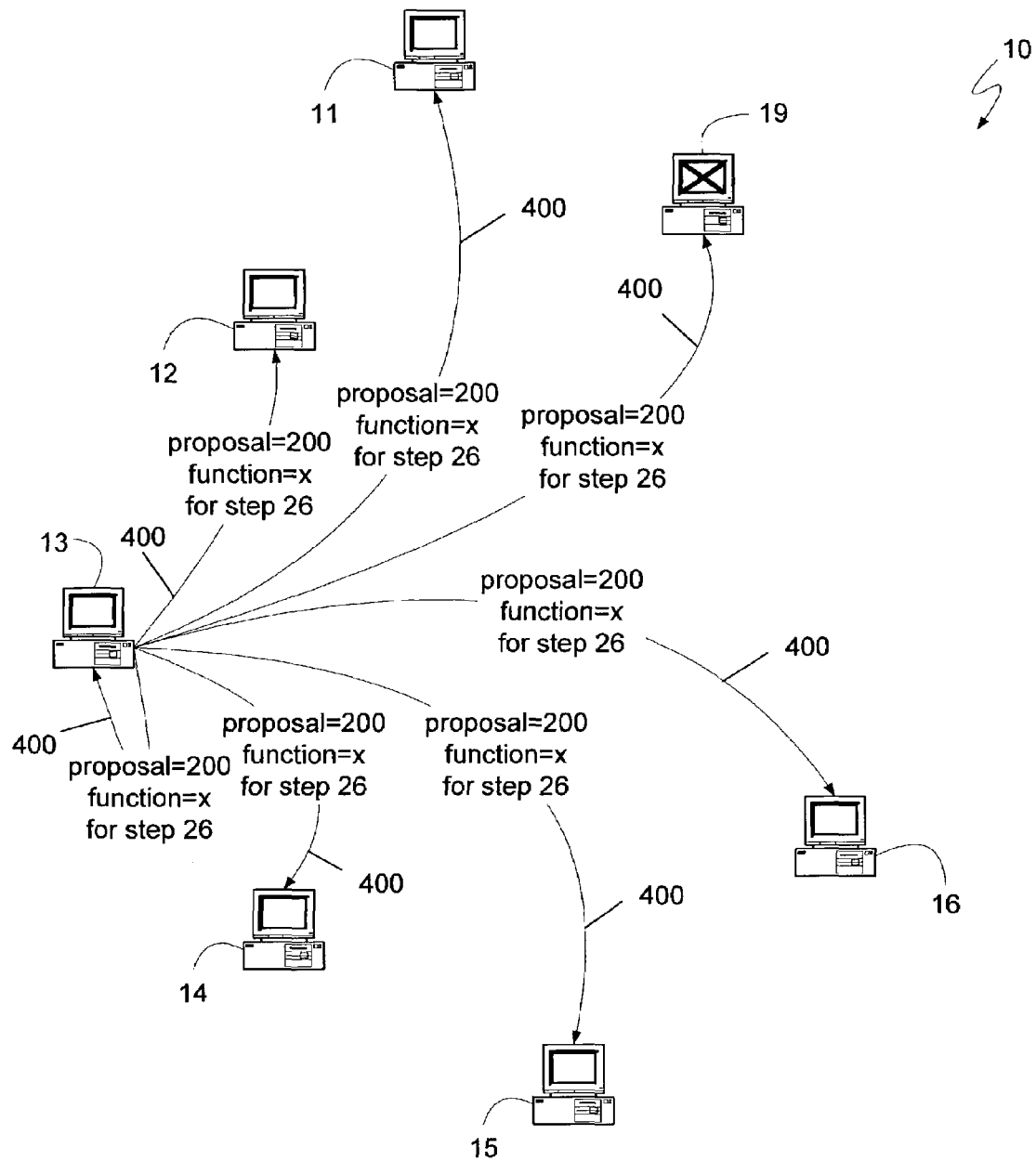
FIGS. 5a-c generally illustrate the operation of an efficient consensus algorithm contemplated by the present invention.
Figure 5B:
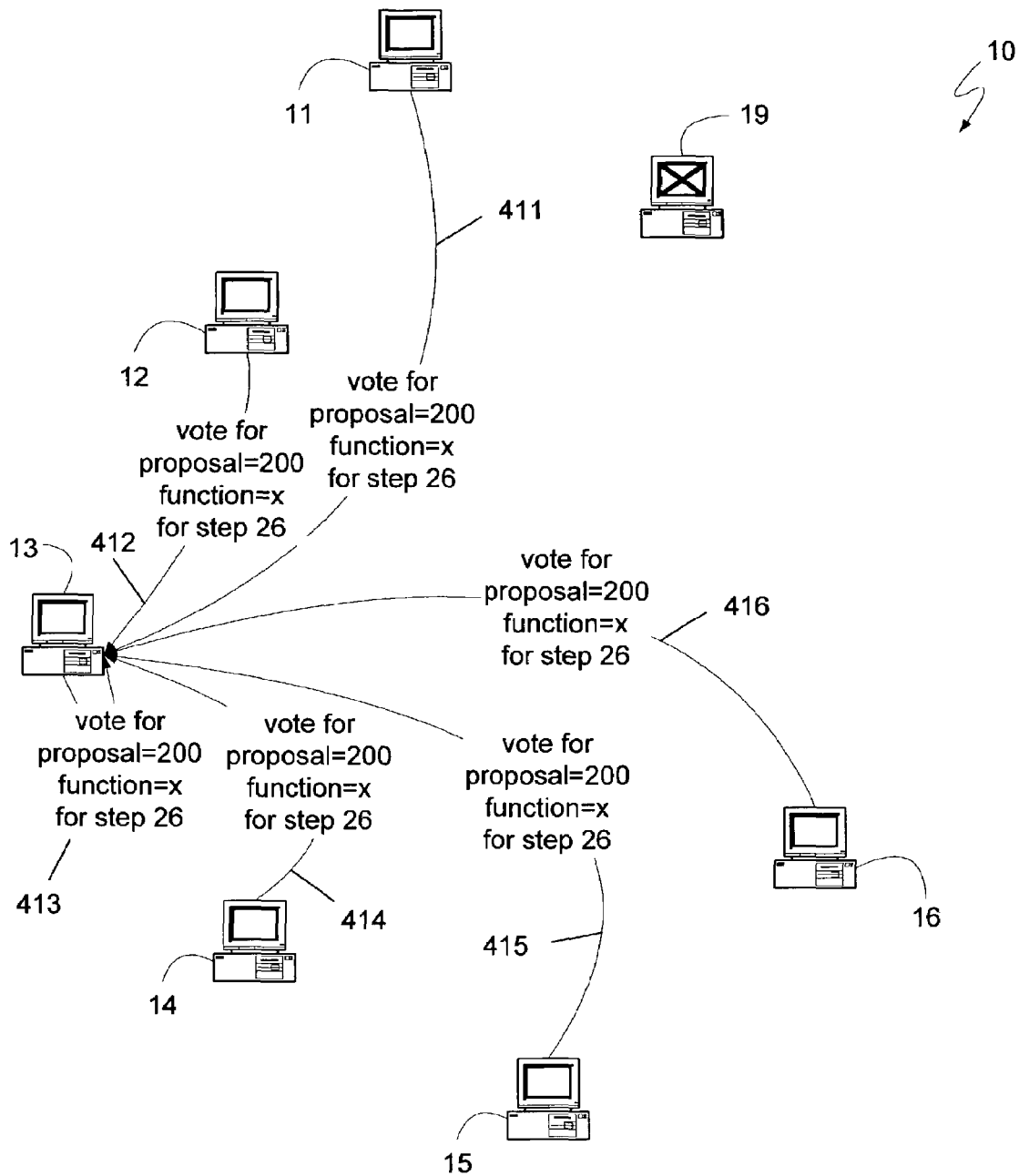
Figure 5C:
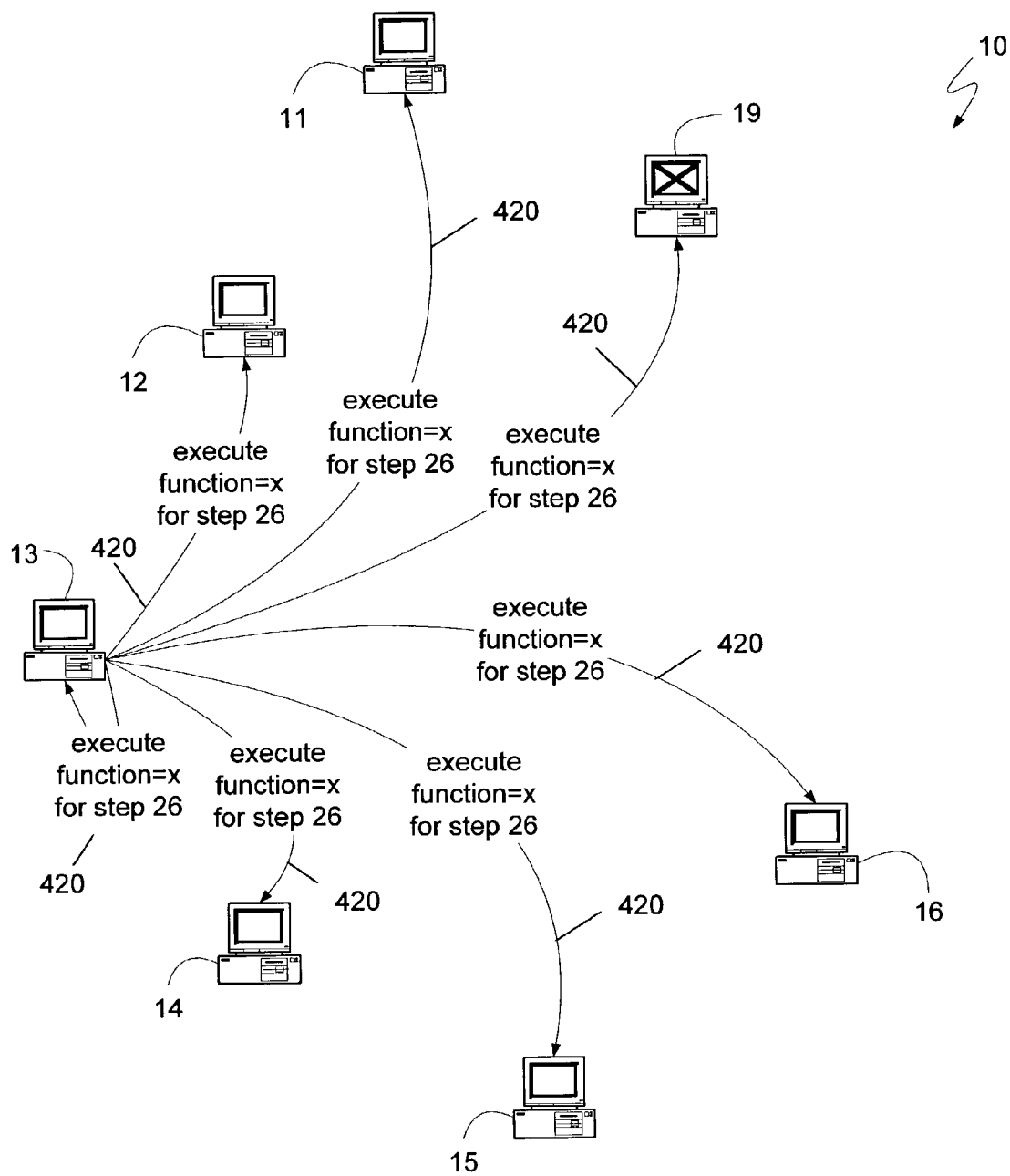

Turning to FIG. 5a, the exemplary distributed computing system 10 from FIGS. 4a-e is shown executing an additional step 26 subsequent to step 25 described in detail above. In FIGS. 4a-d, the leader 13 learned of all of the functions that were executed for steps greater than, or equal to, step 23; and it learned of the largest proposal number for which each device had voted for any steps greater than, or equal to, step 25 on which a function was not executed. As a result, the leader 13 already is aware that none of the devices 11-16 has voted for any proposals above step 25 and that proposal number 200 is, therefore, safe for all proposals for steps greater than step 25. Therefore, as shown in FIG. 5a, for step 26, the message 400 can directly solicit votes for the execution of function "x" as proposal number 200. Each of the devices 11-16 can then respond with votes, as shown in FIG. 5b with messages 411-416. Because each of the devices in the quorum had voted for the function, the leader 13 can signal, with message 420, as shown in FIG. 5c, that the devices 11-16 and 19 execute function "x" for step 26.

As can be seen, once a leader has been established, and has learned the various highest numbered proposals voted on by the devices in the quorum for all forthcoming step numbers, the leader can solicit proposals for a vote without cycling through the first phase of the Paxos algorithm. By avoiding the first phase, the distributed computing system can operate more efficiently. In addition, while the messages shown in FIG. 5a are described as taking place after the transmission of message 360 in FIG. 4g, the leader 13 need not wait for the devices to vote for one proposal before sending another proposal for a subsequent step. Therefore, upon sending message 340, as shown in FIG. 4e, the leader 13 can send message 400 shown in FIG. 5a, and can continue, in such a manner, proposing a series of functions, using proposal number 200, for steps greater than step 26. By operating in such an asynchronous fashion, the overall distributed computing system need not be slowed down by waiting to learn of votes for previous steps.

Should another device, such as a previously non-functioning device, attempt to become a leader, it would not cause the system to perform improperly, but would only succeed in causing the first phase of the algorithm to be repeated. For example, if another device attempted to become a leader, it might suggest a proposal number that some devices would respond to. Having responded to the proposal number offered by a second leader, the devices would then inform the first leader of the higher numbered proposal when the first leader solicited a vote, or the devices might ignore the request by the first leader to vote on its proposal. When the proposal failed, because an insufficient number of devices voted for it, the first leader would attempt to pass the proposal again by initially performing the first phase again and selecting what it believes is a sufficiently large proposal number which it can suggest to the devices. In such a manner, a second leader would only delay the system, but it would not cause improper operation on the part of the distributed computing system.

Additional information regarding the Paxos algorithm can be found in the paper entitled "The Part-Time Parliament" by Leslie Lamport, published in *ACM Transactions on Computer Systems*, volume 16, number 2 on pages 133-169, dated May 1998, which is hereby incorporated by reference in its entirety.

Accounting for Malicious Devices

The algorithms described above do require specific behavior of the devices of a distributed computing system. While the algorithms are designed to accommodate a device malfunction, such as by providing mechanisms by which the device can learn functions that were executed or voted on, or enabling decision making with a quorum that is less than all of the devices of the system, the algorithms may not function properly in the case of a device that acts maliciously. Such malicious failures, or Byzantine failures, can be appropriately handled through algorithms similar to those described above, with additional messages and requirements that allow each device to verify the authenticity of a message and the propriety of the message.

Figure 6A:
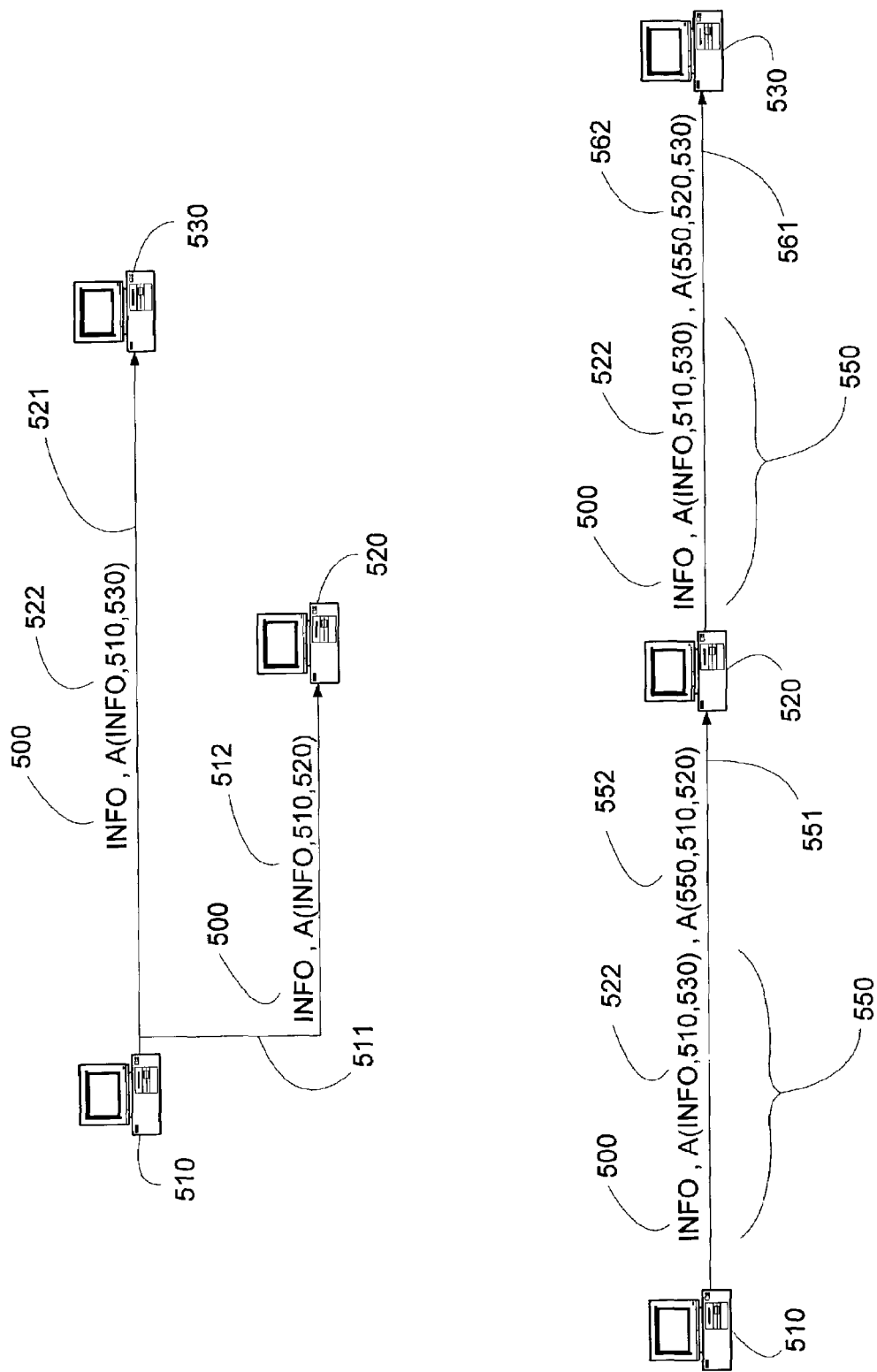
FIGS. 6a-b generally illustrate a mechanism of authentication and verification contemplated by the present invention.

Turning to FIG. 6a, one mechanism for allowing devices to verify the authenticity of a message is illustrated. Device 510 can seek to transmit an element of information 500, such as a proposal, a vote, or other inter-device message, to devices 520 and 530. Device 510 can protect information 500 through the use of various encryption processes. For example, using public key encryption, device 510 could encrypt information 500 such that a publicly known decryption key could be used by devices 520 and 530 to decrypt the information. In such a manner, device 510 could broadcast the information to devices 520 and 530, yet the information could not be modified in transit. Alternatively, public key encryption can be used to send a digital signature, which can enable a device to authenticate a message in a way that the message can be forwarded.

However, the use of digital signatures, and similar mechanisms that require the use of public key cryptography can require a significant amount of processing resources. As a result, the use of such encryption algorithms can decrease the performance of the overall distributed computing system. An alternative, less computationally expensive mechanism contemplated by the present invention is the use of message authenticators to verify that a message was not modified in transit. As will be known by those skilled in the art, message authenticators rely on shared-key encryption, which can be faster and less computationally expensive. Generally, a cryptographic key is shared between a sender and a receiver pair and is used to encrypt a message and then decrypt it after transmission. In such a manner the receiving device can determine if any part of the message has been changed or deleted, or if any new information was added to the message. Thus, message authenticators protect against modification to the message while it is in transit. A properly authenticated message is a message that contains the same information when it is received as it had when it was sent.

Because message authenticators are designed to provide information only to a specific destination device, they may not provide for the multicasting of a single message to multiple destinations as could be performed with public key cryptography. Nevertheless, the efficiencies gained through the use of message authenticators can outweigh any inefficiencies inherent in the point-to-point transmission of messages.

FIG. 6a illustrates one mechanism for using message authenticators to verify the authenticity of a message contemplated by the present invention. Device 510 seeks to send information 500 to devices 520 and 530. One solution would be to send information 500 directly to device 520 in message 511 and directly to device 530 in message 521, together with message authenticators 512 and 522 that can authenticate the transmission from device 510 to device 520 and device 530, respectively. An alternative solution allows device 510 to send a message 551 to device 520, which can both verify the message for itself and can forward the message along, as message 561, to device 530. To verify that the information 500 contained in message 561 was not tampered with in transit, device 530 can look for an authenticator 522 authenticating the transmission of information 500 from device 510 to device 530. However, for the authenticator 522 to be included in the forwarded message 561 from device 520 to device 530, device 520 can receive the authenticator 522 from device 510 in message 551. Therefore, message 551 can include the information 500 and the authenticator 522 that can authenticate the information 500 being sent from device 510 to device 530. Message 551 can also include authenticator 552 that authenticates the information 500 and the authenticator 522, collectively 550, from device 510 to device 520. In this way device 520 can verify that both the information 500 and the authenticator 522 were not modified in transmission between device 510 and 520. Similarly, when forwarding the collection 550, consisting of the information 500 and the authenticator 522, onto device 530, device 520 can include authenticator 562 authenticating collection 550 from device 520 to device 530. In such a manner, message authenticators can be used to verify a message even when the message is forwarded from one receiving device to another.

Extrapolating the above mechanism, a message can be authenticated for transmission through any number of intermediate devices. If a message is to be authenticated for transmission from device d(n) to d(1) through devices d(n-1), d(n-2), and all the way through device d(2); device d(n) can send, to device d(n-1), a message in the form of: (i, A1, A2, ..., A(n-1)), where "i" can represent the information being transmitted, "A1" is an authenticator authenticating i from d(n) to d(1), "A2" is an authenticator authenticating i and A1 from d(n) to d(2), and so on. Device d(n-1) can then send a message in the form of: ((i, A1, A2, ..., A(n-2), AA1), where AA1 is an authenticator authenticating the message (i, A1, A2, ... A(n-2)) from device d(n-1) to device d(n-2). As can be seen, the above messages can be expressed elegantly using recursion. Therefore, mathematically, if an authenticator of a message containing information "i" sent from device "a" to device "b" can be represented as $\Sigma(i, a, b)$, then information "i" can be "k-authenticated," such that it can be forwarded k times, by sending a (k+1)-tuple of the form: <i, A1, A2, ..., Ak>, where each Aj is an array such that $Aj[a,b]=\Sigma(<i, A1, A2, ..., A(j-1)>, a, b)$. Therefore, the use of message authenticators can allow the verification of a message even if the message will be forwarded along by a chain of intermediate devices.

The above method works well if the information were only being sent via a single path to a single recipient. However, in practice, the same information may be sent via many paths to many different recipients, and some paths may branch off of other paths. While a brute force approach of calculating the above messages for each path could be employed, the creation of authenticators can require computing resources. Therefore, to minimize the burden on the computing devices of the system 10, a single authenticator can be used for any particular device on any path. The number of authenticators that an information transmitting device needs to determine can be limited to the number of unique devices through which the information may be transmitted on any given path. For example, transmissions that share the same path between a few devices, and then branch off in different directions to reach other devices can share the same authenticator for the shared path between two devices.

Figure 6B:
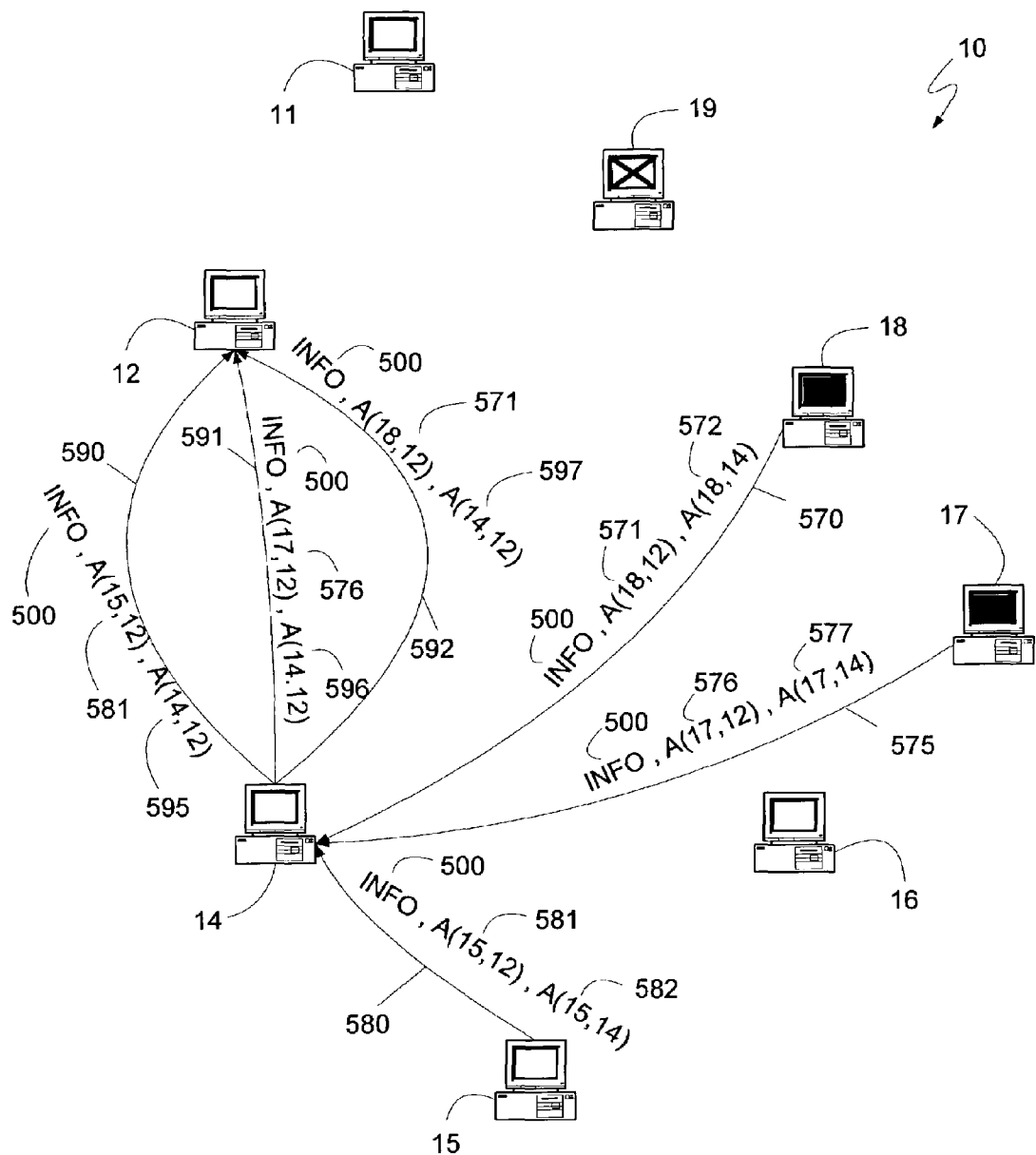

Authenticating the message, however, merely indicates that the message was not intercepted and modified by a malicious device during transmission, not that the message was sent by a properly functioning device. For example, a malicious device could send a false message that arrives unchanged and, therefore, properly authenticated. To remove the influence of devices experiencing malicious failures, the recipient device can both verify the authenticity of the message and the propriety of the message. Turning to FIG. 6b, a mechanism contemplated by the present invention for verifying that a message is proper is illustrated. Device 14 of the illustrative distributed computing system 10 can receive messages 570, 575, and 580 from devices 18, 17, and 15, respectively. Devices 17 and 18 are indicated as experiencing malicious failures, though, as will be shown, the algorithm is equally applicable to any number of malicious devices, provided the distributed computing system has a sufficiently large number of constituent devices. Furthermore, while devices 17 and 18 are shown as experiencing malicious failures, it is not required that any device know which particular devices are experiencing malicious failures. Rather, the only consideration is the number of malicious devices that may exist within the system. For example, in exemplary distributed computing system 10 shown in FIG. 6b, the number of malicious devices can be, at most, a set of any two devices. In the particular example shown in FIG. 6b, two malicious devices do, in fact exist; devices 17 and 18.

In a distributed computing system with a given number of devices experiencing malicious failures, a device can verify that a message is proper if it receives messages with equivalent information from more devices than there are malicious devices. Therefore, considering the illustrative system 10, if any device receives three or more messages, each asserting the same information, then the device can trust that the information asserted is proper because at most two of the messages came from malicious devices, leaving at least one message from a properly functioning device. As shown in FIG. 6b, messages 570, 575, and 580 each carry the same information 500. Furthermore, each of the messages 570, 575, and 580 is properly authenticated for device 14. Authenticators 572, 577, and 582, authenticate both the information 500 and the authentication of that information to device 12 by authenticators 571, 576, and 581, respectively, in the manner described above.

Because device 14 has received three independent, and properly authenticated, messages, it can verify that information 500 is proper because device 14 can know that at least one of the messages 570, 575, and 580 is from a properly functioning device which, by definition, only transmits proper messages. A proper message can be any message that, given a set of conditions, is allowed or required by the algorithms described. Since each of the messages 570, 575, and 580 contains the same information 500, it is not necessary for device 14 to identify which message is from the properly functioning device. If device 14 had only received messages 570 and 575, it could not determine that the information 500 was proper, because each of those messages could have been sent by a malicious device. Therefore, in a distributed computing system having at most M malicious devices, a device can verify the propriety of information contained in a message by receiving at least M+1 properly authenticated messages from M+1 different devices, each containing the same information.

However, if device 14 of FIG. 6b attempts to forward the messages 570, 575, and 580 to device 12, device 12 may not be able to verify that the messages are proper. Message 590, for example, contains the information 500, an authenticator 581, authenticating the information from device 15 to device 12, and an authenticator 595, authenticating the information 500 and the authenticator 581 from device 14 to device 12. Authenticator 582 of message 580 was used to authenticate the information 500 and the authenticator 581 to device 14, and need not be included by device 14 when forwarding the message onto device 12. Similarly, messages 591 and 592 contain information 500, authenticators for that information from devices 17 and 18, respectively, to device 12, and authenticators 596 and 597 authenticating the information 500 and the authenticators 592 and 593, from device 14 to device 12. The authenticators 571 and 576 may be invalid, however, not because the message may have been changed in transit, but because devices 17 and 18 are malicious and may have purposefully attached invalid authenticators. Furthermore, device 12 cannot determine whether the authenticators 571 and 576 are invalid because they were originally sent by malicious devices 17 and 18, or because the messages 591 and 592 are phony messages created by malicious device 14. As a result, the only properly authenticated message device 12 could receive is message 590. However, device 12 cannot independently determine whether device 15 is a properly functioning device. Therefore, because device 12 has received only one properly authenticated message, and there are as many as two known malicious devices in system 10, device 12 cannot verify the propriety of the information 500 and cannot, therefore, rely on it.

To allow for the possibility that up to two messages of the messages 590-592 that were forwarded to device 12 have improper authenticators, device 14 would need to collect and forward five messages. With five forwarded messages, at most two of which could have improper authenticators, device 12 can still receive the at least three properly authenticated messages to verify the veracity of information 500. For example, if devices 11 and 16 similarly sent properly authenticated messages to device 14, and device 14 forwarded those messages together with messages 590-592, device 12 would receive five messages, of which at most two, specifically messages 591 and 592, could have improper authenticators. However, device 12 would still receive at least three properly authenticated messages, each delivering the same information 500. Device 12 could then trust that information 500 was proper because, of the three messages, at most two could have been sent by malicious devices, leaving at least one message that was sent by a properly functioning device.

In a distributed computing system with at most M malicious devices, a collection of M+1 properly authenticated messages, each with the same information, can verify, to the recipient device, that the information contained in those messages is proper and can be relied upon. However, the device will not be able to forward the messages onto another device, and convince that second device that the information contained in the messages is proper. To forward messages and convince the device to which they are being forwarded of the propriety of the contained information, at least 2M+1 properly authenticated messages, each with the same information, are necessary. If the second device seeks to forward the messages onto a third device, and convince the third device of the propriety of the information, the first device will need to receive and forward onto the second device 3M+1 properly authenticated messages, each with the same information. More generally, in a distributed system having at most M malicious devices, a device can forward a collection of messages, and know that the recipient device can determine the information contained in the messages to be proper, if there are at least (k+1)M+1 properly authenticated messages received by the first device, where k indicates the number of times the messages can be forwarded, with each further receiving device believing the information contained in the messages to be true.

Modified Paxos Algorithm

As described above, the use of message authenticators can allow a device to determine if a message was modified in transit, even if the message is a forwarded message. Furthermore, a sufficiently large collection of messages, each with the same information, can allow a device to determine if the information is proper. Therefore, the present invention contemplates the application of these mechanisms to the above described Paxos algorithms to enable a device to identify tampered messages and original, improper messages and thereby enable a distributed computing system to decide which function to execute for a given step in the face of malicious and non-malicious failures.

Figure 7A:
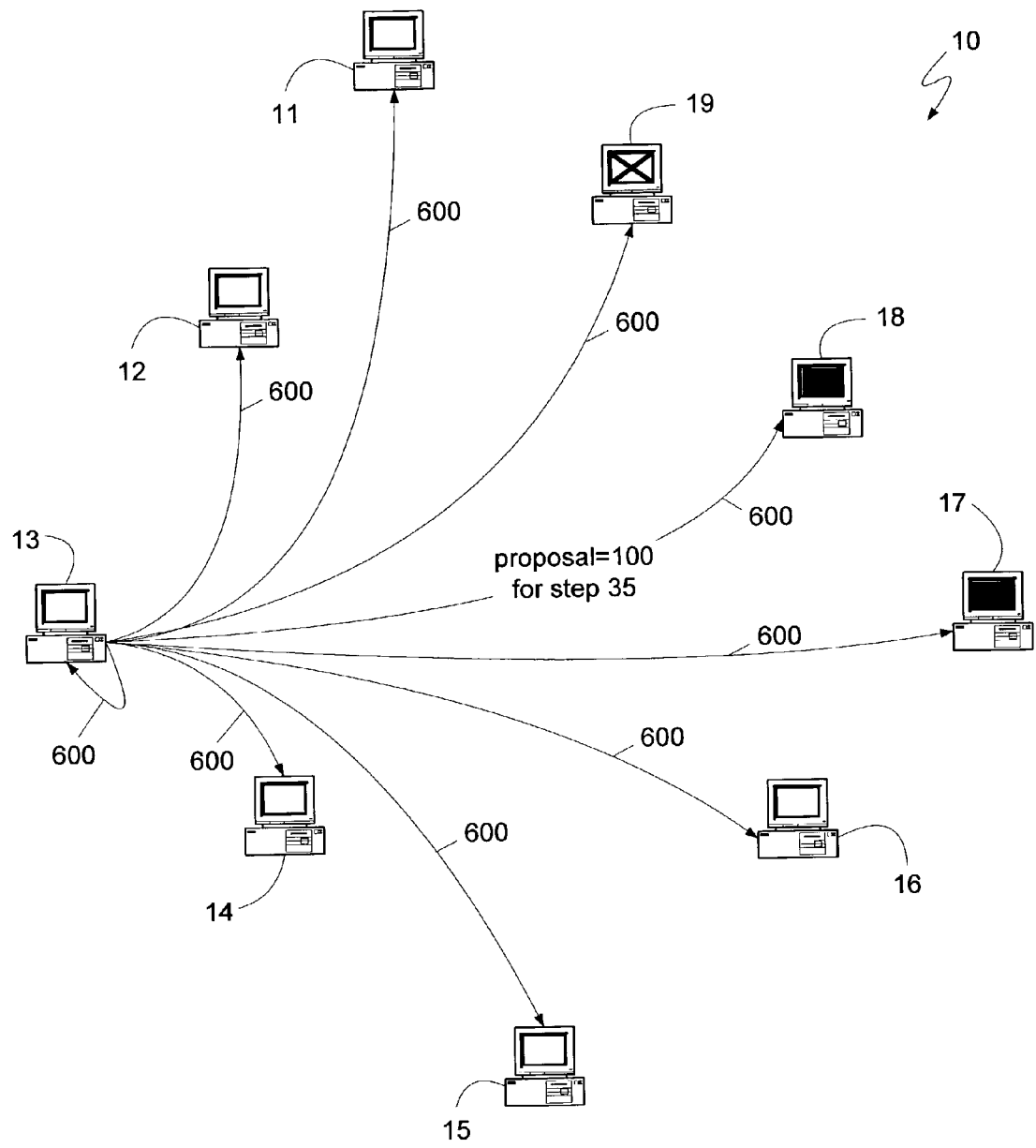
FIGS. 7a-g generally illustrate the operating of another multi-step consensus algorithm contemplated by the present invention.

Turning to FIG. 7a, the exemplary distributed computing system 10 of FIG. 1 is shown, having two malicious devices 17 and 18 and further failed, but non-malicious, device 19, which can have failed due to a software failure, hardware failure, a network connectivity failure, or the like. Throughout the description that follows, device 19 will be referred to, and illustrated as, a particular device. However, the present invention contemplates the proper operation of the distributed computing system regardless of which particular device fails, so long as there are no more than a given number of failed devices at any moment. Thus, while device 19 remains in a failed state throughout the description that follows, the functions described are equally applicable to a system in which device 19 resume functioning properly and a different device experiences a non-malicious failure.

Because the exemplary distributed computing system 10 shown in FIG. 7a contains two malicious devices, it may not be sufficient for a leader to simply obtain a majority vote from the devices in order to execute a function for a given step. To maintain synchronization between the devices, each device can execute the same function for a given step and there cannot exist a mechanism by which two groups of devices within the same system execute different functions for the same step. However, the presence of malicious devices introduces a risk that cannot be offset through the use of a mere majority. Specifically, in the mechanisms described above, by requiring a majority to vote for a proposal, synchronization was ensured because any two collections of devices, each of which constituted a majority, shared at least one device. That shared device's last vote information could be used to ensure that the devices from one collection, constituting a majority, voted for the same proposal as did the devices from the other collection, also constituting a majority, as provided for by the mechanisms described above.

In FIG. 7a, however, one majority could consist of devices 11, 12, 13, 17 and 18 and another majority could consist of devices 14, 15, 16, 17 and 18. As can be seen, the two majorities share only malicious devices 17 and 18. Thus, if only a majority was required, the first majority could vote for one function for a given step and then a different proposal could be sent to the second majority and they would vote for a different function for the same step. Because devices 17 and 18 are malicious, it cannot be guaranteed that they would provide the necessary last vote information to allow the second leader to learn of the function already selected by the first majority. Therefore, the present invention contemplates selecting functions through the vote of a quorum, where any two groupings having a quorum of devices share at least one non-malicious device. One method contemplated by the present invention for ensuring that two quorums share at least one non-malicious device is to select a sufficiently large quorum such that any two quorums share a group of devices that contains at least one more device than the number of malicious devices in the system. For example, in FIG. 7a, because of malicious devices 17 and 18, a quorum can be any grouping of at least six devices. In such a manner, any two groupings having at least a quorum of devices share at least three devices. Because at most two of those three shared devices can be malicious, at least one will not, allowing the algorithm to function properly. For the description that follows, using the exemplary distributed computing system 10 of FIG. 7a, a quorum can be a collection of at least six devices, though a quorum with more than six devices can be divided into additional quorums each having exactly six devices.

As before, device 13, acting as a leader can send message 600, as shown in FIG. 7a, suggesting the use of proposal number 100 to propose a function for the current step 35. To simplify the explanation, in the current example device 13 is assumed to know all of the executed functions through step 34. However, if such were not the case, the procedures described above could be used to update all of the devices, including the leader 13. Also for simplicity, message 600 is assigned one number in the figure to indicate that the information contained within the message is the same for all of the messages 600 shown. However, the device 13 would provide authenticators to each of the individual devices for each message, as described above, which would technically render each message unique.

Because device 13 can act as both a leader and a device, for purposes of voting for a proposal, device 13 is illustrated in FIG. 7a as sending itself a message 600. As before, such communication would generally be performed internally but it could be transmitted through network hardware and return to the device if so desired. Alternatively, device 13 could act as only a leader, much as it could for all of the previously described algorithms. In such a case, however, device 13 could not be used to satisfy the requirements for the number of devices, described further below, needed to ensure proper operation of the system.

Figure 7B:
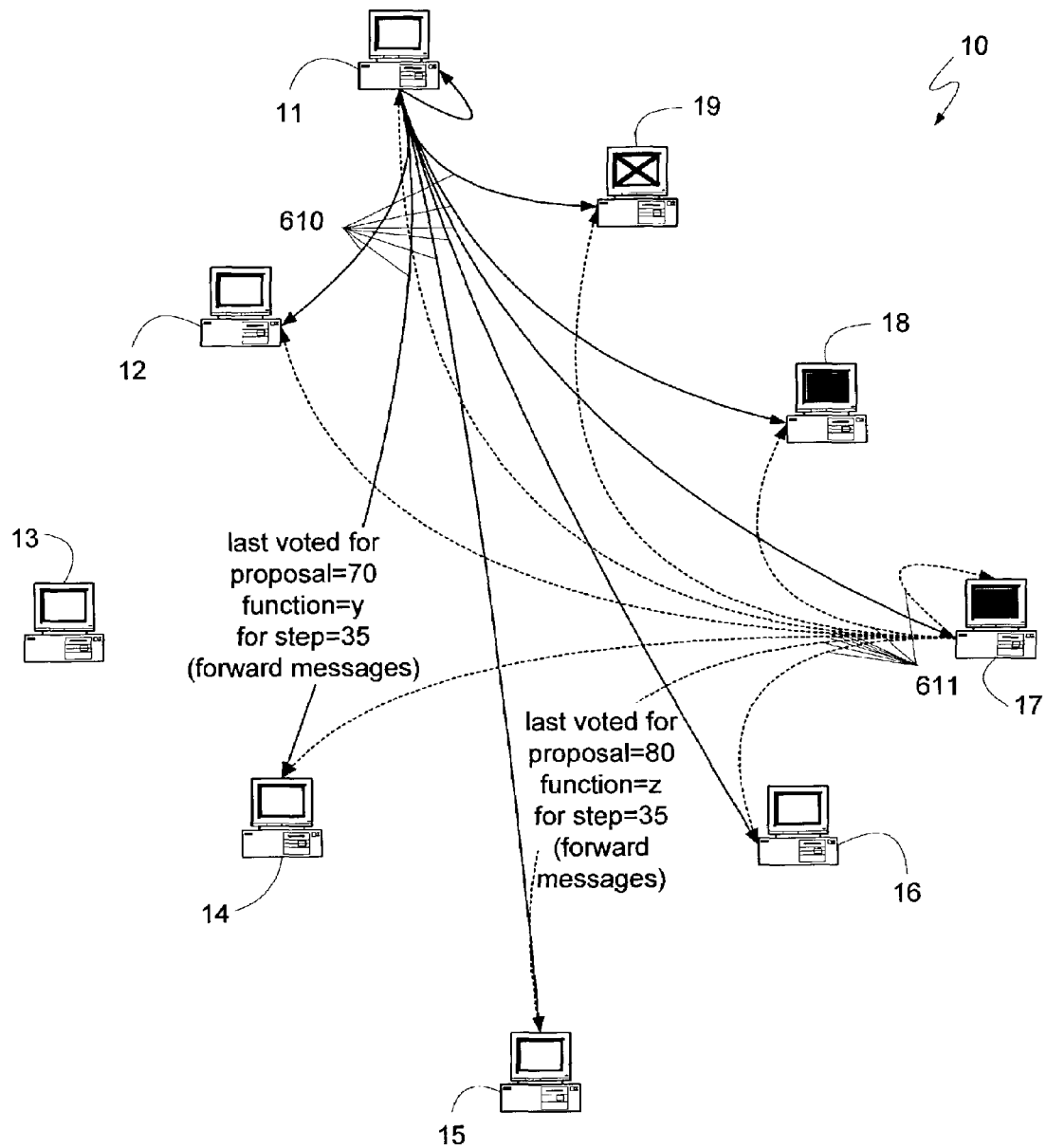

Turning to FIG. 7b, in response to message 600, each of the devices 11-18 can send a message containing the largest numbered proposal less than 100 that each device has voted for in all steps greater than, or equal to, step 35. Alternatively, to provide greater efficiency, the devices 11-18 can send messages containing the largest numbered proposal they have voted for, whether or not it is less than 100, such that the leader 13 can efficiently learn of higher numbered proposals that have been voted for, and can adjust the suggestion for its proposal number accordingly, as described above. However, in order to provide the leader 13 with the ability to prove to other devices that it did, in fact, receive responses from devices 11-18, each device can send its response to every other device in the quorum, including itself. As will be explained, this can provide the leader 13 with the ability to prove to the devices of whichever quorum the leader selects to submit its proposals to that the proposals are proper in light of the messages sent by devices 11-18, and that devices 11-18, in fact, sent those messages and that leader 13 did not maliciously manufacture them.

For simplicity, FIG. 7b illustrates only two such messages sent among the devices 11-19, namely message 610, sent by device 11 and message 611 sent by device 17. As above, while a single number is used to indicate that the information contained in all of the messages indicators shown, each of the messages would contain authenticators to their destination devices, rendering each message unique. Furthermore, as will be explained below, because messages such as messages 610 and 611 will be forwarded by each of the devices 11-18, back to the leader 13, messages 610 and 611 additionally may have authenticators to allow them to be forwarded, as described above.

As each device will send a message, such as messages 610 or 611, devices 11-19 will each receive seven such messages from other devices and one additional message from themselves for a total of eight messages. While device 13 is the leader, it can still perform these steps because it may not be possible for device 13, acting as a leader, to determine that device 13, acting as a voting device, is not malicious. By transmitting its last vote information as shown in FIG. 7b, the device 13 can provide the leader 13 with the necessary proofs, as will be described. Furthermore, device 19 is shown as suffering a non-malicious failure and will likely not send any messages.

To provide a mechanism by which the last vote messages, such as messages 610 and 611, can be verified to be proper, each device transmitting such a message can forward a series of messages from other devices proving that it was proper for that device to vote as it did. For example, message 610 indicates that device 11 last voted for proposal number 70, which proposed the execution of function "y". However, each of the devices 12-19 will receive only one message, namely message 610, indicating that device 11 voted for proposal 70. With only the singular messages, devices 12-19 cannot tell whether device 11 actually did, in fact, vote for proposal 70, and if it did, whether it was proper for it to do so. To address these issues, device 11 can, as part of message 610, include messages from a quorum of devices indicating that proposal 70 proposes a safe value and that it is proper to vote for the proposal. The quorum of messages can be obtained as part of the voting process, which will be described in further detail below. As will be also be described in detail below, a quorum of messages from a quorum of devices can be forwarded once and still prove safety to the device to which it is forwarded. Therefore, device 11 can, as part of message 610, include the quorum of messages, proving to the devices receiving message 610 that it was proper for device 11 to vote for proposal 70.

As stated above, upon receipt of last vote messages, such as messages 610 and 611, each device 11-19 can have eight such messages, the propriety of each being proven by a quorum of forwarded messages. Devices 11-18 can then forward to the leader 13 each of the eight messages, together with an indication, based on the quorum of forwarded messages, that the eight last vote messages being forwarded from each device 11-18 to the leader 13 are proper. Alternatively, each device 11-18 can independently determine from the eight last vote messages received which proposed functions are safe; namely which proposed function that was voted for had the largest proposal number. Each device 11-18 can then independently transmit its determination of safe proposals to the leader 13.

Figure 7C:
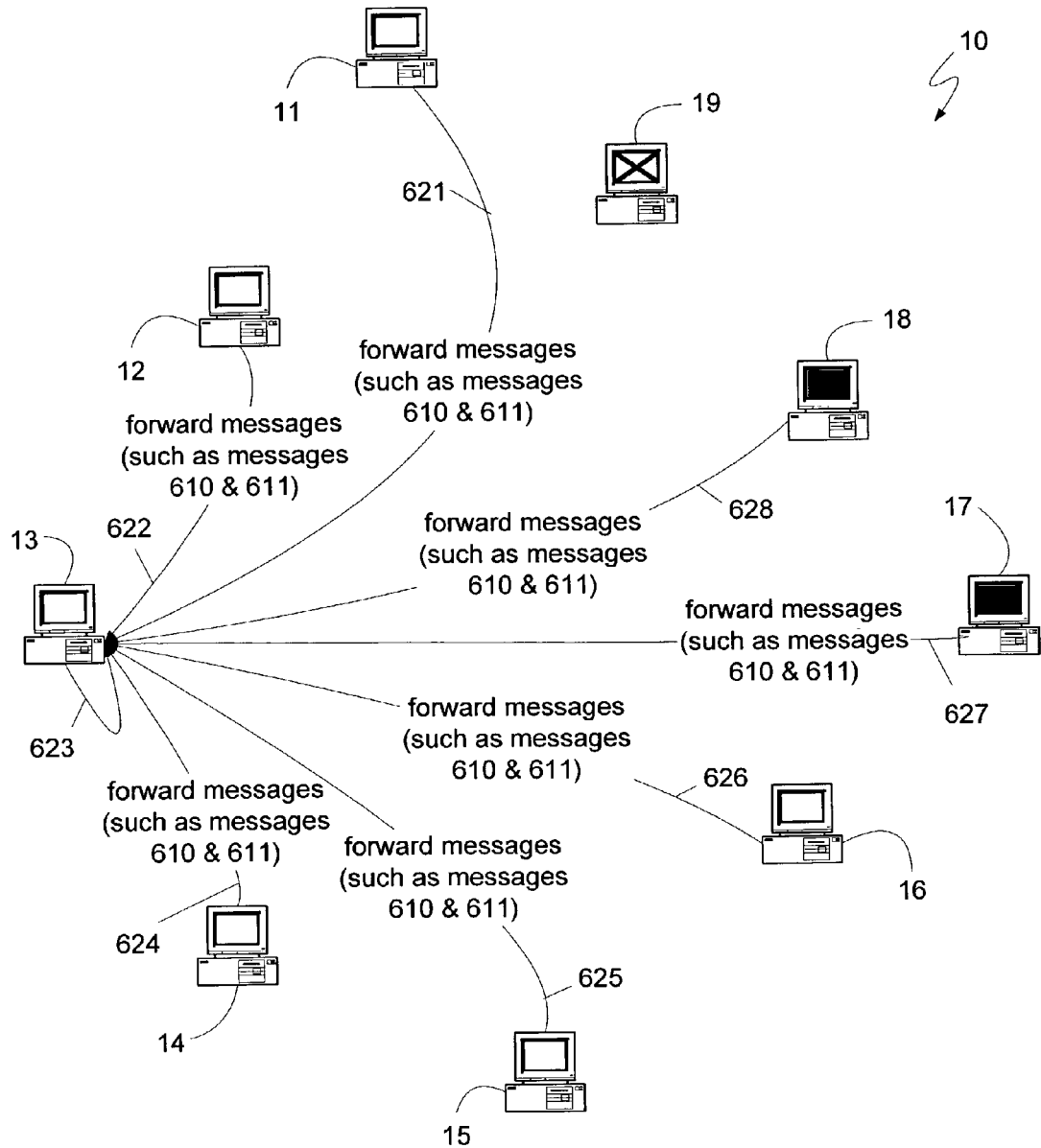

Turning to FIG. 7c, each of the devices 11-18 can send properly authenticated messages 621-628, respectively to the leader 13 which are a forwarding of the previously exchanged last vote messages, such as messages 610 and 611. In the manner explained above, each forwarded message can also be properly authenticated for each device, as the leader can ultimately forward the messages back to the devices as proof of the propriety of the leader's selection for a function to be voted upon. With messages 621-628, the leader 13 receives eight copies of a last vote message, such as message 610 and 611, sent by each device 11-18. However, because there are at most two malicious devices in the exemplary system 10, there are at least six properly forwarded copies of the last vote messages.

For example, in FIG. 7b, device 11 sent a message 610 to each of the devices 11-19. From devices 11-18, the leader received, as shown in FIG. 7c, at least six properly authenticated copies of message 610, and possibly as many as eight, though the two malicious devices could have sent anything, or nothing, and cannot be relied upon. The six proper copies of message 610 received by leader 13 constitute a quorum of messages that the leader 13 can forward onto another device. Of those six messages, at most two can be from a malicious device. Therefore, when forwarding the six messages onto another device, the leader 13 can expect that the other device will receive at least four properly authenticated copies of message 610. Of the four properly authenticated copies received by the other device, at most two can be from malicious devices, leaving at least two messages from properly functioning devices. Because the device received too many copies of message 611 for it to be a false message sent by malicious devices, the device can determine that message 611 was sent; namely that device 11 did, in fact, send message 610 to leader 13 and that leader 13 did not maliciously fabricate its existence.

The above example can be repeated with each last vote message, such as messages 610 and 611 sent by devices 11-18. The result is that, when the leader 13 forwards the received copies of the last vote messages onto the devices, as will be described below, each of the devices receiving the copies will be able to determine, based on the number of properly authenticated messages received, that the last vote messages were, in fact, sent. As a result, based on the contents of those last vote messages, the devices can verify whether the function being proposed by leader 13 is proper.

To avoid the effects of last vote messages from malicious devices, such as message 611, the leader can select not to forward last vote messages which were deemed improper by devices 11-18 when sending messages 621-628. For example, as explained above, when transmitting last vote message 611, the malicious device 17 can forward a quorum of messages, to be described later, indicating that the vote referenced by last vote message 611 was proper. Upon receipt of message 611, each of the devices can check the forwarded quorum of messages. A malicious device can forward a quorum of messages that does not support its last vote message, or it can seek to modify the quorum of messages, causing the message authentication of the messages in that quorum to become improper. In either case, each device can determine that the last vote information contained in message 611 is not proper and can so indicate to the leader 13 when forwarding message 611 in messages 621-628. If message 611 is not proper, device 17 need not be considered as part of the quorum needed to identify safe proposals to the leader 13. Instead, because the remaining, properly functioning devices can constitute a quorum, the leader 13 can use that quorum of messages as the quorum of messages that provides the leader 13 with the proof of propriety that the leader 13 can forward onto the devices when requesting a vote, as will be shown below. Of course, it is possible that message 611, even though it is from a malicious device, is proper, in which case the devices can so indicate, and device 17 can be part of the quorum. As can be seen, the proper operation of the algorithm is assured by providing a sufficient number of messages that at least one must be proper. Therefore, the proper operation of the algorithm does not require identifying the malicious devices.

As an alternative, devices 11-18 can independently, based on messages such as messages 610 and 611, determine a set of functions which are safe for the leader to propose. As above, each of the last vote messages, such as messages 610 and 611 can be sent with a forwarded quorum of messages proving the propriety of the vote. As a result, the devices can determine the set of safe functions only from those last vote messages that are proper. The devices can then transmit that set as messages 621-628. Leader 13 will, therefore, receive eight messages, 621-628, containing a set of safe functions that can be proposed. While at most two of those messages can be from malicious devices, at least six are from properly functioning devices and should, therefore, identify the same set of functions. Such a quorum of messages can be forwarded onto the devices when the leader selects a proposal to submit for voting, as proof of the propriety of the proposal. Of the at least six messages, at most two can be from malicious devices and improperly authenticated for the devices onto which they are being forwarded. Nevertheless, leader 13 can rely that at least 4 properly authenticated messages, each identifying the same set of functions as safe to propose will be received by the devices onto which the leader forwards the messages. Because only at most two of those messages could be false, the devices can determine that the safe set identified in the forwarded messages is correct, and can rely on it to determine that the function proposed by the leader is proper.

Figure 7D:
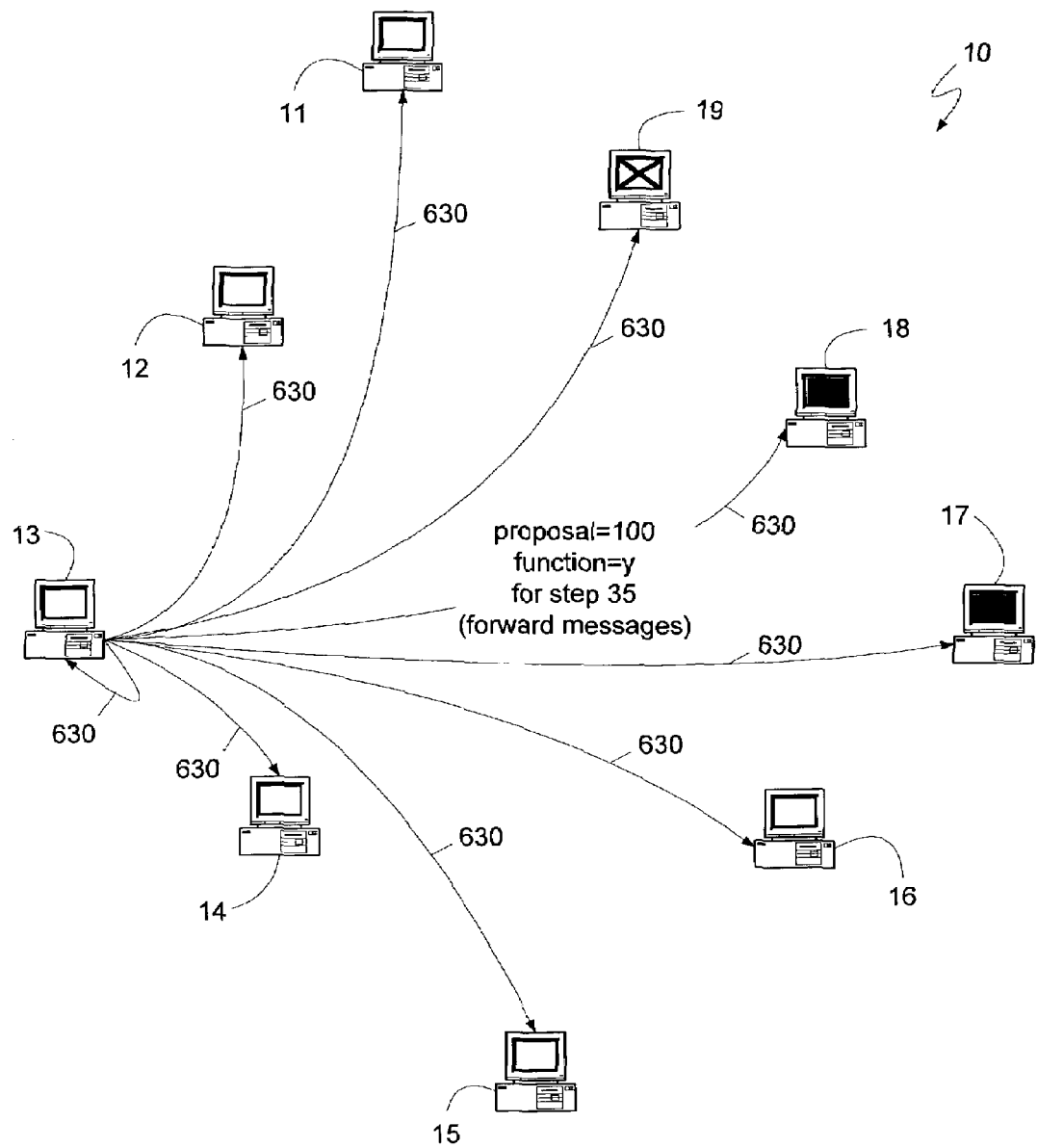

Turning to FIG. 7d, based on the information provided in messages 621-628, the leader 13 can determine that function "y" should be proposed and put to a vote, and it can solicit votes with message 630, as shown. As explained above, the proposed function z indicated in message 611 may be maliciously incorrect. As a result, message 611 and device 17 may not be considered part of the quorum relied on by leader 13 to identify safe functions to propose. Therefore, the leader 13 can propose function "y", even though, device 17 claims to have voted for a proposal with a larger proposal number, if the last vote message 611 sent by device 17 is determined to be improper, because device 17 will not be in the quorum considered by leader 13 or by devices 11-18. Also, as before, each of the message indicators drawn in FIG. 7d is labeled 630, though each message will be unique because of the device-specific authenticators used for each message. In addition to the proposed function "y", the leader 13 can seek to prove that function "y" is indeed the proper function for which to solicit a vote by forwarding messages 621-628 to the devices 11-19. As explained above, messages 621-628 could contain at least six properly authenticated, correct copies of each of the last vote messages, such as messages 611 and 612 sent by each of the devices. In such a case, message 630 can contain at least four properly authenticated, correct copies of each of the last vote messages sent by each of the devices, because at most only two of the messages 621-628 are maliciously improperly authenticated for forwarding onto devices 11-18. As also explained above, four properly authenticated copies of each of the last vote messages are sufficient for each of the devices 11-18 to determine whether the function "y" proposed by device 13 in message 630 is proper.

Alternatively, as also explained above, messages 621-628 could contain a set of safe functions to propose. At least six of the eight safe function sets identified by messages 621-628 are identical, allowing leader 13 to forward them on as part of message 630 with confidence that the devices 11-19 will receive at least four messages properly authenticated for devices 11-19. The four properly authenticated messages, each identifying the same safe set of functions can be sufficient for devices 11-19 to trust the safe set of functions identified, and leader 13 can prove the safety of the proposed function "y", as long as "y" is a member of the safe set of functions.

Figure 7E:
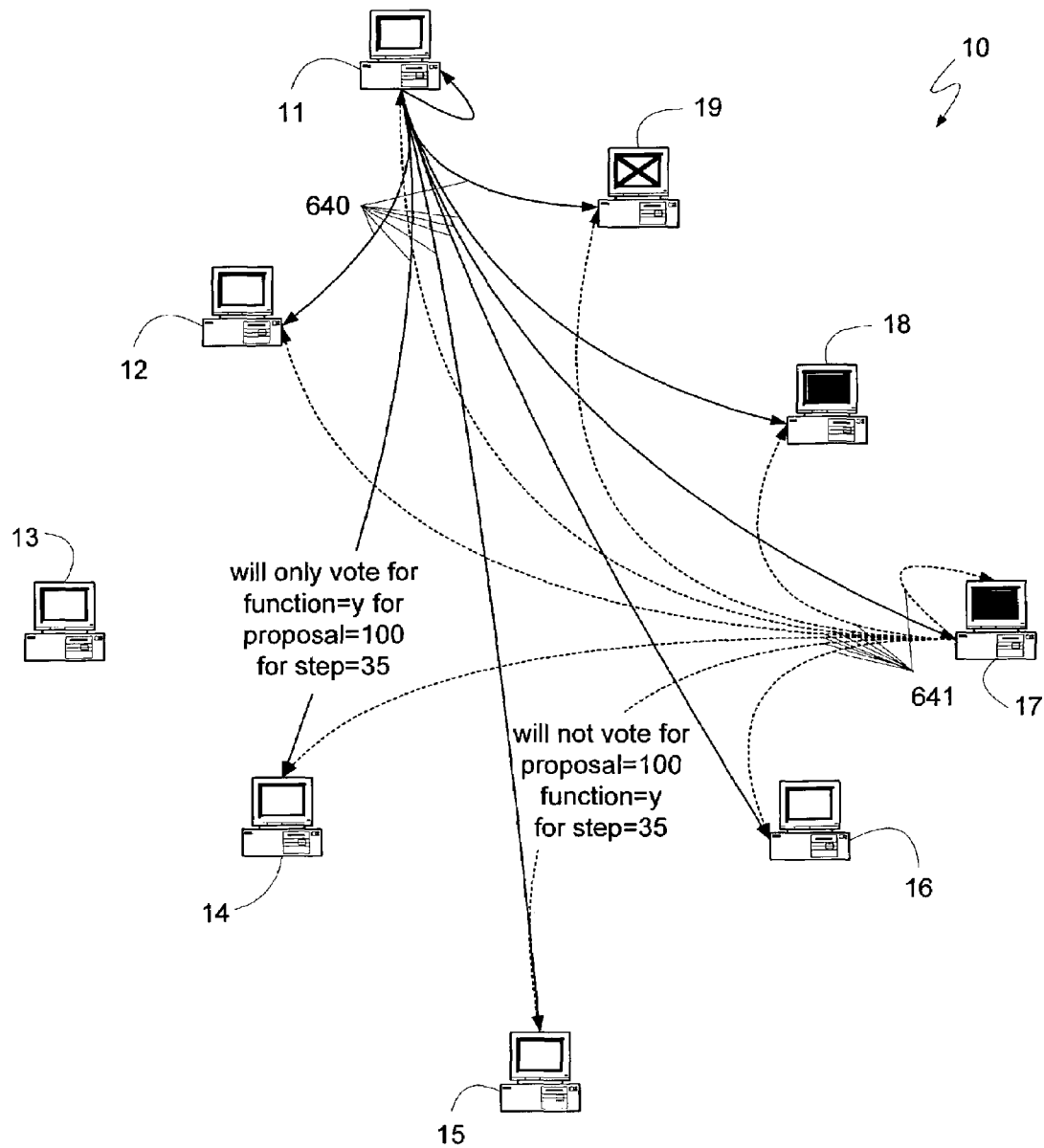

Once the devices 11-19 have received the message 630 and have verified the propriety of the proposal, each of the devices 11-19 can determine whether to vote for the proposal. As explained in detail above, if a device has not responded to another suggested proposal with a larger proposal number, it can vote for the current proposal, numbered 100 as shown in FIG. 7d. Prior to voting for the proposal, however, each of the devices can send a message to each of the other devices announcing that they will only vote for proposal 100 if it proposes function "y". Turning to FIG. 7e, the messages informing other devices of a device's intentions are illustrated, though for simplicity, only messages from devices 11 and 17 are illustrated. As with the messages indicating the largest numbered proposal for which a device had voted, such as messages 610 and 611 described above, each of the messages transmitting a device's intention to vote, such as messages 640 and 641, can be authenticated for their destination devices and for forwarding onto the other devices in the system 10. As a result, while a single number is used to denote the messages from a single device in FIG. 7e, each message will be unique due to the authenticators.

As a result of the intention messages, such as messages 640 and 641, each device will receive eight messages, much in the same manner as described above with the last vote messages. In a similar manner, if any six of those eight message are properly authenticated and each indicate that the sending device will only vote for the execution of function "y" for proposal number 100, the device can verify that the leader 13 sent a proposal numbered 100, proposing function "y" to all of the devices. If such a check was not performed, a malicious leader could send different proposals, each with the same number but each proposing a different function to different devices. Each device would only verify that it had not responded to a suggestion message with a larger proposal number and would then vote for the proposal. In such a case a new leader could not determine which function to suggest, as the devices would each provide a different function for the same proposal number. However, when a device receives a quorum of properly authenticated messages indicating that the sending devices will only vote for one function for a given proposal number, it can ensure that the same function Is voted for by each non-malicious device that votes.

The algorithms contemplated by the present invention do not require that the devices receiving messages, such as messages 640 and 641, necessarily be the same devices that received message 630. Messages 640 and 641, together with the other, non-illustrated messages can be used by any device to determine that the proposal can be safely voted for. Therefore, any device, including a device distinct from the devices illustrated in FIG. 7e, can receive a quorum of messages, such as messages 640 and 641, and, from that quorum, determine that the proposal submitted in message 630 is safe. As a result, the quorum of devices voting for the proposal, described below, need not be the same quorum of devices that sent the messages, such as messages 640 and 641, indicating an intention to vote and providing proof that the proposal was safe.

Figure 7F:
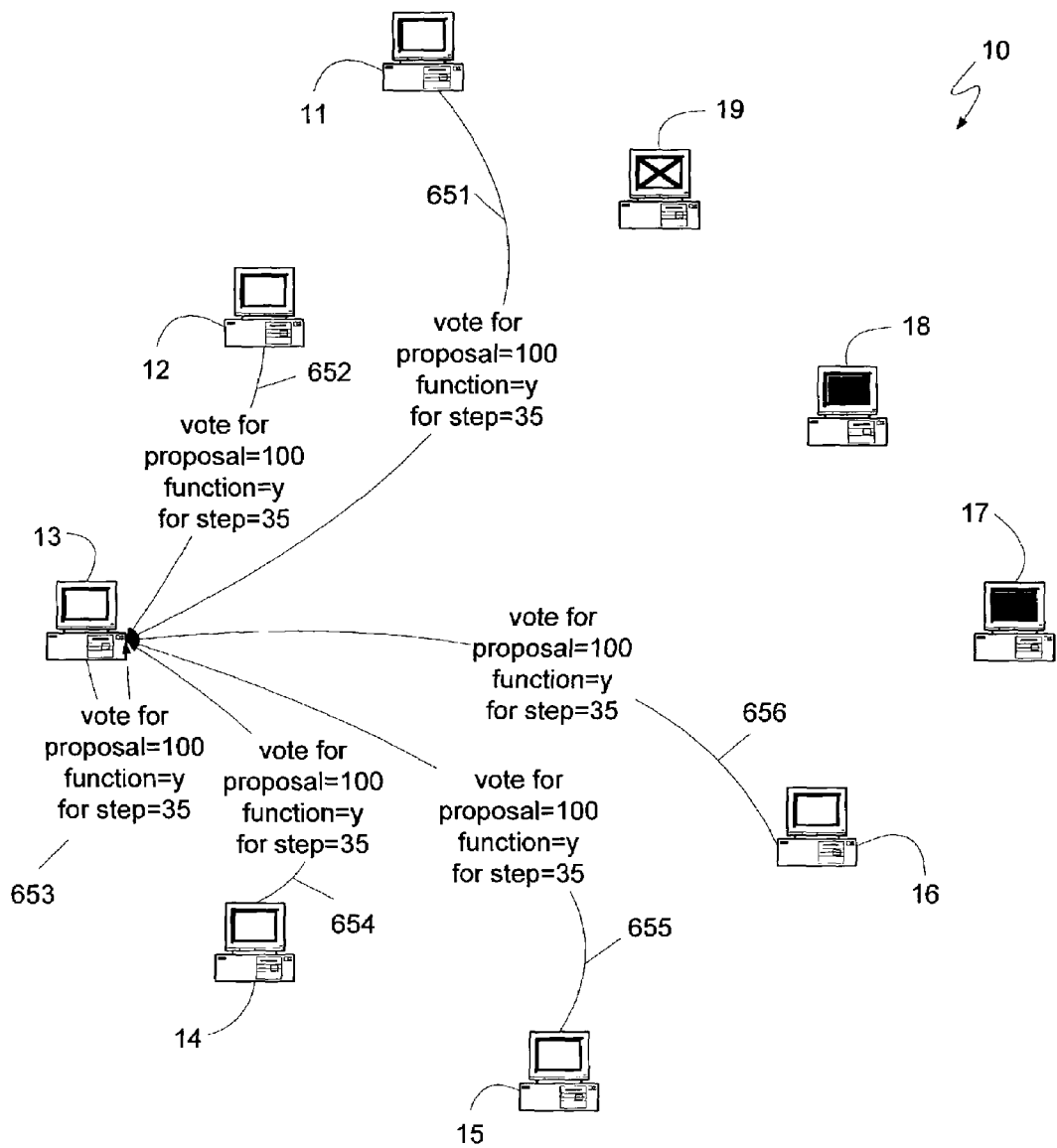

Turning to FIG. 7f, the devices 11-16 can send properly authenticated messages 650-654 indicating that they are voting for the execution of function "y". If at least six devices vote for the proposal, the leader 13 can determine that the proposal has been accepted because six devices are sufficient to ensure that the system may not select a different function for step 35. For example, in the illustrative system 10, given any six devices that could have voted for proposal 100 proposing function "y", such as devices 13-18, a quorum of devices cannot exist within the system 10 that does not include at least three of the devices 13-18. As such, even if two of the three devices are malicious, such as devices 17 and 18 and change their votes, at least one non-malicious device, such as one of devices 13-16, remains and, based on the operation of the algorithms described above, that one non-malicious device can ensure that the system 10 does not vote for any function for step 35 other than function "y". As a result, the function "y" is considered accepted when six devices, or a quorum, vote for it.

Figure 7G:
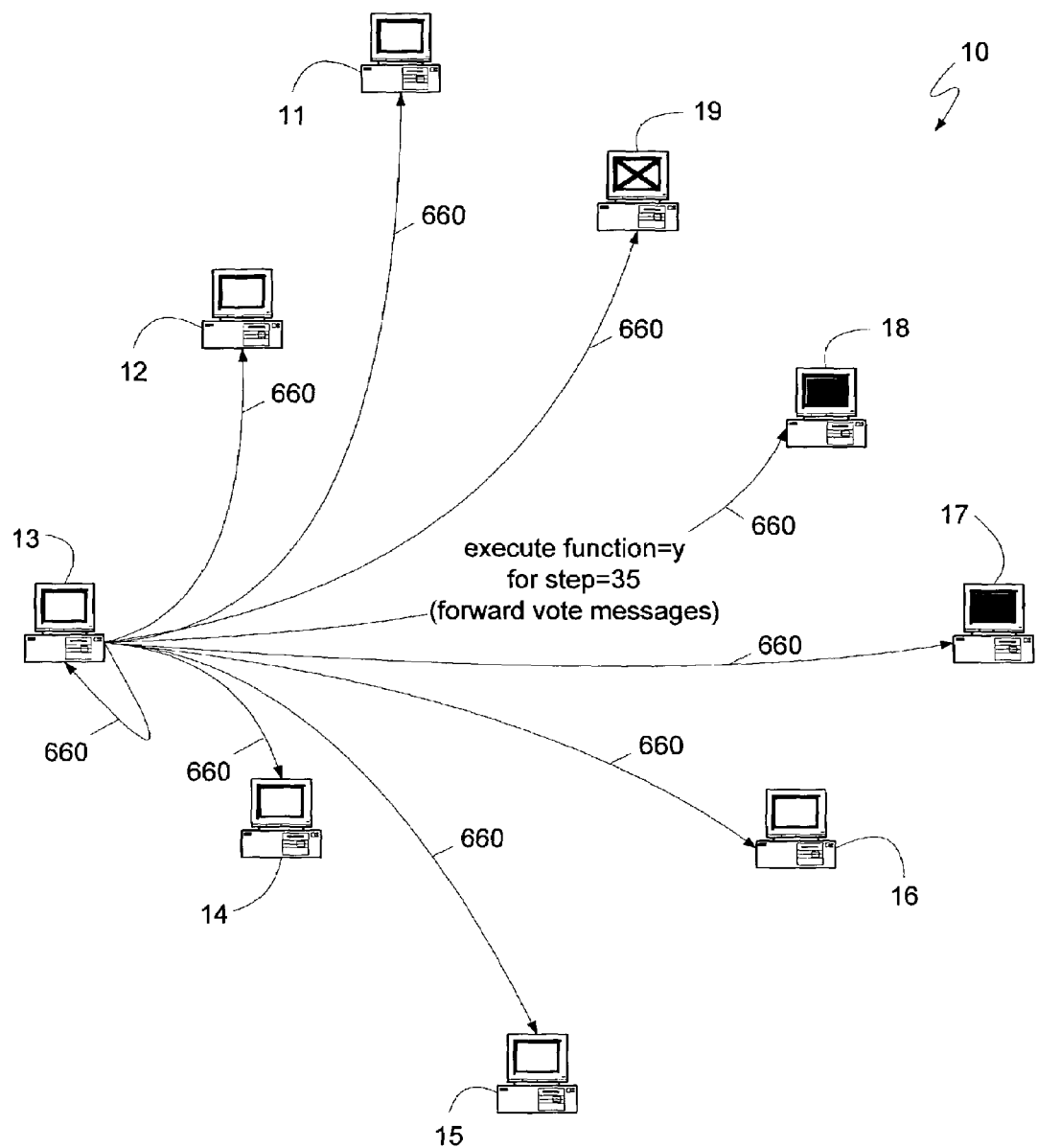

Turning to FIG. 7g, the leader 13 can send properly authenticated message 660 to the devices 11, 12, and 14-19 requesting that they execute function "y". In addition, the leader 13 can forward the collection of messages 651-656 as proof that the proposal was accepted and that function "y" should be executed. For greater efficiency, the leader 13 can send, with message 660, a proposal to be voted on for the next step, avoiding the need to send two messages. Alternatively, as described above, the leader need not wait for the collection of message 651-656 before proposing a proposal for the next step. In such a manner, the system can operate asynchronously and achieve even greater efficiencies. As also described above, the system 10 can be more efficient by retaining a leader for more than one step, because the current leader is already aware of all of the largest numbered proposals voted on by the devices for all steps greater than the current one. As a result, the current leader can directly submit proposals for voting, avoiding the first phase of the algorithm.

Returning to FIG. 7b, each of the messages, such as messages 610 and 611, transmitted by the devices 11-18 provide information regarding the largest numbered proposal less than the current proposal number for which the devices voted. As a proof that the vote for a proposal was appropriate, the devices can retain intention messages, such as messages 640 and 641 illustrated in FIG. 7e. By forwarding along this quorum of messages when sending the vote information messages, such as messages 610 and 611, the devices can verify that the vote cast was appropriate, in the manner described above.

As the above examples indicate, a quorum can be any set of devices that has a sufficient number of devices such that any two quorums share at least one non-malicious, properly functioning device. One method for ensuring at least one non-malicious device shared between any two quorums is to require that the number of shared devices between any two quorums is greater than the number of malicious devices in the system. A quorum can be alternatively defined as any set of devices that contains a majority of the non-malicious devices in a system, because any two sets of the majority of non-malicious devices will share at least one non-malicious device. If the system has N devices, and M of them are malicious, the non-malicious devices number N−M. Of these devices, any collection of more than $(N-M)/2$ of them is a majority of the non-malicious devices. Therefore, any set of more than $(N-M)/2+M$ devices from the system contains a majority of the non-malicious devices in the system, even if every malicious device is included in the set. A quorum is, therefore, any set having more than $(N-M)/2+M$ devices or, more simply, more than $(N+M)/2$ devices.

From another perspective, a quorum can be defined as a sufficient number of devices such that any two quorums in the distributed computing system must share at least one more device than there are malicious devices. Mathematically, a subset of all of the devices, N, in a distributed computing system, can be represented by $N-a$, where "a" can be any value. Therefore, if a quorum is $N-a$ devices, the intersection of two quorums among the N devices contains at least $N-2a$ devices. For a simple proof, consider two groups of $N-a$ devices. Adding their devices together yields $2N-2a$, but that would have counted the devices in their intersection twice. The smallest intersection can be achieved when each of the devices in the system belong to one group or the other. Thus, $2N-2a-$(number of devices in the intersection)$=N$. This yields the number of devices in the intersection as $N-2a$, as stated above. This intersection needs to have at least one non-malicious device. Thus, $N-2a$ must be greater than M devices, if "M" represents the number of malicious devices, or, mathematically, $N-2a>M$. Therefore, $N-M>2a$, or $a<(N-M)/2$. Therefore, a quorum, being the smallest subset of N for which an intersection of two equally sized subsets will yield an intersection of more than M devices, is $N-a$, where $a<(N-M)/2$, or, mathematically, quorum$=N-a$, where $a<(N-M)/2$. Substituting in for "a" yields quorum$>N-(N-M)/2$ or quorum$>(N+M)/2$ devices, as above.

Furthermore, to provide progress, such that functions are selected and executed, the members of the quorum may not be devices that are experiencing malicious or non-malicious failures. Defining the variable F to indicate the number of devices experiencing either malicious or non-malicious failures, the number of properly functioning devices in the system can be found by subtracting F from the total number of the devices in the system, N. Therefore, if a quorum can have only properly functioning devices in order for the system to progress, $(N+M)/2$ can be no larger than the total number of properly functioning devices in the system, namely: $N-F$. Multiplying both sides by 2, and consolidating the variable N on the same side of the equation yields the result that N is greater than $2F+M$. Therefore, using the above algorithms, a system having more devices than twice the maximum number of failed devices plus the maximum number of malicious devices will be able to continue to function properly and provide progress.

The appropriateness of the above formula for number of devices in the system can be verified by considering the need for each quorum to share at least one non-malicious device. As described above, both a device and a leader can obtain a proof of the propriety of a message that they can forward if they receive a message from a quorum of devices. Therefore, both a leader and a device can base their actions upon the receipt of a message from a quorum of devices. To maintain the consistency of the system, and prevent different devices from obtaining differing instructions, each quorum can share at least one non-malicious device. In such a way, the non-malicious device can maintain consistency and, because all of the messages from a quorum can contain the same information in order to provide the requisite proof, the messages sent by one quorum can be consistent with the messages sent by another quorum as they each have the at least one non-malicious device in common.

Therefore, to maintain consistency, the intersection of two quorums must be greater than M devices to ensure that at least one of the shared devices is non-malicious. The number of devices in a system that can support two quorums, each with, at most, N–F devices, having an intersection larger than M devices must be larger than, or equal to, the sum of the largest quorum minus the smallest intersection, which, as above, would have been double counted. The largest quorum is N–F and smallest intersection is M+1. Therefore, the number of devices in the system can be represented by $N \geq (N-F)+(N-F)-(M+1)$, or $N \geq 2N-2F-M-1$, which, subtracting 2N from both sides yields $-N \geq -2F-M-1$ or $N \geq 2F+M+1$. Because a fractional device cannot exist, $N > 2F+M$. Thus, as above, a system having more devices than twice the number of failed devices, including malicious and non-malicious failures, plus the number of malicious devices, can operate properly even with malicious devices.

Returning to FIG. 4c, the original Paxos algorithms provided a mechanism by which devices could learn of executed functions for steps prior to the current step. Such a mechanism is equally applicable to a system having malicious devices. However, to protect against the malicious devices, a device can learn of an executed function either by receiving properly authenticated messages from a quorum of devices all claiming to have voted for a proposal, such as messages 610 and 611, or by receiving M+1 properly authenticated messages from M+1 devices claiming that the same function was selected. In the former case, a quorum of devices is sufficient to accept a proposed function, even if all of the malicious devices are included in the quorum, as shown above. In the latter case, even if all of the malicious devices were included in the M+1 messages from M+1 devices, at least one message would come from a properly functioning device. Thus, due to the number of equivalent messages, the receiving device can trust the information provided.

The present invention also contemplates protection against malicious clients which request improper functions to be executed by the system. Generally, the distributed computing system acts on behalf of a client that is availing itself of the system's services. Thus, a leader, or a another device, can receive a request from a client that the distributed computing system execute a given function or series of functions to perform a useful task. The receiving device can either forward the client's request onto the current leader, or the device can act as a leader itself and propose the execution of the function requested by the client. The operation of the system can then proceed as described above. However, a malicious client can cause the system to execute improper functions, resulting in possible harm to the data maintained by the system. To protect the data of the system, the devices can vote for only those client proposals which are authenticated, and the requesting client has the necessary clearance to make the request. For example, each device can have access to a database indicating particular clients and their levels of access. A client that has properly authenticated itself to the distributed computing system can be granted a sufficient level of access to request modifications to the data stored by the system, while a client that has only guest access, and cannot properly authenticate itself, may only be allowed to retrieve information, but not change it.

By requiring client commands to be authenticated, the devices of the system can each independently determine the client making the request, and whether the request is allowed for that client. By performing the check independently, the devices can take advantage of the mechanisms described above to avoid collusion between a malicious client and malicious devices. Each client can, therefore, send an authenticator for each of the devices, when transmitting a request to the distributed computing system.

Returning to FIG. 7e, prior to sending the messages indicating that a device would vote for only a specific function for a given proposal, such as messages 640 and 641, each device can verify, based on the messages forwarded by the leader, that the proposal is properly authenticated, and that the client submitting the proposal has the authority to request the function it has requested. Returning to FIG. 7c, the leader can determine which proposals are safe based on messages such as messages 621-628. If the proposal submitted by the leader for a vote is proper because the messages from the clients, such as messages 621-628, only specified a single safe function that was previously voted for, then the devices can vote for the proposal because a check of the client authenticator had been previously performed. If, however, the proposal submitted by the leader for a vote is proper because the messages from the clients, such as messages 621-628, did not specify any functions that were previously voted for, allowing the leader to select its own proposal, then the device can seek to verify that the proposal is a request from a client that is authorized to issue such requests because no such check had previously been made. Therefore, the devices can verify that the authenticator sent by the client with the client request is proper, and they can verify, based on the identity of the client, that the client has the authority to request the currently proposed function. If the authenticator is improper, or if the client has not been granted sufficient access, the device need not indicate an intention to vote for only that function for the given proposal, such as shown in FIG. 7e. As above, if at least a quorum of devices votes for the proposal, then the function can be executed. Alternatively, the device's request is denied. In such a manner the damage that can be done by a malicious client, even one working in conjunction with a malicious leader, can be minimized.

The present invention can minimize the effects of a malicious leader because the algorithms, as described above, will not allow the devices to vote for improper functions submitted by a malicious leader. However, such a malicious leader can prevent progress by continually proposing functions that are not selected. As a result, the present invention contemplates the use of a timer, or similar algorithm, by which a client or a device can determine that a sufficient amount of time has passed without the distributed computing system executing a function, and initiate a new leader. In such a manner, the length of time by which the system can be delayed is limited.

As can be seen, the present invention provides for the proper operation of a distributed computing system in the face of malicious failures and malicious clients. All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A method for selecting a value in a distributed computing system, the method comprising:
    transmitting, from a leader device in the distributed computing system to a first quorum of devices in the distributed computing system, a proposed value and a proof of safety, wherein the proposed value is proposed in a proposal having a proposal-identifying proposal number, and wherein the proposed value and the proof of safety are authenticated for the first quorum of devices;
    receiving, at the leader device in the distributed computing system from a second quorum of devices in the distributed computing system, a quorum of acceptance messages indicating an acceptance of the proposed value, wherein the acceptance messages are authenticated from the second quorum; and
    transmitting, from a leader device in the distributed computing system to a subset of the devices in the distributed computing system, a selection message, indicating that the proposed value was selected, and a proof of the selection, wherein the selection message and the proof of the selection are authenticated for the subset of the devices,
    wherein the leader device is in the distributed computing system, but is not part of either the first or the second quorums of devices in the distributed computing system,
    wherein the transmitting the proof of safety comprises forwarding, from the leader device in the distributed computing system, a received quorum of safe value messages, wherein the safe value messages are properly authenticated from a quorum of devices in the distributed computing system, and wherein the safe value messages contain a previously voted for value if the previously voted for value was previously voted for by at least one device in the distributed computing system.

2. The method of claim 1, wherein the transmitting the proof of the selection comprises forwarding the received quorum of acceptance messages.

3. The method of claim 1 further comprising:
    transmitting, to a third quorum of devices in the distributed computing system, a suggested next proposal number, wherein the suggested next proposal number is authenticated for the third quorum of devices; and
    receiving from a fourth quorum of devices in the distributed computing system a quorum of safe value messages.

4. A method for selecting a value in a distributed computing system, the method comprising:
    receiving, from a leader, a proposed value and a proof of safety, wherein the proposed value is proposed in a proposal having a proposal-identifying proposal number, and wherein the proposed value and the proof of safety are authenticated from the leader;
    transmitting, to a first quorum of devices in the distributed computing system, an exclusivity message, wherein the exclusivity message indicates a unique proposed value for the proposal number for which a vote can be cast, and wherein the exclusivity message is authenticated for the first quorum of devices;
    receiving, from a second quorum of devices in the distributed computing system, a quorum of exclusivity messages authenticated from the second quorum of devices;
    transmitting, to the leader, an acceptance message if the received quorum of exclusivity messages indicated the proposed value as the unique proposed value and no suggested next proposal number message was responded to, wherein the acceptance is authenticated for the leader, and wherein the acceptance message indicates an acceptance of the proposed value; and
    receiving, from the leader, a selection message, indicating that the proposed value was selected, and a proof of the selection, wherein the selection message and the proof of the selection are authenticated from the leader,
    wherein the leader device is in the distributed computing system, but is not part of either the first or the second quorums of devices in the distributed computing system,
    wherein the receiving of the proof of safety comprises receiving a forwarded quorum of safe value messages, which was forwarded from the leader, wherein the safe value messages are properly authenticated from the leader, and wherein the safe value messages comprise a previously voted for value if the previously voted for value was previously voted for by at least one device in the distributed computing system.

5. The method of claim 4 further comprising authenticating a client request from a client to the distributed computing system, the authenticating comprising:
    receiving, from the leader, a client authentication; and
    verifying, using the client authentication, that the client is allowed to request the client request if the safe value messages do not comprise the previously voted for value, wherein the client request value is a value derived from the client request.

6. The method of claim 4, wherein the receiving the proof of the selection comprises receiving a quorum of acceptance messages.

7. The method of claim 4, further comprising:
    receiving, from the leader, a suggested next proposal number message, wherein the suggested next proposal number message is authenticated from the leader;
    transmitting, to a third quorum of devices in the distributed computing system, a last vote message and a proof of last vote, wherein the last vote message and the proof of last vote are authenticated for the third quorum of devices;
    receiving, from a fourth quorum of devices in the distributed computing system, a quorum of last vote messages and proofs of last vote, wherein the quorum of last vote messages and the proofs of last vote are authenticated from the fourth quorum of devices; and
    transmitting, to the leader, a safe value message authenticated for the leader, wherein the safe value message comprises an indication of a previously voted for value if the previously voted for value was previously voted for by at least one device in the distributed computing system.

8. The method of claim 7, wherein the receiving of the proofs of last vote includes receiving, for each proof of last vote, the quorum of exclusivity messages authenticated from the second quorum of devices, wherein the quorum of exclusivity messages is forwarded and authenticated from a device in the fourth quorum of devices.

9. The method of claim 7, wherein the indication of the previously voted for value is the quorum of last vote messages.

10. The method of claim 7, wherein the indication of the previously voted for value is a value associated with a largest proposal number indicated in the quorum of last vote messages.

11. A computer-readable medium having computer-executable instruction for selecting a value in a distributed computing system, the computer executable instructions performing steps comprising:
   transmitting, from a leader device in the distributed computing system to a first quorum of devices in the distributed computing system, a proposed value and a proof of safety, wherein the proposed value is proposed in a proposal having a proposal-identifying proposal number, and wherein the proposed value and the proof of safety are authenticated for the first quorum of devices;
   receiving, at the leader device in the distributed computing system from a second quorum of devices in the distributed computing system, a quorum of acceptance messages indicating an acceptance of the proposed value, wherein the acceptance messages are authenticated from the second quorum; and
   transmitting, from a leader device in the distributed computing system to a subset of the devices in the distributed computing system, a selection message, indicating that the proposed value was selected, and a proof of the selection, wherein the selection message and the proof of the selection are authenticated for the subset of the devices,
   wherein the leader device is in the distributed computing system, but is not part of either the first or the second quorums of devices in the distributed computing system,
   wherein the computer-executable instructions for transmitting the proof of safety comprise computer-executable instructions for forwarding, from the leader device in the distributed computing system, a received quorum of safe value messages, wherein the safe value messages are properly authenticated from a quorum of devices in the distributed computing system, and wherein the safe value messages contain a previously voted for value if the previously voted for value was previously voted for by at least one device in the distributed computing system.

12. The computer-readable of claim 11, wherein the distributed computing system comprises more devices than twice a maximum number of devices that are expected to fail or be malicious plus a maximum number of devices that are expected to be malicious.

13. The computer-readable of claim 11, wherein a quorum is a number greater than half a sum of a number devices in the distributed computing system plus a maximum number of devices that are expected to be malicious.

14. The computer-readable of claim 11, wherein the proposed value is selected based on the previously voted for value and a previously voted for proposal number, wherein the previously voted for proposal number is associated with a previously voted for proposal that proposed the previously voted for value.

15. The computer-readable of claim 11, wherein the computer-executable instructions for transmitting the proof of the selection comprise computer-executable instructions for forwarding the received quorum of acceptance messages.

16. The computer-readable of claim 11 having further computer-executable instructions, the further computer-executable instructions performing steps comprising:
   transmitting, to a third quorum of devices in the distributed computing system, a suggested next proposal number, wherein the suggested next proposal number is authenticated for the third quorum of devices; and
   receiving from a fourth quorum of devices in the distributed computing system a quorum of safe value messages.

17. A computer-readable medium having computer-executable instructions for selecting a value in a distributed computing system, the computer-executable instructions performing steps comprising:
   receiving, from a leader, a proposed value and a proof of safety, wherein the proposed value is proposed in a proposal having a proposal number, and wherein the proposed value and the proof of safety are authenticated from the leader;
   transmitting, to a first quorum of devices in the distributed computing system, an exclusivity message, wherein the exclusivity message indicates a unique proposed value for the proposal number for which a vote can be cast, and wherein the exclusivity message is authenticated for the first quorum of devices;
   receiving, from a second quorum of devices in the distributed computing system, a quorum of exclusivity messages authenticated from the second quorum of devices;
   transmitting, to the leader, an acceptance message if the received quorum of exclusivity messages indicated the proposed value as the unique proposed value and no suggested next proposal number message was responded to, wherein the acceptance is authenticated for the leader, and wherein the acceptance message indicates an acceptance of the proposed value; and
   receiving, from the leader, a selection message, indicating that the proposed value was selected, and a proof of the selection, wherein the selection message and the proof of the selection are authenticated from the leader,
   wherein the leader device is in the distributed computing system, but is not part of either the first or the second quorums of devices in the distributed computing system,
   wherein the computer-executable instructions for receiving the proof of safety comprise computer-executable instructions for receiving a forwarded quorum of safe value messages, which was forwarded from the leader, wherein the safe value messages are properly authenticated from the leader, and wherein the safe value messages comprise a previously voted for value if the previously voted for value was previously voted for by at least one device in the distributed computing system.

18. The computer-readable medium of claim 17, wherein the distributed computing system comprises more devices than twice a maximum number of devices that are expected to fail or be malicious plus a maximum number of devices that are expected to be malicious.

19. The computer-readable medium of claim 17, wherein a quorum is a number greater than half a sum of a number devices in the distributed computing system plus a maximum number of devices that are expected to be malicious.

20. The computer-readable medium of claim 17 having further computer-executable instructions, the further computer-executable instructions comprising authenticating a client request from a client to the distributed computing system, the computer-executable instructions for authenticating comprising computer-executable instructions for performing steps comprising:

receiving, from the leader, a client authentication; and verifying, using the client authentication, that the client is allowed to request the client request if the safe value messages do not comprise the previously voted for value, wherein the client request value is a value derived from the client request.

21. The computer-readable medium of claim 17, wherein the computer-executable instructions for receiving the proof of the selection comprise computer-executable instructions for receiving a quorum of acceptance messages.

22. The computer-readable medium of claim 17, having further computer-executable instructions, the further computer-executable instructions performing steps comprising:

receiving, from the leader, a suggested next proposal number message, wherein the suggested next proposal number message is authenticated from the leader;

transmitting, to a third quorum of devices in the distributed computing system, a last vote message and a proof of last vote, wherein the last vote message and the proof of last vote are authenticated for the third quorum of devices;

receiving, from a fourth quorum of devices in the distributed computing system, a quorum of last vote messages and proofs of last vote, wherein the quorum of last vote messages and the proofs of last vote are authenticated from the fourth quorum of devices; and transmitting, to the leader, a safe value message authenticated for the leader, wherein the safe value message comprises an indication of a previously voted for value if the previously voted for value was previously voted for by at least one device in the distributed computing system.

23. The computer-readable medium of claim 22, wherein the computer-executable instructions for receiving of the proofs of last vote include computer-executable instructions for receiving, for each proof of last vote, the quorum of exclusivity messages authenticated from the second quorum of devices, wherein the quorum of exclusivity messages is forwarded and authenticated from a device in the fourth quorum of devices.

24. The computer-readable medium of claim 22, wherein the indication of the previously voted for value is the quorum of last vote messages.

25. The computer-readable medium of claim 22, wherein the indication of the previously voted for value is a value associated with a largest proposal number indicated in the quorum of last vote messages.

26. A computing device in a distributed computing system, the computing device performing steps comprising:

transmitting, from a leader device in the distributed computing system to a first quorum of devices in the distributed computing system, a proposed value and a proof of safety, wherein the proposed value is proposed in a proposal having a proposal-identifying proposal number, and wherein the proposed value and the proof of safety are authenticated for the first quorum of devices;

receiving, at the leader device in the distributed computing system from a second quorum of devices in the distributed computing system, a quorum of acceptance messages indicating an acceptance of the proposed value, wherein the acceptance messages are authenticated from the second quorum; and transmitting, from a leader device in the distributed computing system to a subset of the devices in the distributed computing system, a selection message, indicating that the proposed value was selected, and a proof of the selection, wherein the selection message and the proof of the selection are authenticated for the subset of the devices, wherein the step of transmitting the proof of safety comprises the step of forwarding, from a leader device in the distributed computing system, a received quorum of safe value messages, wherein the safe value messages are properly authenticated from a quorum of devices in the distributed computing system, and wherein the safe value messages contain a previously voted for value if the previously voted for value was previously voted for by at least one device in the distributed computing system.

27. The computing device of claim 26, wherein the step of transmitting the proof of the selection comprises the step of forwarding the received quorum of acceptance messages.

28. The computing device of claim 26 performing further steps comprising:

transmitting, to a third quorum of devices in the distributed computing system, a suggested next proposal number, wherein the suggested next proposal number is authenticated for the third quorum of devices; and receiving from a fourth quorum of devices in the distributed computing system a quorum of safe value messages.

29. A computing device for selecting a value in a distributed computing system, the computing device performing steps comprising:

receiving, from a leader, a proposed value and a proof of safety, wherein the proposed value is proposed in a proposal having a proposal number, and wherein the proposed value and the proof of safety are authenticated from the leader;

transmitting, to a first quorum of devices in the distributed computing system, an exclusivity message, wherein the exclusivity message indicates a unique proposed value for the proposal number for which a vote can be cast, and wherein the exclusivity message is authenticated for the first quorum of devices;

receiving, from a second quorum of devices in the distributed computing system, a quorum of exclusivity messages authenticated from the second quorum of devices;

transmitting, to the leader, an acceptance message if the received quorum of exclusivity messages indicated the proposed value as the unique proposed value and no suggested next proposal number message was responded to, wherein the acceptance is authenticated for the leader, and wherein the acceptance message indicates an acceptance of the proposed value; and receiving, from the leader, a selection message, indicating that the proposed value was selected, and a proof of the selection, wherein the selection message and the proof of the selection are authenticated from the leader, wherein the leader device is in the distributed computing system, but is not part of either the first or the second quorums of devices in the distributed computing system, wherein the step of receiving of the proof of safety comprises the step of receiving a forwarded quorum of safe value messages, which was forwarded from the leader, wherein the safe value messages are properly authenticated from the leader, and wherein the safe value messages comprise a previously voted for value if the previously voted for value was previously voted for by at least one device in the distributed computing system.

30. The computing device of claim 29 performing further steps comprising authenticating a client request from a client to the distributed computing system, the step of authenticating comprises the steps of:
- receiving, from the leader, a client authentication; and
- verifying, using the client authentication, that the client is allowed to request the client request if the safe value messages do not comprise the previously voted for value, wherein the client request value is a value derived from the client request.

31. The computing device of claim 29, wherein the step of receiving the proof of the selection comprises the step of receiving a quorum of acceptance messages.

32. The computing device of claim 29, performing further steps comprising:
- receiving, from the leader, a suggested next proposal number message, wherein the suggested next proposal number message is authenticated from the leader;
- transmitting, to a third quorum of devices in the distributed computing system, a last vote message and a proof of last vote, wherein the last vote message and the proof of last vote are authenticated for the third quorum of devices;
- receiving, from a fourth quorum of devices in the distributed computing system, a quorum of last vote messages and proofs of last vote, wherein the quorum of last vote messages and the proofs of last vote are authenticated from the fourth quorum of devices; and
- transmitting, to the leader, a safe value message authenticated for the leader, wherein the safe value message comprises an indication of a previously voted for value if the previously voted for value was previously voted for by at least one device in the distributed computing system.

33. The computing device of claim 32, wherein the step of receiving of the proofs of last vote includes the step of receiving, for each proof of last vote, the quorum of exclusivity messages authenticated from the second quorum of devices, wherein the quorum of exclusivity messages is forwarded and authenticated from a device in the fourth quorum of devices.

34. The computing device of claim 32, wherein the indication of the previously voted for value is the quorum of last vote messages.

35. The computing device of claim 32, wherein the indication of the previously voted for value is a value associated with a largest proposal number indicated in the quorum of last vote messages.

* * * * *